US008478486B2

(12) United States Patent
Kato et al.

(10) Patent No.: US 8,478,486 B2
(45) Date of Patent: Jul. 2, 2013

(54) VEHICLE CONTROL DEVICE AND VEHICLE CONTROL METHOD

(75) Inventors: Yumiko Kato, Osaka (JP); Hoshimi Masakatsu, Osaka (JP)

(73) Assignee: Panasonic Corporation, Osaka (JP)

( * ) Notice: Subject to any disclaimer, the term of this patent is extended or adjusted under 35 U.S.C. 154(b) by 229 days.

(21) Appl. No.: 13/075,232

(22) Filed: Mar. 30, 2011

(65) Prior Publication Data

US 2011/0178680 A1   Jul. 21, 2011

Related U.S. Application Data

(63) Continuation of application No. PCT/JP2010/004470, filed on Jul. 9, 2010.

(30) Foreign Application Priority Data

Sep. 9, 2009   (JP) .................................. 2009-208726

(51) Int. Cl.
   *B60T 7/12* (2006.01)
(52) U.S. Cl.
   USPC ................................ 701/41; 701/70; 340/467
(58) Field of Classification Search
   USPC ................. 701/41, 36, 1, 62, 45, 70, 51, 301,
         701/78, 96, 48; 180/268, 272, 282; 477/170,
         477/184, 93; 340/436, 439, 576, 573.7, 540,
            340/479; 303/155; 359/356; 315/77, 81
   See application file for complete search history.

(56) References Cited

U.S. PATENT DOCUMENTS

| | | | | |
|---|---|---|---|---|
| 6,833,791 | B2 * | 12/2004 | Bullinger et al. | 340/576 |
| 7,882,920 | B2 * | 2/2011 | Nitta et al. | 180/268 |
| 2003/0038715 | A1 * | 2/2003 | Engelman et al. | 340/439 |
| 2006/0103338 | A1 * | 5/2006 | Takeuchi | 318/599 |
| 2008/0316037 | A1 | 12/2008 | Shoji et al. | |
| 2009/0124457 | A1 | 5/2009 | Nitta et al. | |

FOREIGN PATENT DOCUMENTS

| | | |
|---|---|---|
| JP | 10-315938 | 12/1998 |
| JP | 2004-243868 | 9/2004 |
| JP | 2004-243869 | 9/2004 |

(Continued)

OTHER PUBLICATIONS

International Search Report issued Oct. 19, 2010 in International (PCT) Application No. PCT/JP2010/004470.
Iwoa Matsuda and Takashi Sugihara, Shin-ban Undou Shinri-gaku Nyumon, published by Taishukan Shoten, p. 15, line 1 to p. 17, line 13, 1987 (with translation).

(Continued)

*Primary Examiner* — Marthe Marc-Coleman
(74) *Attorney, Agent, or Firm* — Wenderoth, Lind & Ponack, L.L.P.

(57) ABSTRACT

A vehicle control device (10) is provided that can predict a driving operation of a driver earlier to respond to the driving operation quickly. The vehicle control device (10) includes: a posture measuring unit (11) to measure a posture indicating a state of at least one of the buttock region, the upper pelvic region, and the driver's leg opposite to the other leg with which the driver operates a brake or an accelerator; a posture change detection unit (12) to detect a posture change measured; a preparatory movement identification unit (13) to identify whether the posture change is caused by the driver's preparatory movement spontaneously made before the brake or accelerator operation, based on whether the posture change detected satisfies a predetermined condition; and a vehicle control unit (14) to control the vehicle when it is identified that the posture change has been caused by the preparatory movement.

25 Claims, 39 Drawing Sheets

| | FOREIGN PATENT DOCUMENTS | |
|---|---|---|
| JP | 2005-075180 | 3/2005 |
| JP | 2005-076762 | 3/2005 |
| JP | 2005-205955 | 8/2005 |
| JP | 2007-320459 | 12/2007 |
| JP | 2008-143440 | 6/2008 |
| JP | 2008-260507 | 10/2008 |
| JP | 2009-002883 | 1/2009 |
| JP | 2009-113712 | 5/2009 |

OTHER PUBLICATIONS

Sandy Moore, Denis Brunt, Mary L. Nesbitt and Terl Juarez, Investigation of Evidence for Anticipatory Postural Adjustments in Seated Subjects Who Performed a Reaching Task, Physical Therapy vol. 72,(5), pp. 335-343, 1992.

* cited by examiner

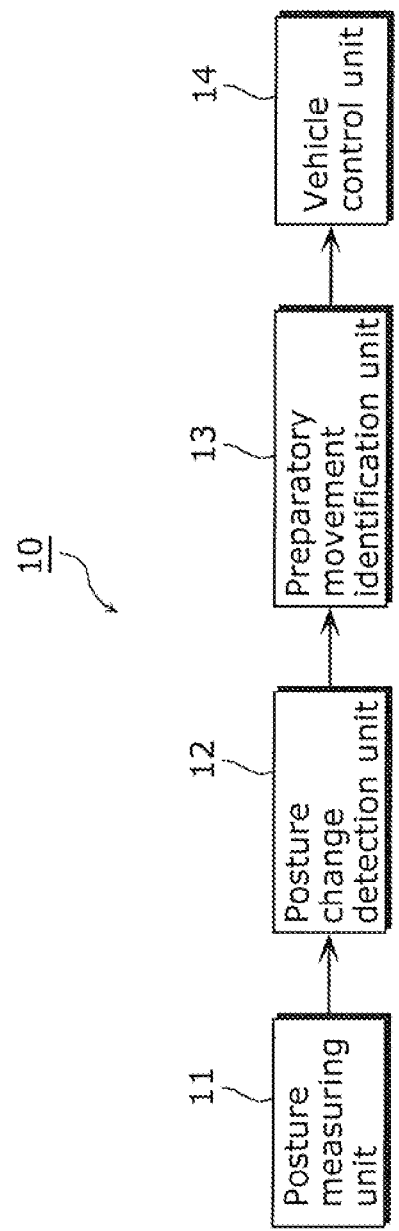

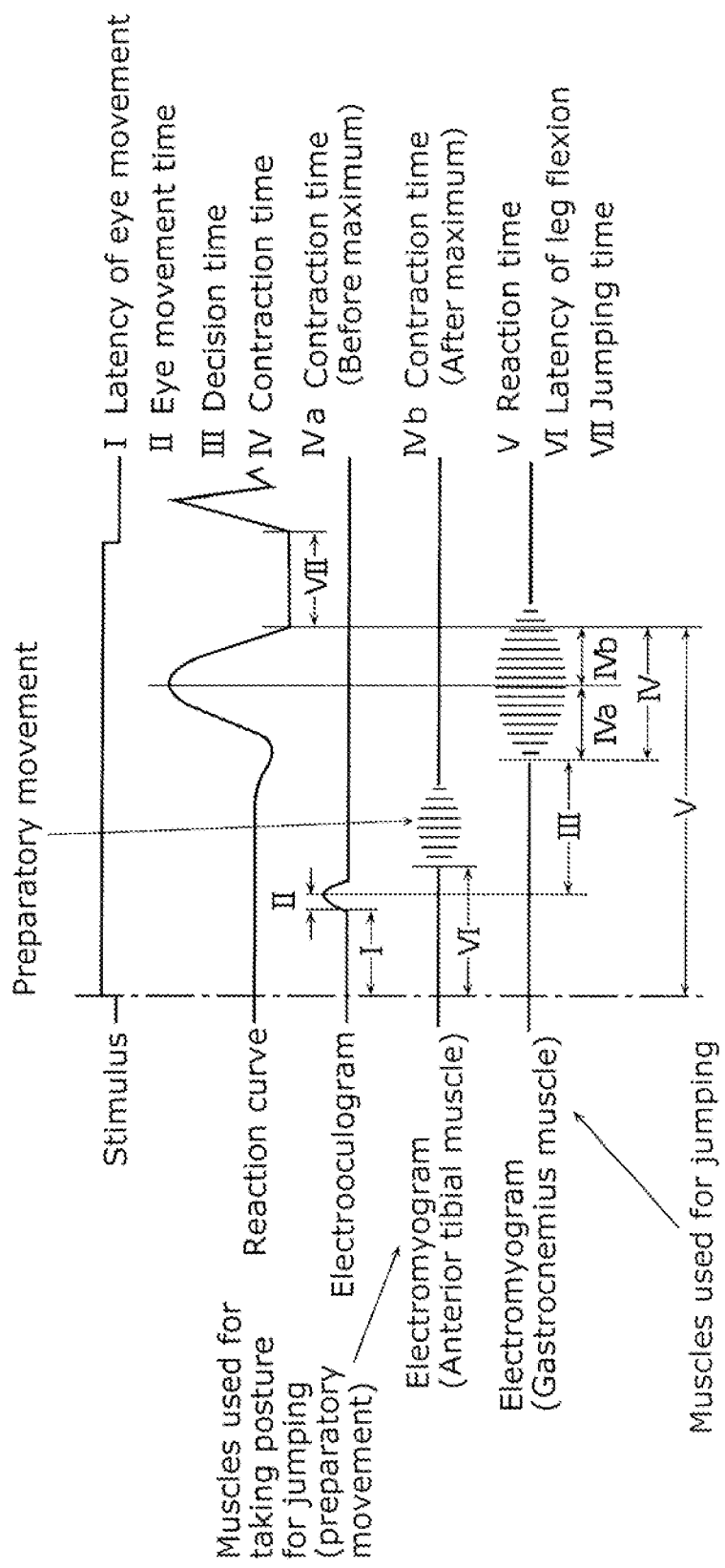

VEHICLE CONTROL DEVICE AND VEHICLE CONTROL METHOD

CROSS REFERENCE TO RELATED APPLICATION

This is a continuation application of PCT application No. PCT/JP2010/004470 filed on Jul. 9, 2010, designating the United States of America.

BACKGROUND OF THE INVENTION (1) Field of the Invention

The present invention relates to a vehicle control device for controlling a vehicle and a vehicle control method.

(2) Description of the Related Art

For accelerating or decelerating a vehicle, the driver of the vehicle depresses an accelerator pedal or a brake pedal. Also, for changing the traveling direction of the vehicle, the driver turns the steering wheel to the right or left. In order to implement safe and smooth traveling, the vehicle needs to respond to the driving operation of the driver and to operate as desired. However, in reality, the vehicle starts the operation corresponding to the driving operation a certain time after the driver operates the pedal or the steering wheel. As a result, the driver may feel a time delay because of a lag between the timing of the driving operation and the start of the vehicle's operation corresponding to the driving operation.

Now, various methods have been proposed for the vehicle to quickly respond to the driving operation of the driver so as to start the operation corresponding to the driving operation immediately. For example, methods of quickly responding to the driving operation by predicting the driver's operation have been proposed (for example, see Japanese Unexamined Patent Application Publication No. 2004-243869 hereinafter referred to as Patent Reference 1, and Japanese Unexamined Patent Application Publication No. 2007-320459 hereinafter referred to as Patent Reference 2).

The method described in the Patent Reference 1 predicts the brake operation of the driver by detecting a posture of the driver in which the driver lifts one of its legs over the brake pedal to depress it. Thereby, the operation of the vehicle corresponding to the driving operation of the driver can be started quickly.

Also, the method described in the Patent Reference 2 predicts the driver's operation of depressing the accelerator pedal by measuring the myoelectric potential of a part of the driver's muscles as a "signal of the body", which precedes the operation of the accelerator pedal. Thereby, the acceleration can be started earlier by opening the throttle of the vehicle before the accelerator pedal is actually depressed.

SUMMARY OF THE INVENTION

However, in the case where the movement of the driver's foot is quicker than usual in a situation such as an emergency, the difference between the time when the state of lifted foot above the brake pedal is detected, and a subsequent time when the state of depressing operation of the foot on the brake pedal is detected is extremely small. As a result, in the method described in Patent Reference 1, even with the use of predicted results of driving operation, the method may not quickly respond to the driving operation.

Also, in the case where the myoelectric potential is measured as in the Patent References 2, in order to acquire "signal of the body", preceding the actual depressing operation of the accelerator pedal, from the leg or foot with which the driver depresses the accelerator pedal, electrodes need to be attached to the skin of the leg or foot, thus involving wearing special clothes for the vehicle operation, pre-attaching electrodes, thereby comfortable driving condition is significantly reduced.

Now, the present invention has been made to solve the above-mentioned problems, and it is an object of the invention to provide a vehicle control device capable of predicting the driving operation of the driver at an earlier time, and responding to the driving operation quickly without placing a burden on the driver such as attaching a sensor to the driver's body.

Means for Solving the Problems

In order to achieve the above-described object, the vehicle control device which is one aspect of the present invention includes: a posture measuring unit configured to measure a posture indicating a state of at least one of a buttock region, an upper pelvic region, and a leg of a driver, the leg on an opposite side of other leg with which the driver performs a brake operation or an accelerator operation; a posture change detection unit configured to detect a posture change which is a change of a posture measured by the posture measuring unit; a preparatory movement identification unit configured to identify whether or not the posture change detected by the posture change detection unit is caused by a preparatory movement for the brake operation or the accelerator operation, based on whether or not the posture change satisfies a predetermined condition, the preparatory movement being a movement made spontaneously by the driver before performing the brake operation or the accelerator operation; and a vehicle control unit configured to control the vehicle in a case where it is identified by the preparatory movement identification unit that the posture change has been caused by the preparatory movement for the brake operation or the accelerator operation.

Thereby, the vehicle can be controlled based on the preparatory movement made spontaneously by the driver before performing a brake operation or an accelerator operation, thus the vehicle can respond to the brake operation or accelerator operation quickly.

Preferably, in the case where a magnitude of the posture change is greater than or equal to a threshold value, the preparatory movement identification unit is configured to identify that the posture change has been caused by the preparatory movement for the brake operation or the accelerator operation.

Thereby, whether or not the detected posture change has been caused by a preparatory movement can be easily identified.

Preferably, in the case where the preparatory movement identification unit identifies that the posture change has been caused by the preparatory movement for the brake operation, the vehicle control unit decelerates the vehicle; and in the case where the preparatory movement identification unit identifies that the posture change has been caused by the preparatory movement for the accelerator operation, the vehicle control unit accelerates the vehicle.

Thereby, the vehicle can be decelerated or accelerated based on the preparatory movement.

Preferably, in the case where the preparatory movement identification unit identifies that the posture change has been caused by the preparatory movement for the brake operation, the vehicle control unit turns on a brake light.

Thereby, a brake light can be turned on at an earlier time based on the preparatory movement, thus risk of an accident such as a collision with the following vehicles can be reduced.

In order to achieve the above-described object, the vehicle control device which is one aspect of the present invention is a vehicle control device for controlling a vehicle including: a posture measuring unit configured to measure a posture indicating a state of at least one of a femoral region, a buttock region, and a lumbar to back region above a pelvic region of the driver; a posture change detection unit configured to detect a posture change which is a change of a posture measured by the posture measuring unit; a preparatory movement identification unit configured to identify whether or not the posture change is caused by a preparatory movement for a steering operation, based on whether or not the posture change detected by the posture change detection unit satisfies a predetermined condition, the preparatory movement being a movement made spontaneously by the driver before performing the steering operation; and a vehicle control unit configured to control the vehicle in the case where it is identified by the preparatory movement identification unit that the posture change has been caused by the preparatory movement for the steering operation.

Thereby, the vehicle can be controlled based on the preparatory movement made spontaneously by the driver before performing a steering operation, thus the vehicle can respond to the steering operation quickly.

Preferably, the posture measuring unit is configured to measure a posture indicating a state of the femoral region and the buttock region, and the preparatory movement identification unit is configured to control the vehicle so as to turn the vehicle to a direction opposite to the direction of the posture change.

Thereby, turning direction of the vehicle can be controlled based on the preparatory movement made spontaneously by the driver before performing a steering operation by using a posture change in the femoral region and the buttock region of the driver, thus the vehicle can respond to the steering operation quickly.

Preferably, the posture measuring unit is configured to measure a posture indicating a state of the lumbar to back region above the pelvis, and the preparatory movement identification unit is configured to control the vehicle so as to turn the vehicle to a direction same as the direction of the posture change.

Thereby, turning direction of the vehicle can be controlled based on the preparatory movement made spontaneously by the driver before performing a steering operation by using a posture change in the lumbar to back region above the pelvis of the driver, thus the vehicle can respond to the steering operation quickly.

Preferably, the preparatory movement identification unit including: a posture change pattern storage unit configured to store a posture change pattern indicating characteristics of a posture change when the preparatory movement is made, and preparatory movement information for identifying a driving operation to be performed after the preparatory movement with the posture change pattern being associated with the preparatory movement information; and a posture change pattern comparison unit configured to compare the posture change pattern stored in the posture change pattern storage unit with the posture change detected by the posture change detection unit, and thereby to identify whether or not the posture change has been caused by a preparatory movement.

Thereby, the driving operation can be predicted using the posture change pattern stored by the storage unit, thus the accuracy in the prediction can be improved.

Preferably, the vehicle control device further includes a posture change pattern generation unit which is configured to generate a posture change pattern using the posture change detected by the posture change detection unit during a predetermined period before a driving operation, and to store the generated posture change pattern, and the driving operation with the generated posture change pattern being associated with the driving operation.

Thereby, the posture change pattern adapted to the driver can be generated by using the posture change at the time when the driver actually performs the preparatory movement, thus the accuracy in the prediction can be improved.

Preferably, the posture measuring unit is configured to measure the center-of-gravity position of the driver as the posture.

Thereby, the posture change which appears at the time of the preparatory movement for the driving operation can be detected using the center-of-gravity position of the driver.

Preferably, the posture measuring unit includes: three or more pressure sensors which are arranged on a seating surface of a seat on which the driver sits, and are configured to measure pressure on the seating surface; and a center-of-gravity-position calculation unit configured to calculate the center-of-gravity position of the pressure in the seating surface, as the center-of-gravity position of the driver, using the pressure measured by each of the pressure sensors.

Thereby, the center-of-gravity position of the driver can be measured using the pressure sensors arranged in the seating surface of the driver's seat, thus the measurement can be made without placing a burden on the driver such as attaching a sensor to the driver's body.

Preferably, the posture change detection unit is configured to detect a center-of-gravity shift vector which points from a normal center-of-gravity position to the center-of-gravity position measured by the posture measuring unit, the normal center-of-gravity position being the center-of-gravity position of the driver when no driving operation and no preparatory movement are made.

Thereby, the driving operation can be predicted by using the center-of-gravity shift vector which indicates a shift of center-of-gravity position from the center-of-gravity position in a normal state, thus the accuracy in the prediction of the driving operation can be improved.

Preferably, the vehicle control device further includes a normal center-of-gravity position calculation unit which is configured to calculate the normal center-of-gravity position using the center-of-gravity position which has been calculated by using pressure where no driving operation is performed for a predetermined period after the pressure is measured by each of the pressure sensors, wherein the posture change detection unit detects a center-of-gravity shift vector using the normal center-of-gravity position calculated by the normal center-of-gravity position calculation unit.

Thereby, normal center-of-gravity position which is adapted to the driver can be calculated, thus the accuracy in the prediction of the driving operation can be improved.

Preferably, the posture measuring unit includes multiple pressure sensors provided in at least one of a seat on which the driver sits and the floor in front of the seat, and is configured to measure a pressure distribution as the posture, the pressure distribution being measured by sais multiple pressure sensors.

Thereby, a posture change which appears in the preparatory movement for the driving operation can be detected by using the pressure distribution. Also, pressure distribution can be measured by using the pressure sensors arranged in the seating surface of the driver's seat and in the floor in front of the seat, thus the posture of the driver can be measured without placing a burden on the driver such as attaching a sensor to the driver's body.

Preferably, the posture change detection unit detects a pressure distribution change as the posture change, the pressure distribution change being a difference between the pressure distribution measured by the posture measuring unit, and normal pressure distribution which is pressure distribution observed when no driving operation and no preparatory movement are performed.

Thereby, the driving operation can be predicted by using the pressure difference from the pressure distribution in a normal state, thus the accuracy in the prediction of the driving operation can be improved.

Preferably, the vehicle control device further includes a normal pressure distribution calculation unit configured to calculate a normal pressure distribution by using pressure distribution where no driving operation is performed for a predetermined period after the pressure distribution is measured by the multiple pressure sensors, wherein the posture change detection unit detects a pressure distribution change by using the normal pressure distribution calculated by the normal pressure distribution calculation unit.

Thereby, normal pressure distribution which is adapted to the driver can be calculated, thus the accuracy in the prediction of the driving operation can be improved.

Preferably, the vehicle control device further includes a startle response detection unit configured to detect a startle response of the driver, and to decelerate the vehicle in the case where a startle response is detected, wherein in the case where the vehicle is decelerated due to a detection of the startle response, and it is identified by the preparatory movement identification unit that the posture change has been caused by the preparatory movement for the brake operation, the vehicle control unit expedites deceleration of the vehicle; and in the case where the vehicle is decelerated due to a detection of the startle response, and it is not identified by the preparatory movement identification unit that the posture change has been caused by the preparatory movement for the brake operation, the vehicle control unit stops deceleration of the vehicle.

Thereby, deceleration of the vehicle can be started quickly according to the startle response of the driver who has encountered an emergency situation. Also, the deceleration control based on startle response, and the deceleration control based on the preparatory movement can be operated in a cooperative manner so that an error in the deceleration control which has started based on a startle response can be corrected.

Preferably, the startle response detection unit detects a startle response based on the driver's grip pressure on a steering wheel.

Thereby, a startle response can be easily detected by using the driver's grip pressure on the steering wheel.

Preferably, the startle response detection unit detects a startle response by detecting the driver's pupil dilation.

Thereby, a startle response can be easily detected by using the driver's pupil dilation.

The present invention can be achieved not only as such a vehicle control device, but also as a vehicle control method including steps, each of which is defined by the operation of a featured component provided in the vehicle control device, or as a program which causes a computer to execute each of those steps. And it is needless to state that such a program can be distributed via recording media such as a CD-ROM, or via transmission media such as the Internet.

According to the present invention, the vehicle can be controlled based on the preparatory movement made spontaneously by the driver before performing a driving operation, thus the vehicle can respond to the driving operation quickly.

FURTHER INFORMATION ABOUT TECHNICAL BACKGROUND TO THIS APPLICATION

The disclosure of Japanese Patent Application No. 2009-208726 filed on Sep. 9, 2009 including specification, drawings and claims is incorporated herein by reference in its entirety.

The disclosure of PCT application No. PCT/JP2010/004470 filed on Jul. 9, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1B is a block diagram showing an exemplary overall configuration of a vehicle control device in Embodiment 1 of the present invention;

FIG. 2 is a diagram for illustrating preparatory movements;

DESCRIPTION OF THE PREFERRED EMBODIMENTS

Figure 1A:
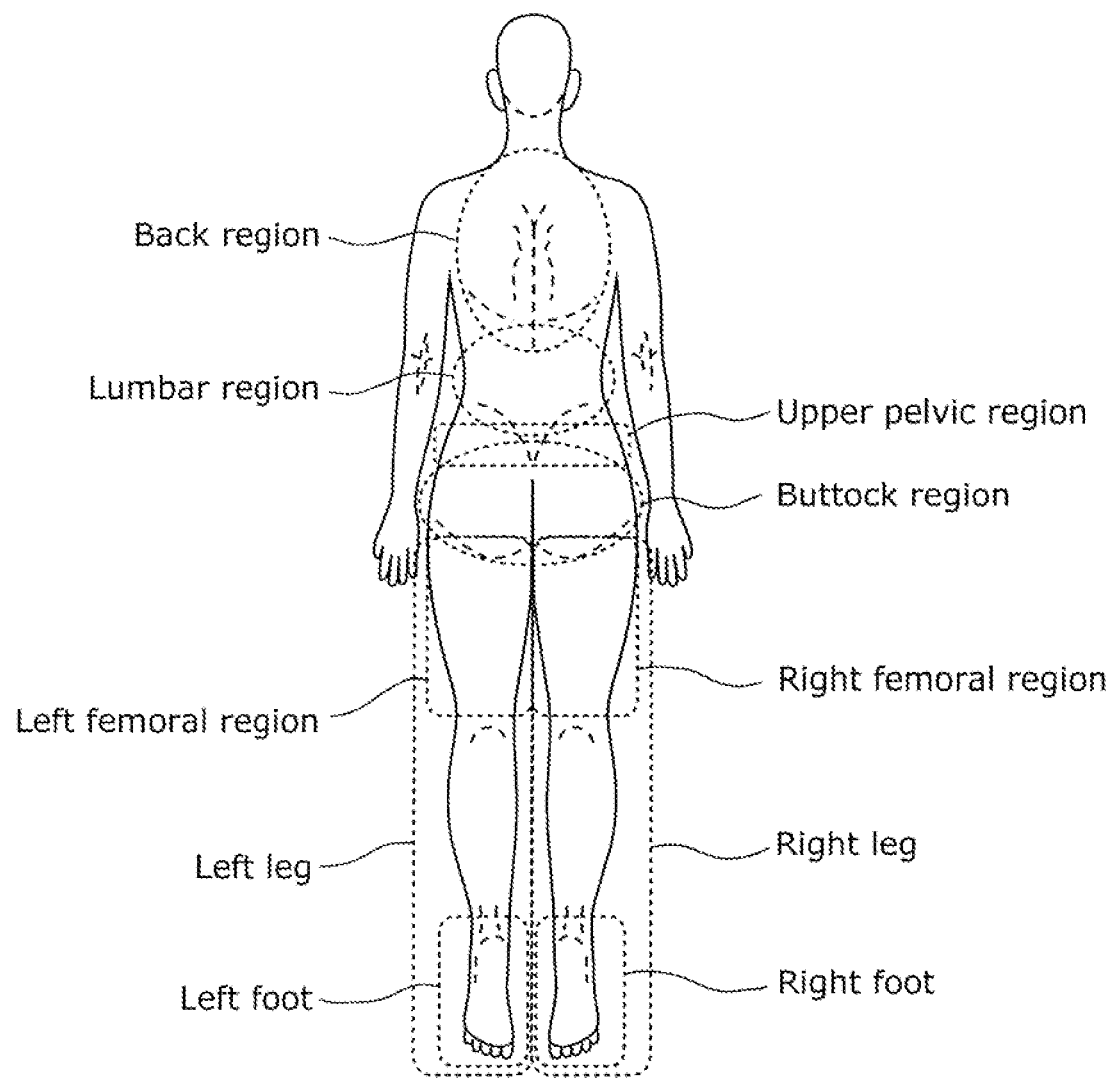
FIG. 1A is an illustration showing the terms for various body parts.

Hereinafter, the embodiments of the present invention are described in detail with reference to the drawings. In the description of the embodiments of the present invention, terms for body parts are used based on FIG. 1A. FIG. 1A is an illustration for explaining the terms for body parts, which shows a human-body as viewed from the back.

Embodiment 1

A vehicle control device 10 in Embodiment 1 of the present invention controls a vehicle according to preparatory movement of a driver, which occurs before an operation of the vehicle.

FIG. 1B is a block diagram showing an exemplary overall configuration of the vehicle control device in Embodiment 1 of the present invention. As shown in FIG. 1B, vehicle control device 10 includes a posture measuring unit 11, posture change detection unit 12, a preparatory movement identification unit 13, and a vehicle control unit 14.

The posture measuring unit 11 measures the posture indicating the state of other body parts different from the body parts, with which the driver performs driving operation. Specifically, the posture measuring unit 11 measures, for example, a posture indicating a state of at least one of the buttock region, the upper pelvic region, and one leg of the driver where the brake or acceleration is applied with the other leg of the driver. Alternatively, the posture measuring unit 11 may measure a posture indicating a state of at least one of the femoral region, the buttock region, and the lumbar to back region above the pelvis of the driver. In the present embodiment, the posture measuring unit 11 measures the center-of-gravity location of the driver obtained by measuring the pressure on the seating seat in contact with the buttock and femoral regions of the driver, the center-of-gravity location being a posture indicating the state of the buttock and femoral regions of the driver.

The driving operation herein means an operation consciously made by the driver to control the vehicle. Specifically, the driving operation includes a brake operation of depressing the brake pedal, leftward or rightward steering operation of turning the steering wheel to the left or right (hereinafter collectively referred to as "steering operation"), and an accelerator operation of depressing the accelerator pedal.

Also, the body part with which the driver performs a driving operation means the body part, with which the driver physically operates driving operation receiving means such as a brake pedal, an accelerator pedal, or a steering wheel. That is to say, in the case where a brake pedal or an accelerator pedal is operated, the body part with which the driver performs a driving operation is a leg (specifically, the foot, which is the end part of the leg). Also, in the case where a steering wheel is operated, the body part with which the driver performs a driving operation is a hand (or hands).

In the case where a driver actually performs a driving operation, there are several steps from the driver's decision making to a physical operation by the driver of driving operation receiving means such as a brake pedal, an accelerator pedal, or a steering wheel. For example, in the case where a decision of "step on the brake pedal" is made, the path of the right foot for stepping on the brake pedal is determined, then the movement of the right leg for achieving the orbit of the right foot is determined. When the movement of the right foot and the right leg is determined, in order to adjust the body posture to respond to the change of the weight balance of the body due to the movement of the right foot and the right leg, the motions of the back muscle group, abdominal muscle group for shifting the center-of-gravities of the back, lumbar, as well as the muscle group around the pelvis for adjusting the angle between the lumbar and each leg are determined. As the actual body motion, before the motion of the right foot and leg, the back muscle group, the abdominal muscle group, and the muscle group around the pelvis first move for posture adjustment to prepare for the motion of the right leg and foot. This motion takes place spontaneously. Next, the position of the right foot is changed by the motion of the right leg, then the decision made by the driver, i.e., "step on the brake pedal" is performed. As described above, in the case where a person makes a motion consciously, before the motion is made, there are two stages of movement: movement for posture adjustment which is made spontaneously, and movement made consciously. The movement for posture adjustment made spontaneously is often observed at a body part which is different from the body parts with which the person makes the motion consciously. Especially, in the case where conscious movement involves the limbs of a driver, such as driving operation, the driver's posture is maintained by movements centered around the soma which is the original region of the limbs, i.e., the trunk.

The posture change detection unit 12 detects a change in the posture measured by the posture measuring unit 11. Specifically, the posture change detection unit 12 detects a temporal and spatial change of the posture measured by the posture measuring unit 11 as a posture change.

The preparatory movement identification unit 13 identifies whether or not the posture change detected by the posture change detection unit 12 is caused by the preparatory movement for a driving operation (accelerator operation, brake operation, or steering operation). That is to say, the preparatory movement identification unit 13 identifies the preparatory movement for the driving operation using the posture change detected by the posture change detection unit 12, thereby predicts the driving operation followed by the preparatory movement. The preparatory movement for driving operation used herein (hereinafter simply referred to as "preparatory movement") indicates a movement of a driver to control his/her posture before the driver performs a driving operation. That is to say, the preparatory movement for driving operation is a movement which occurs concomitantly with a driving operation of the driver, and the movement is made spontaneously by the driver before performing the driving operation. The preparatory movement is described later using FIG. 2.

In the case where it is determined that a posture change is the preparatory movement for a driving operation, the vehicle control unit 14 controls the vehicle according to the preparatory movement. That is to say, the vehicle control unit 14, before controlling the vehicle according to the driving operation, controls the vehicle according to the driving operation predicted by the preparatory movement identification unit 13. Specifically, the vehicle control unit 14 controls the motion or state of the vehicle according to the predicted driving operation. More specifically, the vehicle control unit 14 controls, for example, the speed, travelling direction of the vehicle, or on/off status of various lamps provided in the vehicle according to the to predicted driving operation.

Hereinafter, the preparatory movement is described in detail using FIG. 2.

The preparatory movement indicates anticipatory postural control, which is defined as the movement of the body as the posture of a person is controlled before a motion of the person when the person tries to make the motion.

When a person stands on both legs and lifts the right leg, the person shifts the center-of-gravity of his/her body to the left leg before lifting the right leg so that the person does not fall. When such a motion is made, the postural control which is done anticipatorily before the motion in order to maintain the balance of the person's body is called the preparatory movement.

Such a preparatory movement is made spontaneously, and occurs approximately several hundreds milliseconds before the motion though depending on the body part to be used for the motion or the scale of the motion (for example, see Non-Patent Reference 1, Atsushi Fujita, "Undou Shihai no Seiri Shinri: Undou Hannou no Mekanizumu" (Physiological Psychology of Exercise Control: Mechanism of Exercise Response), Chapter 2, p 15-22, "Shin-ban Undou Shinri-gaku Nyumon" (New Edition—Introduction to Exercise Psychology) edited by Iwao Matsuda and Takashi Sugihara, Taishukan Shoten, Tokyo, 1987).

FIG. 2 is a graph for explaining the preparatory movement, which is the figure (FIG. 2-8) described in the Non-Patent Reference 1 supplemented with a description. In the Non-Patent Reference 1, FIG. 2 is described as follows: "selective reaction condition is set in such a manner that a subject makes a systemic high jump or a low jump according to a light stimulus of an upward or downward arrow randomly displayed on the right or left; a response curve indicating the change in the distortion of a jumping board caused by the subject's reaction, E.O.G. (electrooculogram) indicating the corneoretinal potential due to the eye movement of the subject, and E.M.G. (electromyogram) indicating the tension change in anterior tibial muscle and gastrocnemius muscle of the subject are simultaneously recorded on an oscillograph; and based on the recorded changes, the reaction times are classified as I: latency of eye movement, II: eye movement time, III: decision time, IV: muscle contraction time V: reaction time, VI: latency of leg flexion, or VII: jumping time."

As shown in the electromyogram (anterior tibial muscle and gastrocnemius muscle) in FIG. 2, anterior tibial muscle as one of the muscles of the shin moved before the movement of the gastrocnemius muscle, which is a muscle in the calf used for making a jump. That is to say, before the movement of the gastrocnemius muscle, which is a body part consciously used by a person to make a jump, the anterior tibial muscle which is different from the body part used for making a jump. In this manner, by contraction of the anterior tibial muscle, the center-of-gravity of the subject slightly shifted forward. That is to say, in order to maintain the balance against backward shift of the center-of-gravity caused by the contraction of the gastrocnemius, forward shift of the center-of-gravity is made as a preparatory movement.

The preparatory movement has been verified not only for the motion of the lower-body such as foot, but also the motion of the upper-body (for example, see Non-Patent Reference 2, Sandy Moore, Denis Brunt, Mary L. Nesbitt and Terl Juarez, "Investigation of Evidence for Anticipatory Postural Adjustments in Seated Subjects Who Performed a Reaching Task", Physical Therapy Vol. 72, (5), 1992, p 335-343).

The Non-Patent Reference 2 demonstrates that in a situation that a sitting subject straightens his/her arm, the external oblique muscle and the back muscle for maintaining the subject's posture are set in active several tens of milliseconds before the activity of the deltoid muscle used for straightening the arm starts.

Consequently, detection of such a preparatory movement for driving operation using the lower-body or the upper-body enables the prediction of the driving operation before the driving operation is performed.

Next, the details of each component shown in FIG. 1B are described.

Figure 3:
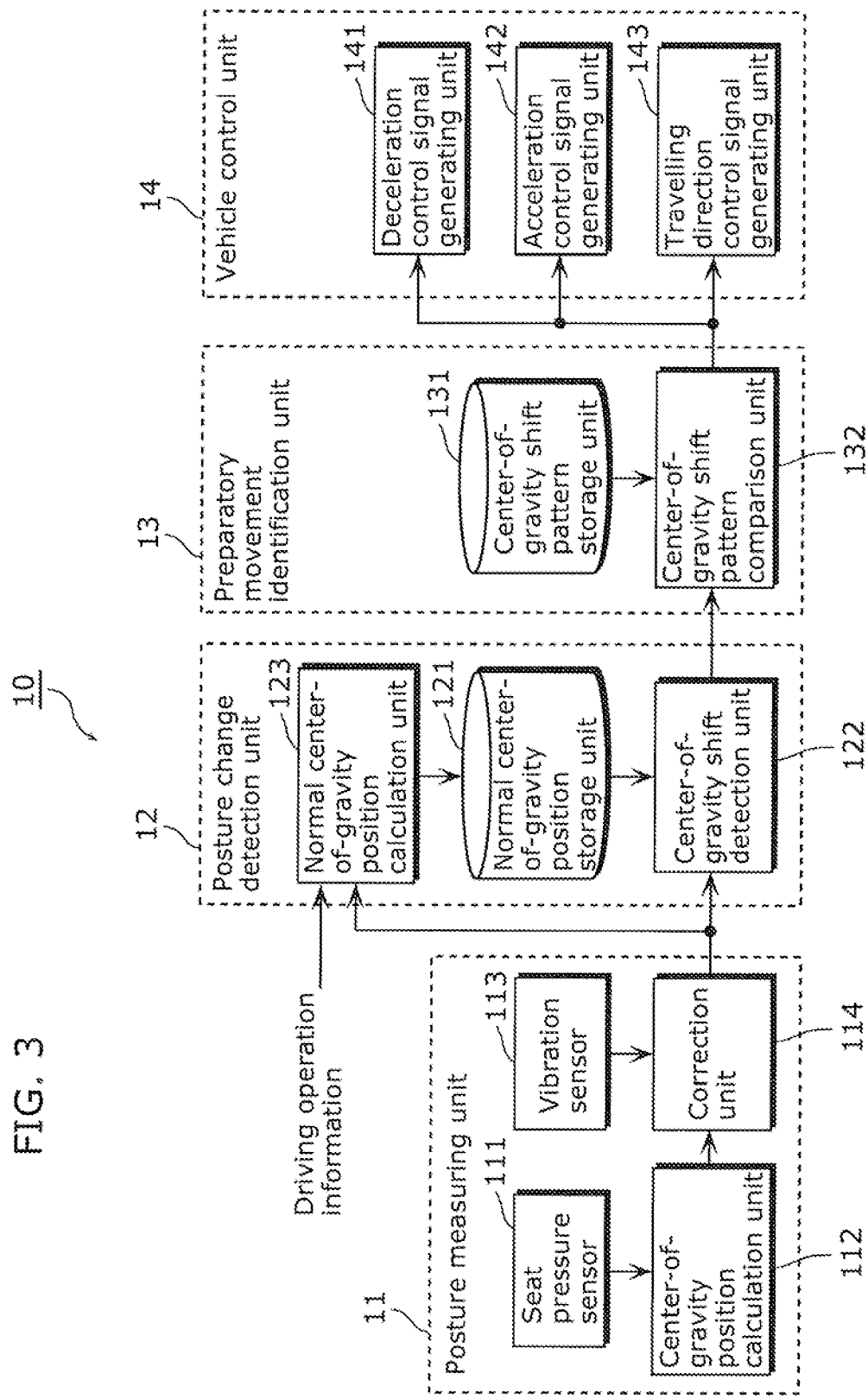
FIG. 3 is a block diagram showing an exemplary detailed configuration of the vehicle control device in Embodiment 1 of the present invention.

FIG. 3 is a block diagram showing an exemplary detailed configuration of the vehicle control device in Embodiment 1 of the present invention.

As shown in FIG. 3, the posture measuring unit 11 includes a seat pressure sensor 111, a center-of-gravity position calculation unit 112, a vibration sensor 113, and a correction unit 114. Also, the posture change detection unit 12 includes a normal center-of-gravity position storage unit 121, a center-of-gravity shift detection unit 122, and a normal center-of-gravity position calculation unit 123. Also, the preparatory movement identification unit 13 includes a center-of-gravity shift pattern storage unit 131 and a center-of-gravity shift pattern matching unit 132. The vehicle control unit 14 includes a deceleration control signal generating unit 141, an acceleration control signal generating unit 142, and a travelling direction control signal generating unit 143.

Four seat pressure sensors 111 are arranged at mutually different positions on the seating surface of the driver's seat. Also, each seat pressure sensor 111 measures the pressure applied to the seating surface by the driver. The arrangement of the seat pressure sensors 111 is described later using FIG. 4.

The center-of-gravity position calculation unit 112 calculates the center-of-gravity position of the pressures in the seating surface based on the pressure measured by each seat pressure sensor 111, and the position of each seat pressure sensor. Specifically, the center-of-gravity position calculation unit 112 calculates the coordinates of the position where the moments due to the pressures cancel out, as the center-of-gravity position coordinates, by using the pressure value measured by each seat pressure sensor 111, and the position coordinates indicating the position of each seat pressure sensor 111 on the seating surface.

The vibration sensor 113 measures the vibration of the vehicle which may affect the center-of-gravity position of the driver. Specifically, the vibration sensor 113 measures vehicle vibration vectors, for example, on a plane parallel to the seating surface of the seat.

The correction unit 114 corrects the center-of-gravity position calculated by the center-of-gravity-position calculation unit 112 based on the vibration of the vehicle measured by the vibration sensor 113. Specifically, the correction unit 114 shifts the center-of-gravity position according to the vector that cancels the vehicle vibration vector measured when the pressure is measured by the seat pressure sensor 111. Thereby, the correction unit 114 can remove the influence of the vibration of the vehicle from the center-of-gravity position of the driver.

The normal center-of-gravity position storage unit 121 stores the normal center-of-gravity position. The normal center-of-gravity position is the center-of-gravity position of the driver when the driver's posture is in a normal state. In other words, the normal center-of-gravity position is the center-of-gravity position of the driver when no driving operation and no preparatory movement are performed.

The center-of-gravity shift detection unit 122 detects a shift of the center-of-gravity position as a posture change. Specifically, the center-of-gravity shift detection unit 122 detects a center-of-gravity shift vector as a posture change, which points from the normal center-of-gravity position to the center-of-gravity position corrected by the correcting unit 114.

In the case where a driving operation is not performed for a predetermined period after the pressure is measured by each seat pressure sensor 111, the normal center-of-gravity position calculation unit 123 calculates the normal center-of-gravity position using the center-of-gravity position calculated in use of the measured pressures. In other words, the normal center-of-gravity position calculation unit 123 calculates the normal center-of-gravity position using the center-of-gravity position calculated in use of the pressures which have been measured in other than a predetermined period including the period in which the driver performs the driving operation.

Whether or not a driving operation has been performed is determined by acquiring information related to the driving operation of the driver (driving operation information) from the driving operation receiving means, the driving operation information being previously received by the driving operation receiving means. Also, the predetermined period is a such period that includes the period from the start of a preparatory movement until subsequent driving operation starts. This predetermined period may be determined so as to include the period from the start of a preparatory movement to the start of a driving operation, the period being obtained empirically or experimentally.

The center-of-gravity shift pattern storage unit 131 is an exemplary posture change pattern storage unit, and stores a center-of-gravity shift pattern and a preparatory movement information with the center-of-gravity shift pattern being associated with the preparatory movement information, the center-of-gravity shift pattern indicating the characteristics of the center-of-gravity shift vector as the preparatory movement is made, the preparatory movement information for identifying the driving operation performed after the preparatory movement. Specifically, the center-of-gravity shift pattern storage unit 131 stores a center-of-gravity shift pattern table 131a which stores center-of-gravity shift patterns and preparatory movement information with the center-of-gravity shift patterns being associated with the preparatory movement information. The center-of-gravity shift pattern table 131a is described later using FIG. 5.

The center-of-gravity shift pattern matching unit 132 is an exemplary posture change pattern checking unit. The center-of-gravity shift pattern matching unit 132 identifies the preparatory movement information by checking the center-of-gravity shift pattern stored by the center-of-gravity shift pattern storage unit 131, and the center-of-gravity shift vector detected by the center-of-gravity shift detection unit 122. Specifically, the center-of-gravity shift pattern matching unit 132 predicts a driving operation shown by the preparatory movement information, based on whether or not the center-of-gravity shift vector satisfies the conditions indicated by the center-of-gravity shift pattern.

The deceleration control signal generating unit 141 generates a deceleration control signal for decelerating the vehicle, and decelerates the vehicle. Specifically, the deceleration control signal generating unit 141 notifies the generated deceleration control signal, for example, to a braking device such as a disk brake, a drum brake, or a regeneration brake, and makes the braking device decelerate the vehicle. The braking device converts the deceleration control signal to a physical movement, for example, by using an actuator, and operates members for decelerating the vehicle.

The acceleration control signal generating unit 142 generates an acceleration control signal for accelerating the vehicle, and accelerates the vehicle. Specifically, the acceleration control signal generating unit 142 notifies the generated acceleration control signal, for example, to the engine to increase the amount of fuel supply to the engine cylinder.

The travelling direction control signal generating unit 143 generates a travelling direction control signal for changing the travelling direction of the vehicle, and changes the travelling direction of the vehicle. Specifically, the travelling direction control signal generating unit 143 notifies the generated travelling direction control signal, for example, to a steering device, and makes the steering device change the direction of the wheels.

Figure 4:
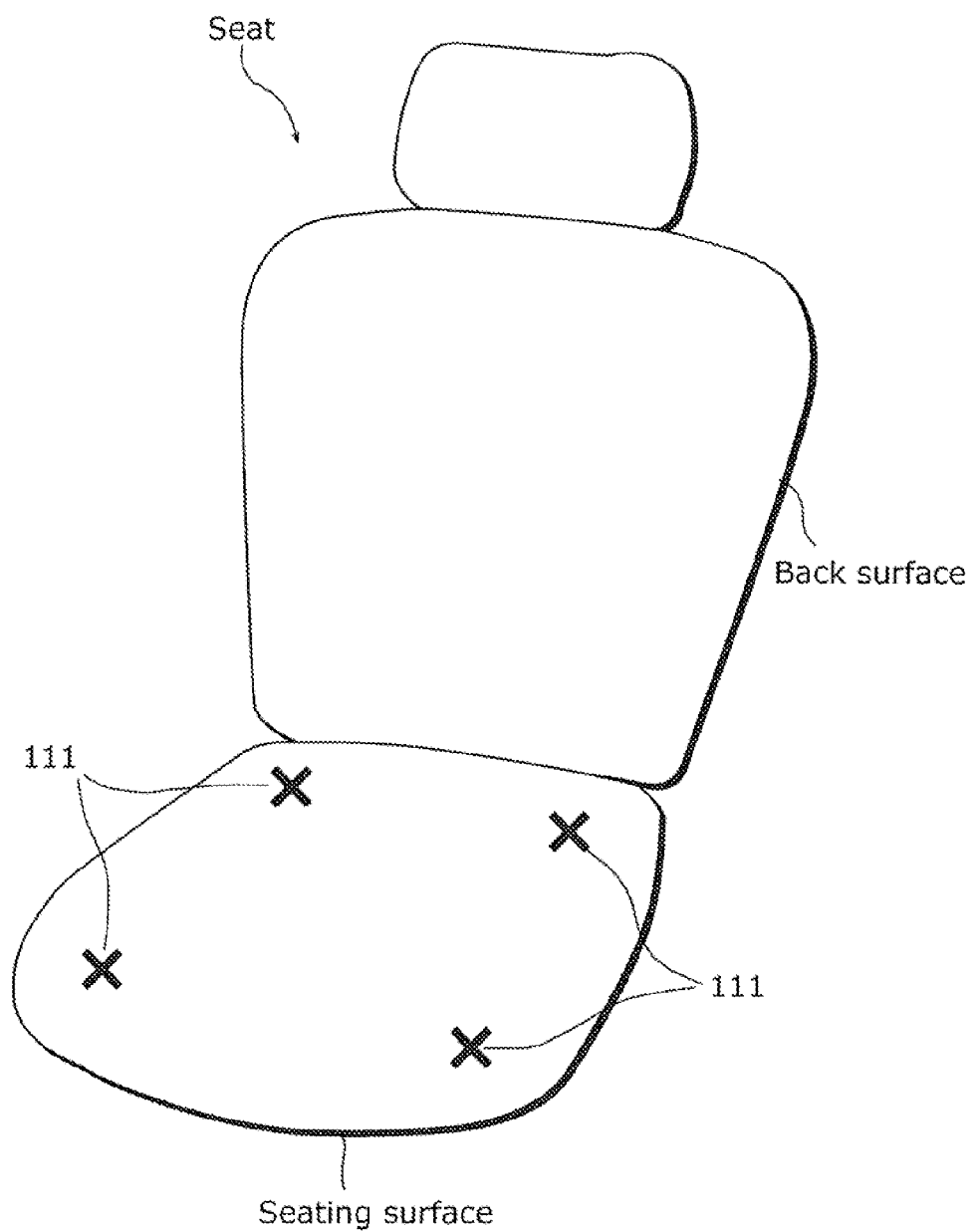
FIG. 4 is a diagram showing an exemplary arrangement of a seat pressure sensor in Embodiment 1 of the present invention.

FIG. 4 is a diagram showing an exemplary arrangement of the seat pressure sensor in Embodiment 1. As shown in FIG. 4, in the present embodiment, the seat pressure sensors 111 are arranged in the four corners of the seating surface of the seat.

In the present embodiment, although four seat pressure sensors 111 are installed on the seating surface of the seat, four seat pressure sensors 111 do not necessarily need to be installed. Three or more seat pressure sensors 111 may be installed where the number 3 enables the center-of-gravity position to be calculated.

In the present embodiment, although the seat pressure sensors 111 are arranged in the four corners of the seating surface of the seat, the seat pressure sensors 111 do not necessarily need to be arranged in the four corners. For example, the seat pressure sensors 111 may be arranged at the center of each side surrounding the seating surface.

Figure 5:
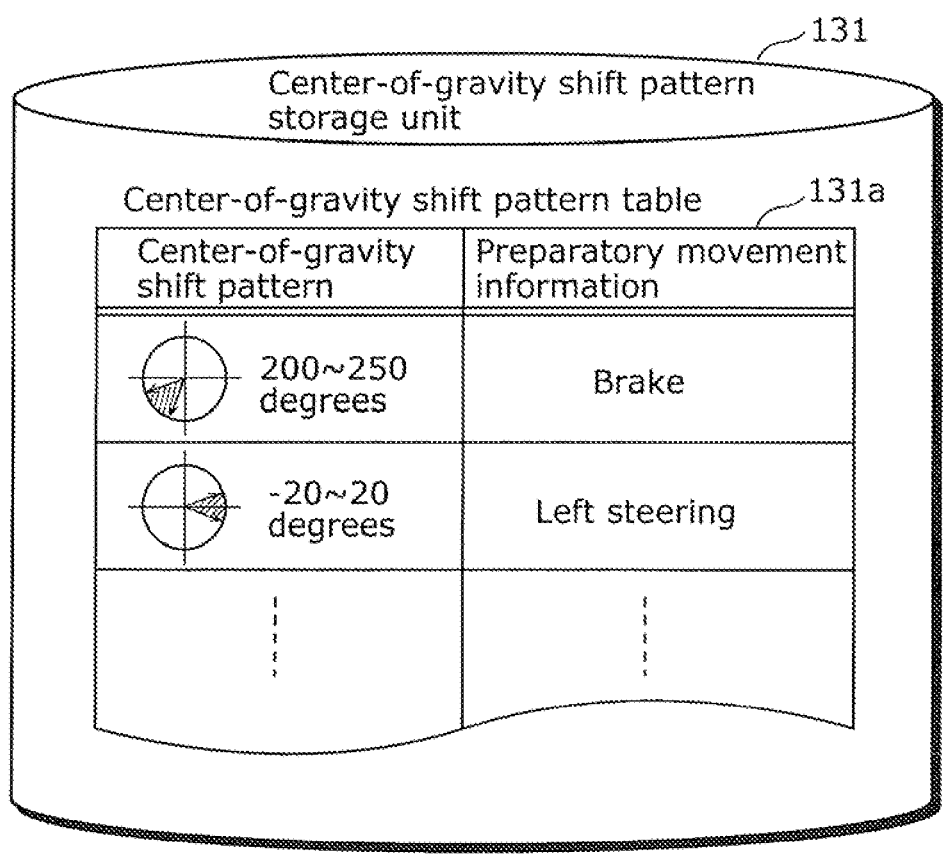
FIG. 5 is a table showing an exemplary center-of-gravity shift pattern table stored in a center-of-gravity shift pattern storage unit in Embodiment 1 of the present invention.

FIG. 5 is a table showing an exemplary center-of-gravity shift pattern table stored in a center-of-gravity shift pattern storage unit in Embodiment 1.

In the center-of-gravity shift pattern table 131*a* stored by the center-of-gravity shift pattern storage unit 131, the center-of-gravity shift pattern showing the characteristics of the center-of-gravity shift vector as preparatory movement is made, and the preparatory movement information for identifying the driving operation performed after the preparatory movement are stored with the center-of-gravity shift pattern being associated with the preparatory movement information. The preparatory movement information are, for example, "braking" indicating the driving operation of depressing the brake pedal, "right steering" or "left steering" indicating the driving operation of turning the steering wheel to the right or left, and "accelerating" indicating the driving operation of depressing the accelerator pedal.

For example, in the case where the direction of the center-of-gravity shift vector satisfies the condition for the angle range of "200 to 250 degrees", the center-of-gravity shift pattern table 131*a* shown in FIG. 5 indicates the preparatory movement for the driving operation of depressing the brake pedal.

Although the center-of-gravity shift pattern is the information for identifying the direction of the center-of-gravity shift vector in the above description, the invention is not limited to this case. For example, the center-of-gravity shift pattern may be the information for identifying the direction and size of the center-of-gravity shift vector.

Next, the vehicle control method performed by the vehicle control device 10 configured as described above is described.

Figure 6:
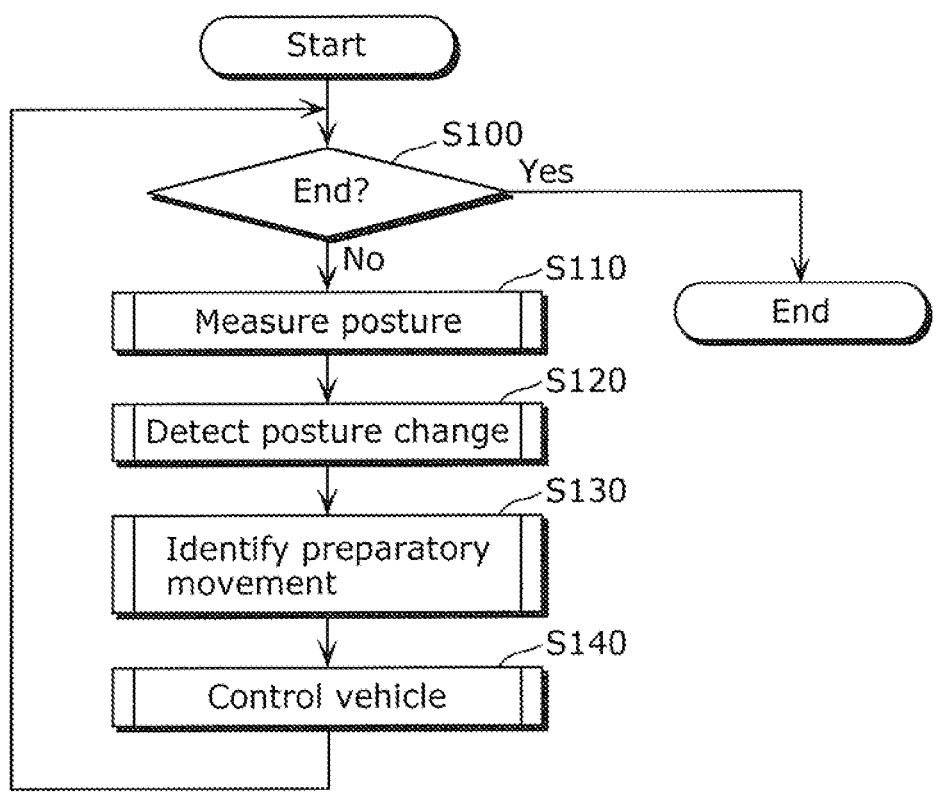
FIG. 6 is a flowchart showing an exemplary operation of the vehicle control device in Embodiment 1 of the present invention.

FIG. 6 is a flowchart showing an exemplary operation of the vehicle control device in Embodiment 1.

First, the vehicle control device 10 starts the operation when the driver sits down on the seat and starts the vehicle. The vehicle control device 10 then determines whether or not there is a termination signal to stop the engine (S100). In case where there is a termination signal (Yes in S100), the vehicle control device 10 terminates its operation.

On the other hand, in the case where there is no termination signal (No in S100), the posture measuring unit 11 measures the posture indicating the state of other body parts different from the body parts, with which the driver performs driving operation (S110). The posture measuring unit 11 then outputs the information related to the measured posture to the posture change detection unit 12.

Subsequently, the posture change detection unit 12 detects a change in the measured posture (S120). The posture change detection unit 12 then outputs the information related to the detected posture change to the preparatory movement identification unit 13.

Next, the preparatory movement identification unit 13 identifies the preparatory movement for the driving operation using the detected posture change, thereby predicts the driving operation followed by the preparatory movement (S130). The preparatory movement identification unit 13 then outputs the information related to the predicted driving operation to the vehicle control unit 14.

Finally, the vehicle control unit 14 controls the vehicle according to the predicted driving operation (S140).

As described above, the vehicle control device 10 predicts the driving operation of the driver currently driving the vehicle and successively generates the control signals for performing vehicle control by repeating a series of operations from step S100 to S140.

Next, the details of the processing in each step of the flowchart shown in FIG. 6 are described using FIGS. 7 to 11. First, the details of a posture measurement step (S110) are described using FIG. 7.

Figure 7:
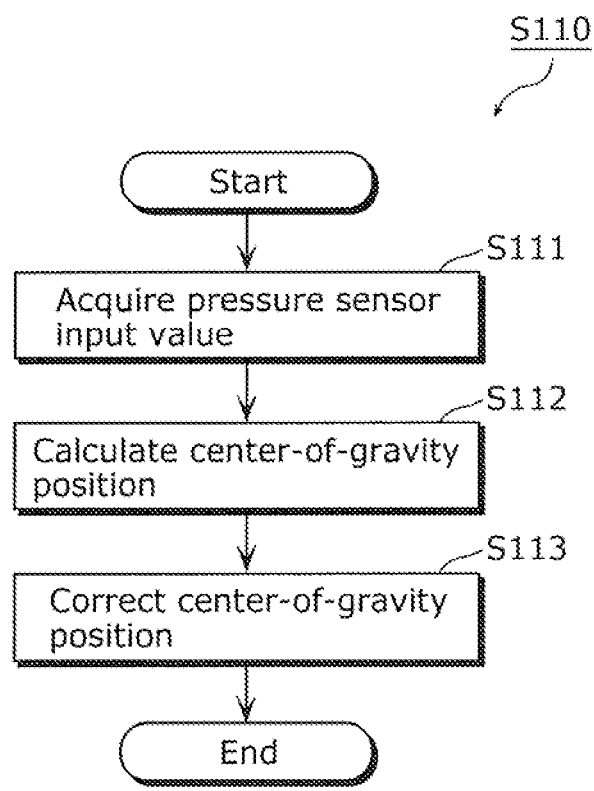
FIG. 7 is a flowchart showing an exemplary detailed process flow of a posture measurement step in Embodiment 1 of the present invention.

FIG. 7 is a flowchart showing an exemplary detailed process flow of the posture measurement step in Embodiment 1.

First, the center-of-gravity position calculation unit 112 acquires the input value (pressure data) of each seat pressure sensor 111 (S111). Next, the center-of-gravity position calculation unit 112 calculates the center-of-gravity position from the acquired input value and the distances between pressure measurement points (S112), and outputs the calculated position to the correcting unit 114.

Subsequently, the correcting unit 114 corrects the center-of-gravity position calculated by the center-of-gravity position calculation unit 112 using the vehicle vibration vector measured by the vibration sensor 113 (S113). Specifically, the correcting unit 114 corrects the center-of-gravity position by shifting the center-of-gravity position in the direction and by the magnitude of the vector that cancels the measured vehicle vibration vector.

As described above, the posture measuring unit 11 executes each process from step S111 to step S113 to measure the center-of-gravity position as the driver's posture with the influence of the vibration of the vehicle being removed.

Figure 8:
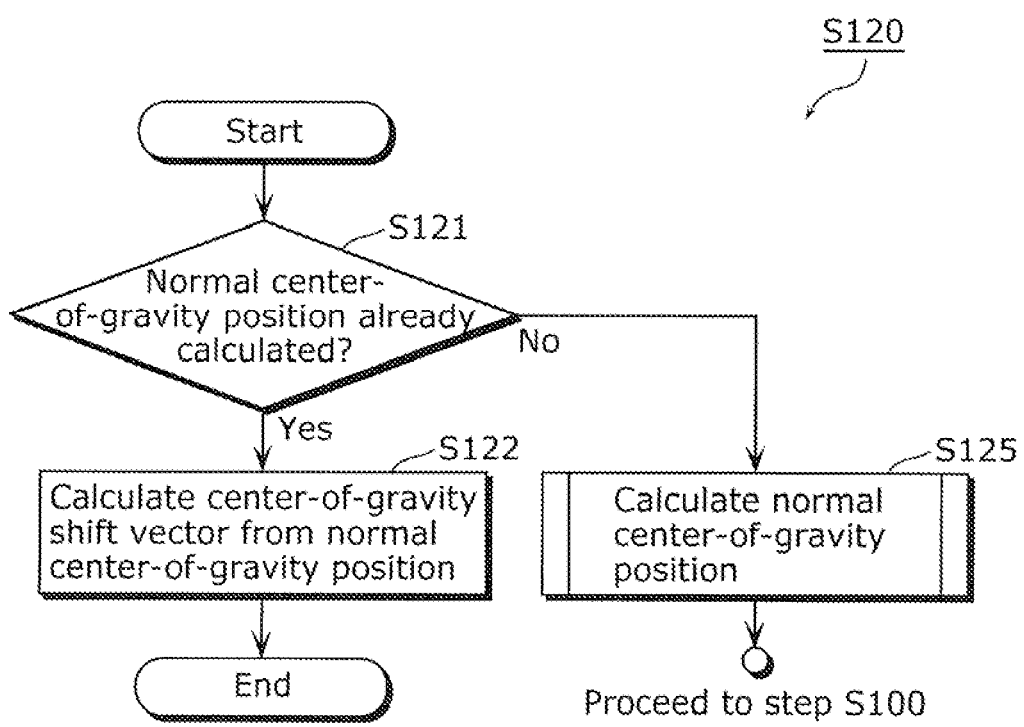
FIG. 8 is a flowchart showing an exemplary detailed process flow of a posture change detection step in Embodiment 1 of the present invention.

Next, the details of the posture change detection step (S120) shown in FIG. 6 are described using FIG. 8.

FIG. 8 is a flowchart showing an exemplary detailed process flow of the posture change detection step in Embodiment 1.

First, the normal center-of-gravity position calculation unit 123 determines whether or not the current driver's normal center-of-gravity position is stored by the normal center-of-gravity position storage unit 121 (S121). In the case where the current driver's normal center-of-gravity position is stored by the normal center-of-gravity position storage unit 121 (Yes in S121), the center-of-gravity shift detection unit 122 calculates the center-of-gravity shift vector which points from the current driver's normal center-of-gravity position stored in the normal center-of-gravity position storage unit 121 to the center-of-gravity position measured in step S110 (S122).

On the other hand, in the case where the current driver's normal center-of-gravity position is not stored by the normal center-of-gravity position storage unit 121 (No in S121), the normal center-of-gravity position calculation unit 123 calculates the normal center-of-gravity position adapted to the current driver (S125).

As described above, the posture change detection unit 12 executes each process from step S121 to step S125 to detect the center-of-gravity shift vector as a posture change where the center-of-gravity shift vector points from the normal center-of-gravity position to the measured center-of-gravity position.

Figure 9:
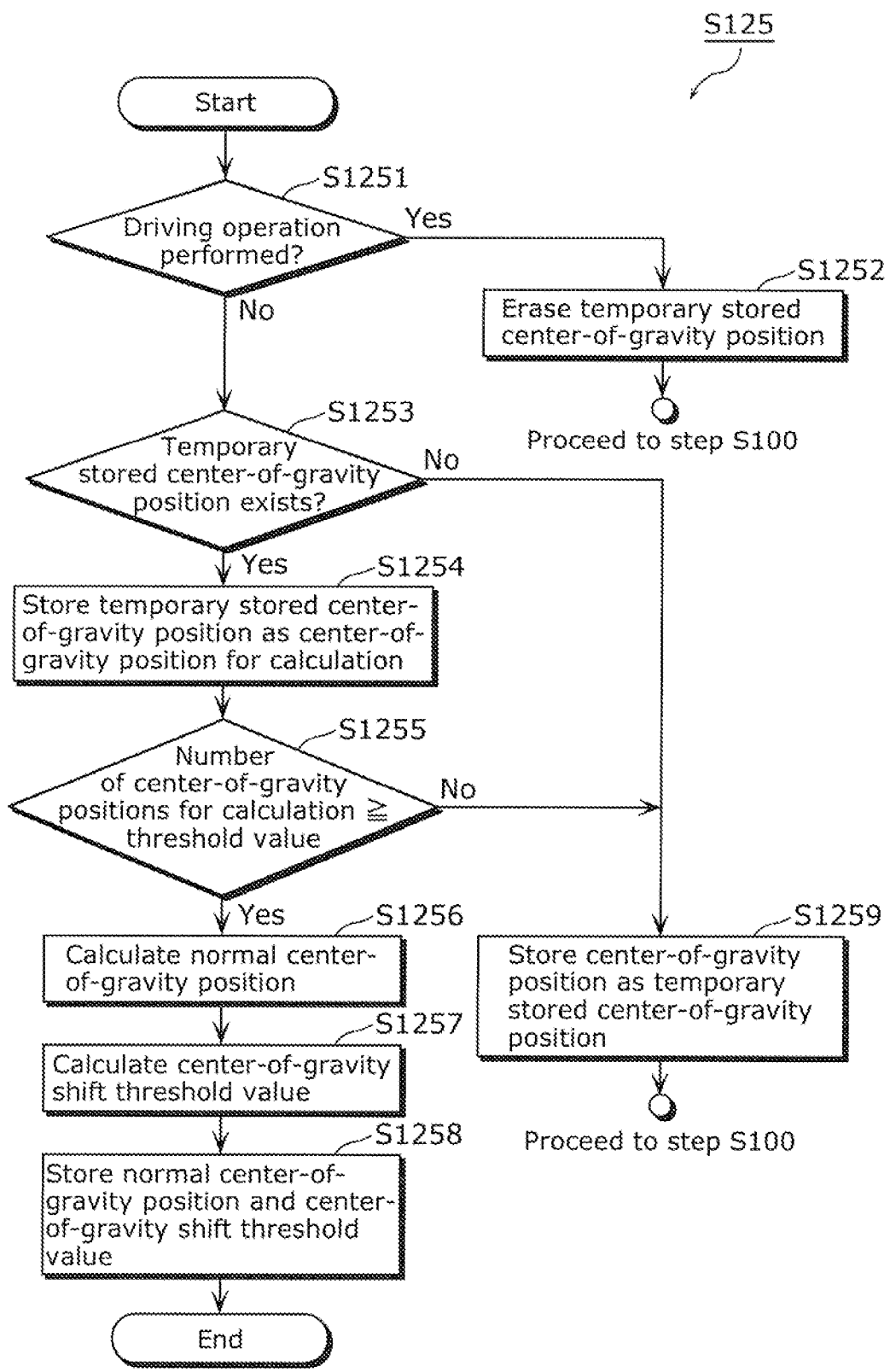
FIG. 9 is a flowchart showing an exemplary detailed process flow of a normal center-of-gravity position calculation step in Embodiment 1 of the present invention.

Next, the details of a normal center-of-gravity position calculation step (S125) shown in FIG. 8 are described using FIG. 9.

FIG. 9 is a flowchart showing an exemplary detailed process flow of the normal center-of-gravity position calculation step in Embodiment 1.

First, the normal center-of-gravity position calculation unit 123 determines whether or not a driving operation is being performed based on the acquired operation information from, for example, the driving operation receiving means such as a steering wheel, a brake, or an accelerator (S1251).

In the case where a driving operation is performed (Yes in S1251), the normal center-of-gravity position calculation unit 123 erases the temporary center-of-gravity position stored in the normal center-of-gravity position storage unit 121 (S1252), and returns to step S100. On the other hand, in the case where a driving operation is not performed (No in S1251), the normal center-of-gravity position calculation unit 123 determines whether or not the temporary storage center-of-gravity position is stored in the normal center-of-gravity position storage unit 121 (S1253).

In the case where the temporary storage center-of-gravity position is not stored (No in S1253), the normal center-of-gravity position calculation unit 123 stores the center-of-gravity position measured in step S100 into the normal center-of-gravity position storage unit 121 as a temporary storage center-of-gravity position (S1259), and returns to step S100.

On the other hand, in the case where the temporary storage center-of-gravity position is stored (Yes in S1253), the normal center-of-gravity position calculation unit 123 stores the temporary storage center-of-gravity position stored in the normal center-of-gravity position storage unit 121 into the normal center-of-gravity position storage unit 121 as a center-of-gravity position for calculation (S1254). That is to say, in the case where any driving operation is not performed in the period from the last pressure measurement to the current pressure measurement, the normal center-of-gravity position calculation unit 123 stores the center-of-gravity position calculated using the pressures measured last time, as a center-of-gravity position for a calculation, into the normal center-of-gravity position storage unit 121.

Next, the normal center-of-gravity position calculation unit 123 determines whether or not the number of center-of-gravity positions for calculation stored in the normal center-of-gravity position storage unit 121 is greater than or equal to a predetermined number (S1255). The predetermined number is the number of center-of-gravity positions for calculation, which is needed to calculate the current driver's normal center-of-gravity position. Specifically, the predetermined number is a natural number such as "20", for example.

In the case where the number of center-of-gravity positions for calculation is less than the predetermined number (No in S1255), the normal center-of-gravity position calculation unit 123 stores the center-of-gravity position measured in step S100 into the normal center-of-gravity position storage unit 121 as a temporary storage center-of-gravity position (S1259), and returns to step S100.

On the other hand, in the case where the number of center-of-gravity positions for calculation is greater than or equal to the predetermined number (Yes in S1255), the normal center-of-gravity position calculation unit 123 calculates an averaged position of the center-of-gravity positions for calculation as a normal center-of-gravity position (S1256). Furthermore, the normal center-of-gravity position calculation unit 123 calculates the distance between each center-of-gravity position for calculation and the normal center-of-gravity position defines 75% of the distribution of the calculated distances as the center-of-gravity shift threshold value (S1257). For example, in the case where the predetermined number is "20", the normal center-of-gravity position calculation unit 123 calculates the distance between each of the 20 center-of-gravity positions for calculation and the normal center-of-gravity position. The normal center-of-gravity position calculation unit 123 then determines the distance in the middle of the 15th and 16th distance of calculated distances as the center-of-gravity shift threshold value where the calculated distances are arranged in the increasing order.

Next, the normal center-of-gravity position calculation unit 123 stores the normal center-of-gravity position calculated in step S1256, and the center-of-gravity shift threshold value determined in step S1257 into the normal center-of-gravity position storage unit 121 (S1258).

Although the case where the number of center-of-gravity positions for calculation needed to calculate the normal center-of-gravity position is 20 has been described, the number may be other than 20 as long as it is not less than 1. Greater the number of center-of-gravity positions for calculation, higher the reliability of the normal center-of-gravity position.

The normal center-of-gravity position calculation unit 123 calculates the average of the center-of-gravity positions for calculation as the normal center-of-gravity position in the above, however may calculate a representative value other than the average, such as the median, the mode as the normal center-of-gravity position. Also, the normal center-of-gravity position calculation unit 123 defines 75% of the distribution of the calculated distances as the center-of-gravity shift threshold value, however, may define the center-of-gravity shift threshold value using other reference values such as a standard deviation.

As described above, the normal center-of-gravity position calculation unit 123 executes each process from step S1251 to step S1258 to set the normal center-of-gravity position that is adapted to the current driver.

The calculation of these normal center-of-gravity positions is performed for a predetermined cycle, for example, 50 times per second. That is to say, a loop processing of repeating step S125 and step S100 is executed in a predetermined cycle. It is preferable that this cycle approximately matches the cycle from the start of a preparatory movement until a driving operation is performed. Thereby, in another cycle preceding a cycle in which the driving operation is acquired, the preparatory movement is made. That is to say, another cycle preceding a cycle in which no driving operation is acquired corresponds to a normal state.

Figure 10:
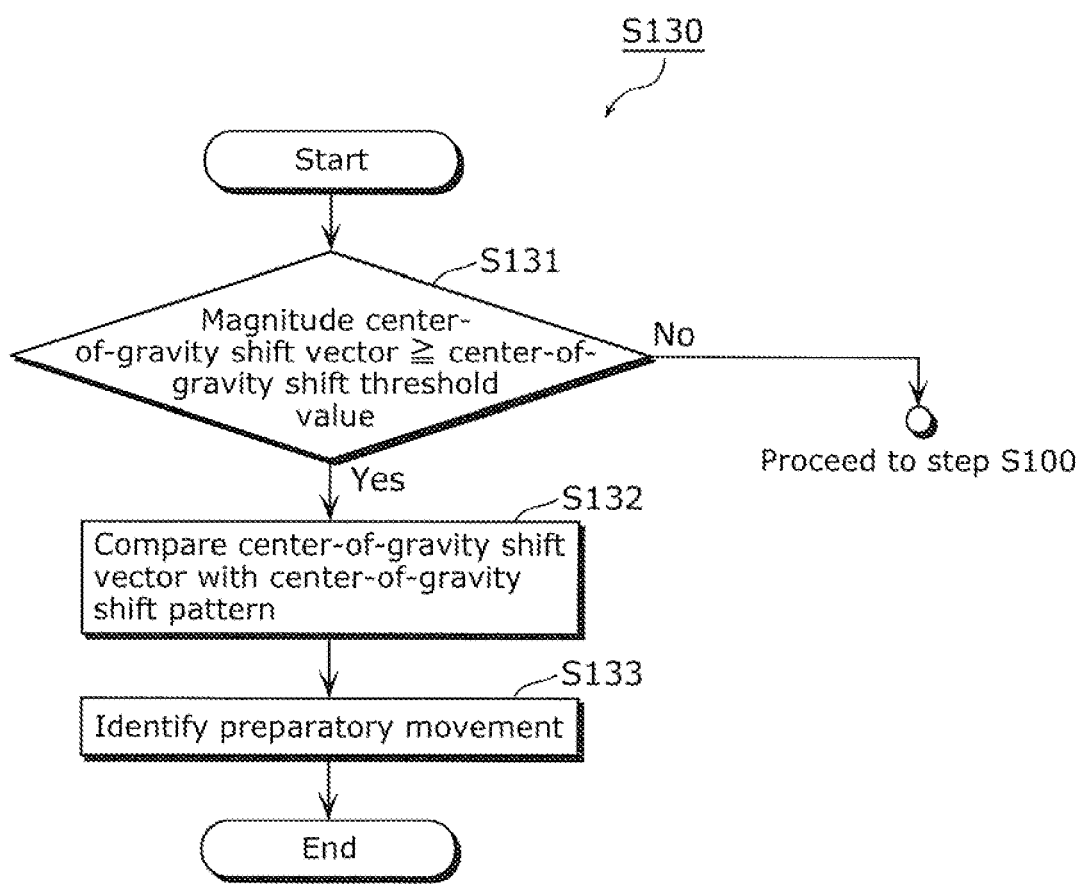
FIG. 10 is a flowchart showing an exemplary detailed process flow of a preparatory movement identification step in Embodiment 1 of the present invention.

Next, the details of the preparatory movement identification step (S130) shown in FIG. 6 are described using FIG. 10.

FIG. 10 is a flowchart showing an exemplary detailed process flow of the preparatory movement identification step in Embodiment 1.

First, the center-of-gravity shift pattern comparison unit 132 determines whether or not the magnitude of the center-of-gravity shift vector is greater than or equal to the center-of-gravity shift threshold value stored in the normal center-of-gravity position storage unit 121 (S131). In the case where the magnitude of the center-of-gravity shift vector is less than the center-of-gravity shift threshold value (No in S131), the flow returns to step S100.

On the other hand, in the case where the magnitude of the center-of-gravity shift vector is greater than or equal to the center-of-gravity shift threshold value (Yes in S131), the center-of-gravity shift pattern-comparison unit 132 compares the center-of-gravity shift vector calculated in step S122 with the center-of-gravity shift pattern stored in the center-of-gravity shift pattern storage unit 131 (S132).

Specifically, the center-of-gravity shift pattern comparison unit 132 calculates, for example, the angle indicating the direction of the center-of-gravity shift vector. The center-of-gravity shift pattern comparison unit 132 then checks whether or not the calculated angle is included in the angle range shown in the center-of-gravity shift pattern.

Subsequently, the center-of-gravity shift pattern comparison unit 132 identifies the preparatory movement performed preceding the driving operation based on the checking result, and outputs the identified preparatory movement to the vehicle control unit 14 (S133). Specifically, for example, using the checking result, the center-of-gravity shift pattern comparison unit 132 identifies the preparatory movement information corresponding to the center-of-gravity shift pattern whose angle range includes the calculated angle, thereby predicts the driving operation to be performed after the preparatory movement. That is to say, the center-of-gravity shift pattern comparison unit 132 determines whether or not the center-of-gravity shift vector satisfies the predetermined condition indicated by the center-of-gravity shift pattern, thus determines whether or not the center-of-gravity shift vector is caused by a preparatory movement for the driving operation, while identifying the preparatory movement as one of the accelerator operation, the brake operation, and the steering operation.

For example, in the case where the angle calculated is "220 degrees", the center-of-gravity shift pattern comparison unit 132 identifies the preparatory movement information "brake" corresponding to the center-of-gravity shift pattern whose angle range is "200 to 250 degrees" by referring to the center-of-gravity shift pattern table 131a shown in FIG. 5. That is to say, the center-of-gravity shift pattern comparison unit 132 predicts the driving operation "brake" using the angle "220 degrees" showing the direction of the center-of-gravity shift vector.

As described above, the preparatory movement identification unit 13 executes each process from step S131 to step S133 to identify the preparatory movement of the driving operation using the posture change detected by the posture change detection unit 12, thus predicts the driving operation. Specifically, the preparatory movement identification unit 13 determines whether or not the detected posture change is caused by the preparatory movement for one of the accelerator operation, the brake operation, and the steering operation based on the predetermined condition.

Figure 11:
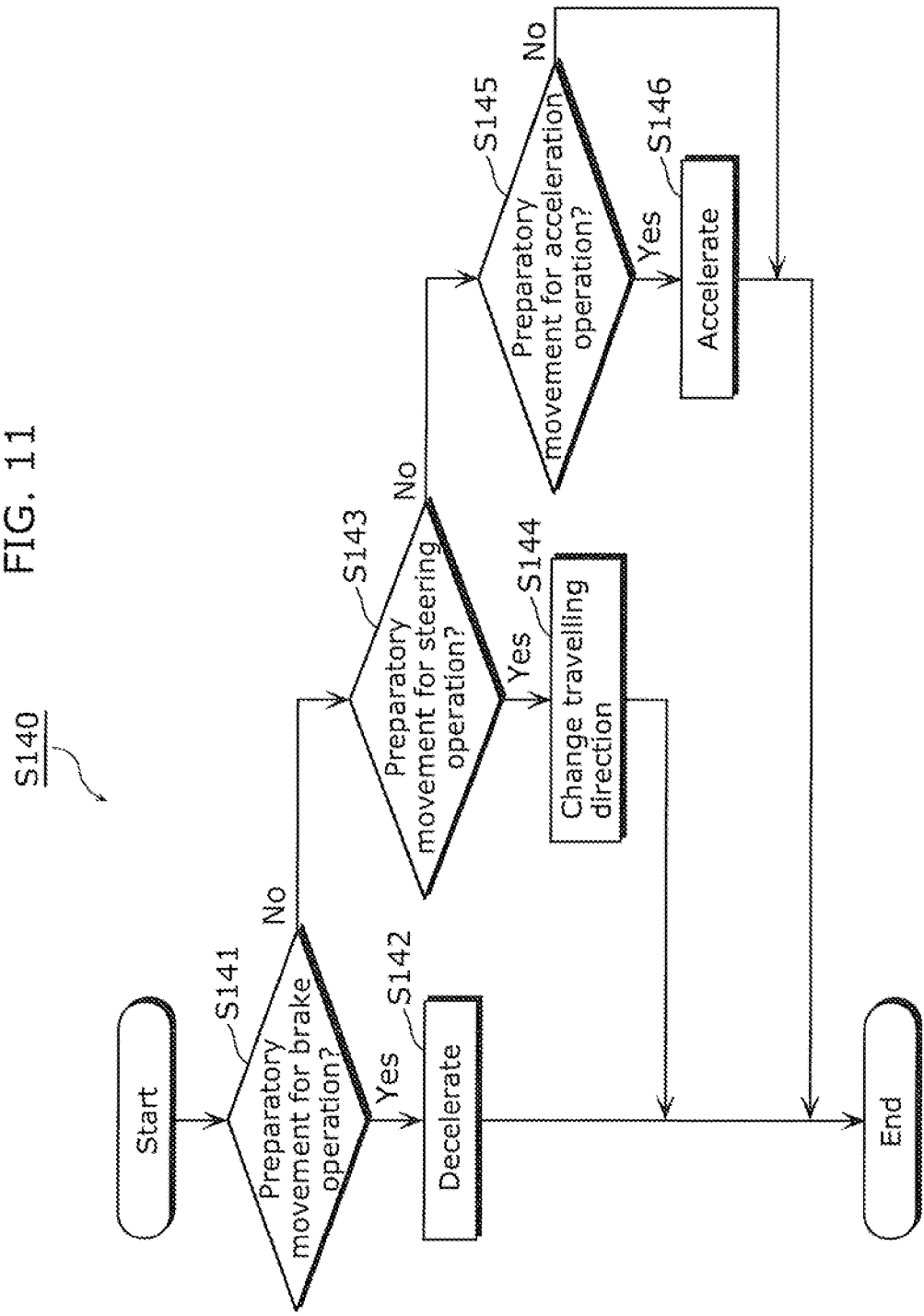
FIG. 11 is a flowchart showing an exemplary detailed process flow of a vehicle control step in Embodiment 1 of the present invention.

Next, the details of the vehicle control step (S140) shown in FIG. 6 are described using FIG. 11.

FIG. 10 is a flowchart showing an exemplary detailed process flow of the vehicle control step in Embodiment 1.

First, the deceleration control signal generating unit 141 determines whether or not the preparatory movement identified in step S130 is the preparatory movement for the brake operation (S141). In the case where the preparatory movement identified in step S130 is the preparatory movement for the brake operation (Yes in S141), the deceleration control signal generating unit 141 generates a deceleration control signal for decelerating the vehicle, and decelerates the vehicle (S142). The vehicle control unit 14 then executes the process in the vehicle control step.

On the other hand, in the case where the preparatory movement identified in step S130 is not the preparatory movement for the brake operation (No in S141), the travelling direction control signal generating unit 143 determines whether or not the preparatory movement identified in step S130 is the preparatory movement for the steering operation (S143). In the case where the preparatory movement identified in step S130 is the preparatory movement for the steering operation (Yes in S141), the travelling direction control signal generating unit 143 generates the travelling direction control signal for changing the travelling direction of the vehicle, then changes the travelling direction (S144). The vehicle control unit 14 then executes the process in the vehicle control step.

On the other hand, in the case where the preparatory movement identified in step S130 is not the preparatory movement for the steering operation (No in S143), the acceleration control signal generating unit 142 determines whether or not the preparatory movement identified in step S130 is the preparatory movement for the accelerator operation (S145). In the case where the preparatory movement identified in step S130 is the preparatory movement for the accelerator operation (Yes in S145), the acceleration control signal generating unit 142 generates a acceleration control signal for accelerating the vehicle, and accelerates the vehicle (S146). The vehicle control unit 14 then executes the process in the vehicle control step.

On the other hand, in the case where the preparatory movement identified in step S130 is not the preparatory movement for the acceleration operation (No in S145), the vehicle control unit 14 executes the process in the vehicle control step.

As described above, the vehicle control unit 14 executes each process from step S141 to step S146 to generate a control signal for controlling the vehicle according to the preparatory movement identified by the preparatory movement identification unit 13.

Figure 12:
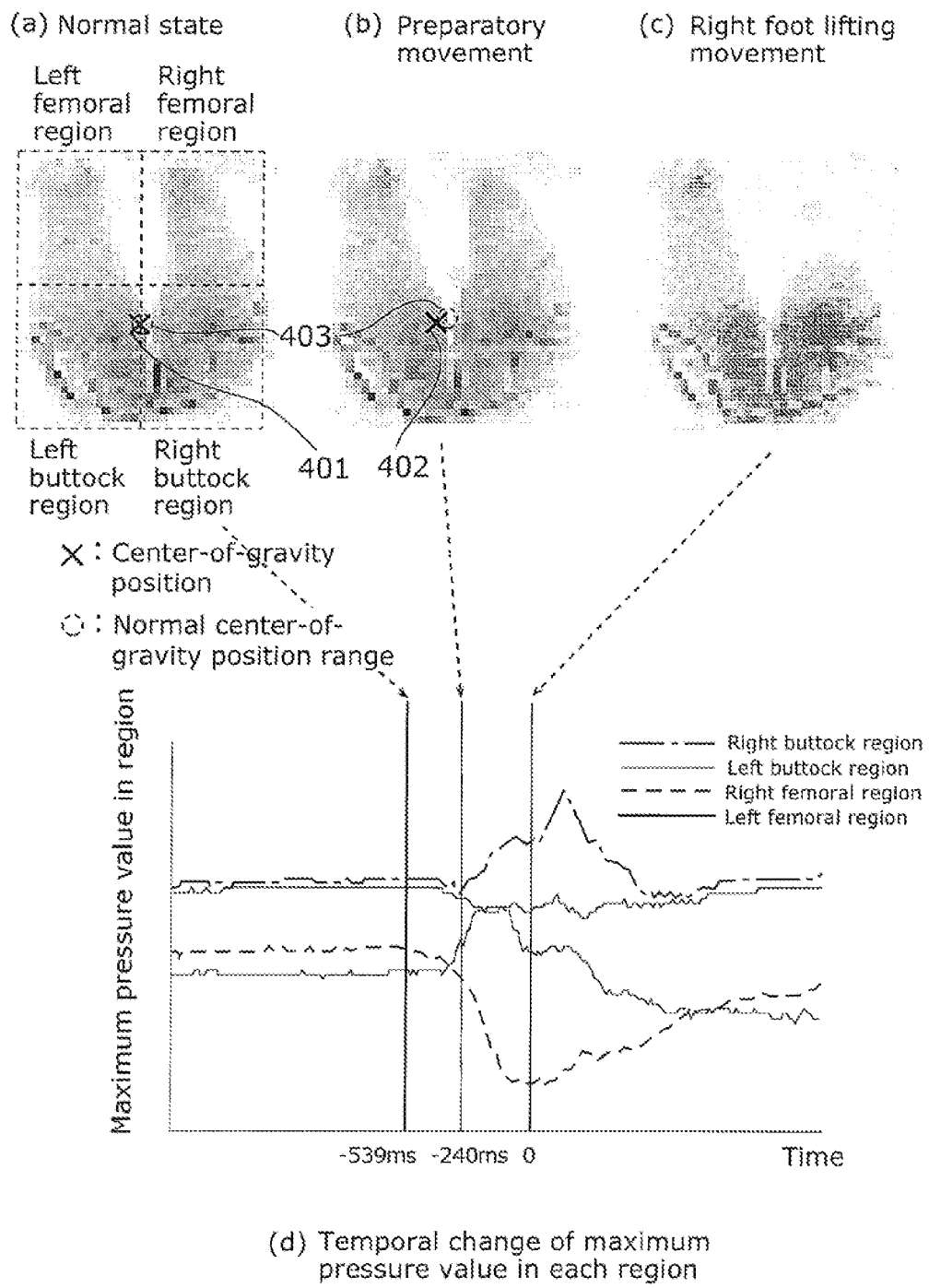
FIG. 12 is a graph showing an exemplary experimental result of preparatory movement when a driver applies brakes.

Next, the experimental results related to the preparatory movement as a driver performs a driving operation are described using FIG. 12.

FIG. 12 is a graph showing an exemplary experimental result of preparatory movement when a driver applies brakes. In FIG. 12, (a) is an image showing the pressure distribution in a normal state; (b) is an image showing the pressure distribution at the time of a preparatory movement; and (c) is an image showing the pressure distribution when the driver lifts the right foot (hereinafter referred to as "right foot lifting movement"). Also, (d) is a graph showing the temporal change of the maximum pressure in the regions corresponding to the right femoral region, the left femoral region, the right buttock region, and the left buttock region.

The center-of-gravity position 401 shows the center-of-gravity position in a normal state 539 ms before the start of the right foot lifting movement. Also, the center-of-gravity position 402 shows the center-of-gravity position at the time of a preparatory movement 240 ms before the start of the right foot lifting movement. Also, the normal center-of-gravity position range 403 shows the range in which the center-of-gravity position in a normal state exists. Specifically, the normal center-of-gravity position range 403 is the inside area of the circle whose center is the normal center-of-gravity position, and whose radius is the center-of-gravity shift threshold value.

The driver lifts the right foot and moves the foot above the brake pedal to depress the brake pedal. At this point, to maintain the body balance when the right foot is lifted, the driver performs the preparatory movement of shifting the driver's center-of-gravity to the left foot side before lifting the right foot. FIG. 12(b) shows that such a preparatory movement is made 240 ms before the time when the right foot is lifted.

As shown in FIG. 12(b), at the time of the preparatory movement, the pressure of the left front femoral region is higher than the pressure in a normal state due to the movement of stepping down the right foot. At the same time, the pressure of the right femoral region is decreased and the pressure of the entire buttock region is increased compared to the pressure in a normal state. Because of the increase in the pressure of the left femoral region due to pressing down of the left foot, and the increase in pressure of the entire buttock region caused by a shift of the trunk backward, the center-of-gravity position calculated from the pressure distribution is shifted to the left backward like the center-of-gravity position 402 shown in FIG. 12(b).

Because of the preparatory movement, as shown in FIG. 12(c), the right foot lifting is performed, and even when the load of the right side body is focused on the right buttock region, the driver can maintain its posture.

A driver's center-of-gravity position is moved to the left backward exceeding the range of the normal center-of-gravity position 240 ms before the right foot is lifted. Specifically, the driver's center-of-gravity position is moved from the center-of-gravity position 401 shown in FIG. 12(a) to the center-of-gravity position 402 shown in FIG. 12(b). The posture-change detection unit 12 detects, as a center-of-gravity shift vector, the vector pointing to the center-of-gravity position 402 from the center of the center-of-gravity position range in a normal state, i.e., the normal center-of-gravity position. Alternatively, the posture-change detection unit 12 may detect, as a center-of-gravity shift vector, the vector indicating a shift from the center-of-gravity position 401 to the center-of-gravity position 402.

Although, in FIG. 12, the preparatory movement when the driver performs a brake operation has been described, a preparatory movement is made similarly before the accelerator operation or the steering operation is performed. For example, in the case where the driver performs a steering operation, the driver shifts the driver's center-of-gravity to the direction opposite to the steering direction as a preparatory movement preceding the steering operation. This center-of-gravity shift is the operation for maintaining the driver's body balance when the driver pulls down the steering wheel in the rotational direction. The preparatory movement for the steering operation is different from the preparatory movement for the foot lifting. Consequently, the center-of-gravity shift vector detected at the time of the preparatory movement for the brake operation, and the center-of-gravity shift vector detected at the time of the steering operation have different characteristics of the direction and magnitude. That is to say, the vehicle control device 10 can distinguish and identify the preparatory movement for the brake operation, and the preparatory movement for the steering operation using the center-of-gravity shift vector.

As described above, the vehicle control device 10 in the present embodiment can predict the driving operation using the preparatory movement made spontaneously before the driving operation, thus can predict the driving operation at an earlier time. That is to say, because the vehicle control device 10 can predict the driving operation using the preparatory movement made before the intended operation by the driver, the driver's driving operation can be predicted earlier than with the conventional method. The intended operation by the driver means, for example, the right foot lifting when the brake pedal is depressed, or the right foot release from the acceleration pedal (returning speed of the acceleration pedal).

Also, the vehicle control device 10 can control the vehicle based on the predicted driving operation in this manner, thus can react to the driving operation quickly. As a result, the difference between the times when the driving operation is performed, and when the vehicle operation corresponding to the driving operation starts is reduced, thus the vehicle control device 10 can reduce timing inconsistency which the driver may feel.

Also, because the vehicle can be controlled before the actual driving operation by the driver controls the vehicle, even when sudden acceleration/deceleration, or sudden steering operation is performed by the driver, the vehicle control device 10 can control the vehicle for smooth operation.

Also, when the driver applies the brake for e.g., collision avoidance, the vehicle control device 10 can predict the driving operation for the sudden brake approximately 0.1 to 0.5 seconds before the driving operation starts. Consequently, compared with the case where the brake is operated according to the actual driving operation, the vehicle control device 10 can reduce free running distance of 1.7 to 8.5 m for the vehicle travelling speed of 40 km/h, or free running distance of 1.1 to 5.5 m for the vehicle travelling speed of 60 km/h. Thus the risk of an accident such as a collision can be reduced.

Also, because the vehicle control device 10 can measure the center-of-gravity position, as the driver's posture, which is calculated using the pressure sensors arranged on the seating surface of the seat, sensors or the like do not need to be attached to the driver's body, thus the vehicle control device 10 can measure the driver's posture relatively easily.

Also, because the vehicle control device 10 predicts the driving operation using the center-of-gravity shift vector showing a shift of the center-of-gravity position from the center-of-gravity position in a normal time, the driving operation can be predicted with a relatively high accuracy.

Modification 1 of Embodiment 1

Next, the details of Modification 1 of Embodiment 1 are described with reference to the drawings. The vehicle control device in the present modification differs from the vehicle control device in Embodiment 1 in that preparatory movement is identified using the change in the pressure distribution obtained from the pressure sensors arranged on the driver'seat. That is to say, the vehicle control device in the present modification determines whether or not a posture change is caused by a preparatory movement by using a change of the state of the femoral region, the buttock region, and the lumbar to back region above the pelvis of the driver. Hereinafter, the vehicle control device in the present modification is described focusing on the different points from the vehicle control device in Embodiment 1.

Because the overall configuration of the vehicle control device 10 in the present modification is similar to that of the vehicle control device in Embodiment 1 shown in FIG. 1B, description and drawing are omitted.

Figure 13:
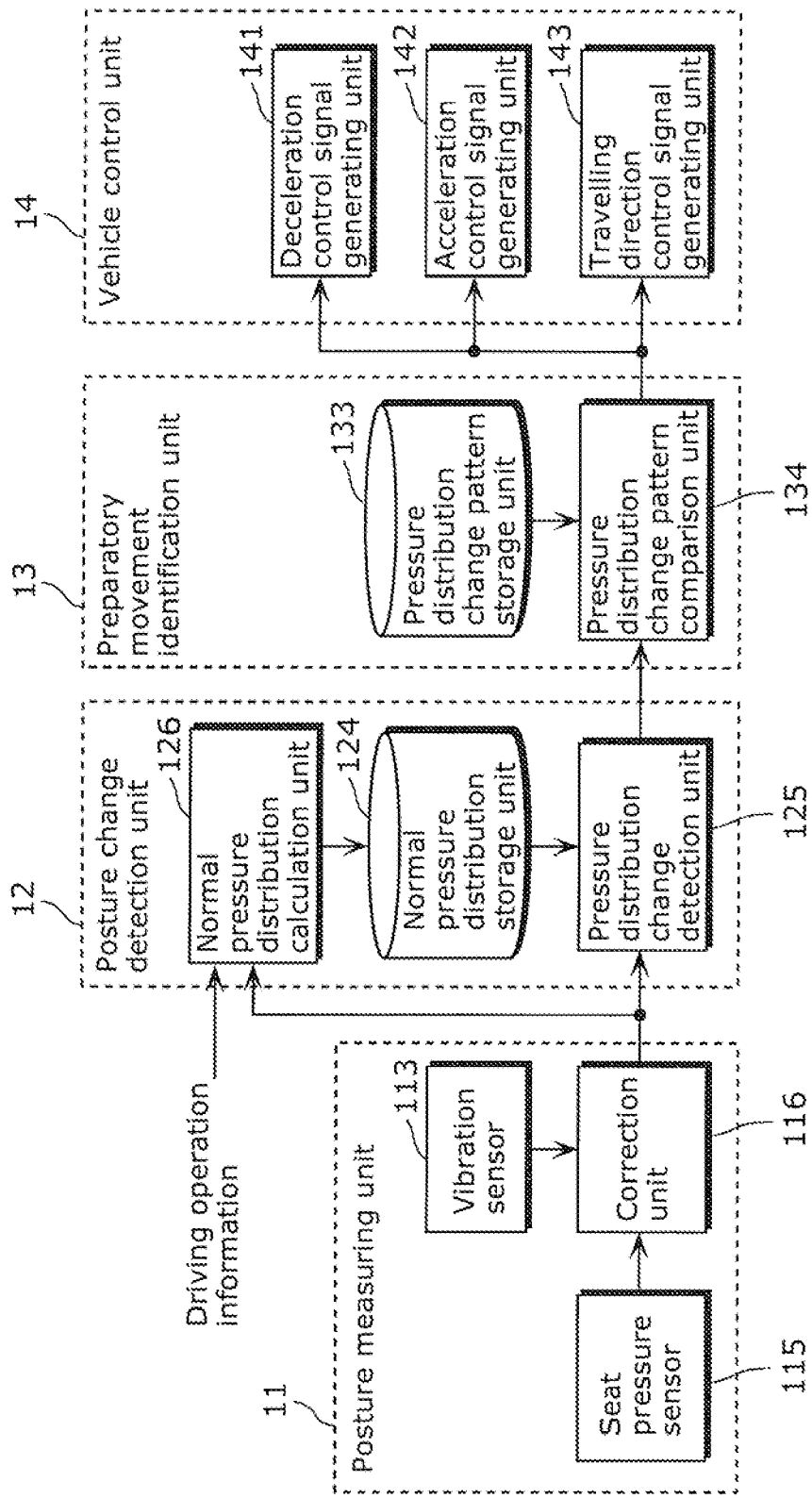
FIG. 13 is a flowchart showing an exemplary detailed configuration of a vehicle control device in Modification 1 of Embodiment 1 of the present invention.

FIG. 13 is a flowchart showing an exemplary detailed configuration of the vehicle control device in Modification 1 of Embodiment 1. As shown in FIG. 13, in the vehicle control device 10 in the present modification, a part of the posture measuring unit 11, the posture change detection unit 12, and the preparatory movement identification unit 13 is different from as in the vehicle control device in Embodiment 1. In FIG. 13, the same components as in FIG. 3 are labeled with the same reference symbols and the description is omitted.

In the present modification, posture measuring unit 11 measures the posture indicating the state of the femoral region, the buttock region, the upper pelvic region, and the lumbar to back region above the pelvis of the driver. The posture measuring unit 11 includes a seat pressure sensor 115, a vibration sensor 113, and a correction unit 116. Also, the posture change detection unit 12 includes a normal pressure distribution storage unit 124, a pressure distribution change detection unit 125, and a normal pressure distribution calculation unit 126. Also, the preparatory movement identification unit 13 includes a pressure distribution change pattern storage unit 133, and a pressure distribution change pattern comparison unit 134.

Multiple seat pressure sensors 115 are arranged at the different positions from each other on the driver's seat. Also, each seat pressure sensor 115 measures the distribution of the pressure applied to the seat by the driver. The arrangement of the seat pressure sensor 115 is described later using FIG. 14.

The correction unit 116 corrects the measurement points of the pressure to be measured by each seat pressure sensor 115 based on the vibration of the vehicle measured by the vibration sensor 113. Specifically, the correction unit 116 shifts the measurement points according to the vector that cancels the vehicle vibration vector measured when the pressure is measured by the seat pressure sensor 115. As a result, the correction unit 114 can remove the influence of the vibration of the vehicle from the measured pressure distribution.

The normal pressure distribution storage unit 124 stores normal pressure distribution where the normal pressure distribution is the pressure distribution in the case where the driver's posture is in a normal state. In other words, the normal pressure distribution is the pressure distribution when no driving operation and no preparatory movement are performed.

The pressure distribution change detection unit 125 detects a change of the pressure distribution as a posture change. Specifically, the pressure distribution change detection unit 125 detects the pressure distribution change, as a posture change, which is the pressure difference between the normal pressure distribution and the pressure distribution corrected by the correction unit 114 at each measurement point.

When a driving operation is not performed for a predetermined period after a pressure distribution is measured by the seat pressure sensor 115, the normal pressure distribution calculation unit 126 calculates normal pressure distribution using the measured pressure distribution. In other words, the normal pressure distribution calculation unit 126 calculates the normal pressure distribution using the pressure distribution measured outside a predetermined period including the period in which the driver performs driving operation.

Whether or not a driving operation has been performed is determined by acquiring driving operation information from the driving operation receiving means. Also, the predetermined period is a such period that includes the period from the start of a preparatory movement until subsequent driving operation starts. This predetermined period may be determined so as to include the period from the start of a preparatory movement to the start of a driving operation, the period being obtained empirically or experimentally.

The pressure distribution change pattern storage unit 133 is an exemplary posture change pattern storage unit, and stores pressure distribution change patterns and preparatory movement information with the pressure distribution change patterns being associated with the preparatory movement information, the pressure distribution change pattern indicating the characteristics of the pressure distribution change as the preparatory movement is made, the preparatory movement information for identifying the driving operation performed after the preparatory movement. Specifically, the pressure distribution change pattern storage unit 133 stores a pressure distribution change pattern table 133*a* which stores pressure distribution change patterns and preparatory movement information with the pressure distribution change pattern being associated with the preparatory movement information. The pressure distribution change pattern table 133*a* is described later using FIG. 15.

The pressure distribution change pattern comparison unit 134 is an exemplary posture change pattern comparison unit. The pressure distribution change pattern comparison unit 134 identifies the preparatory movement information and predicts the driving operation by comparing the pressure distribution change pattern stored by the pressure distribution change pattern storage unit 133 with the pressure distribution change detected by the pressure distribution change detection unit 125. Specifically, the pressure distribution change pattern comparison unit 134 identifies the preparatory movement information by identifying the pressure distribution change pattern which satisfies the condition of the measured pressure distribution change. That is to say, the pressure distribution variation pattern comparison unit 134 predicts the driving operation indicated by the preparatory movement information, based on whether or not the pressure distribution change satisfies the conditions shown by the pressure distribution change pattern.

Figure 14:
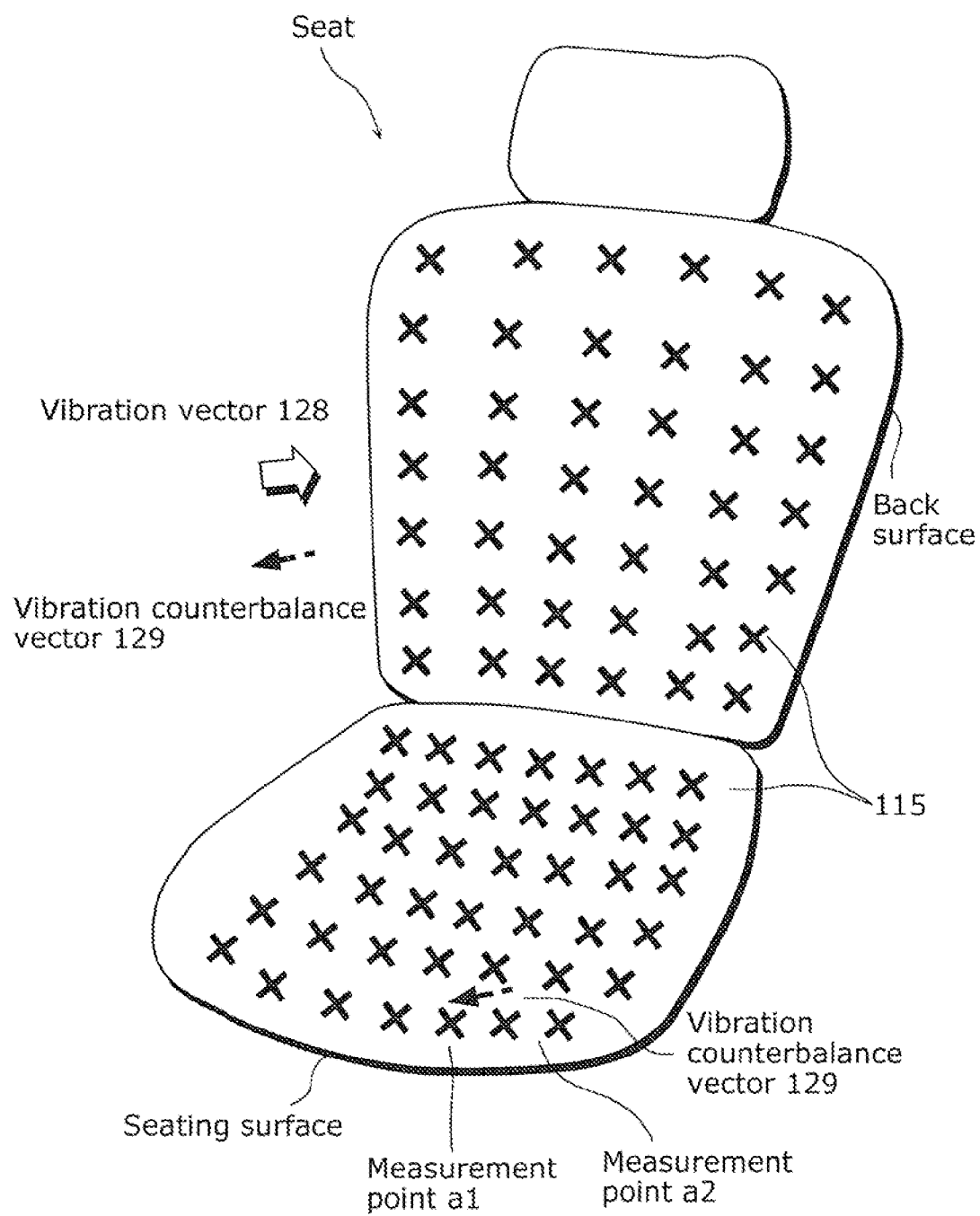
FIG. 14 is a diagram showing an exemplary arrangement of a seat pressure sensor in Modification 1 of Embodiment 1 of the present invention.

FIG. 14 is a diagram showing an exemplary arrangement of the seat pressure sensor in Modification 1 of Embodiment 1. As shown in FIG. 14, in the present embodiment, multiple seat pressure sensors 115 are arranged all over the seating surface and the back surface of the driver's seat. That is to say, the posture measuring unit 11 measures the driver's posture indicating the state of the femoral region, the buttock region, the upper pelvic region, and the lumbar to back region above the pelvis of the driver by using the multiple seat pressure sensors 115 arranged all over the seating surface and the back surface of driver's seat.

Figure 15:
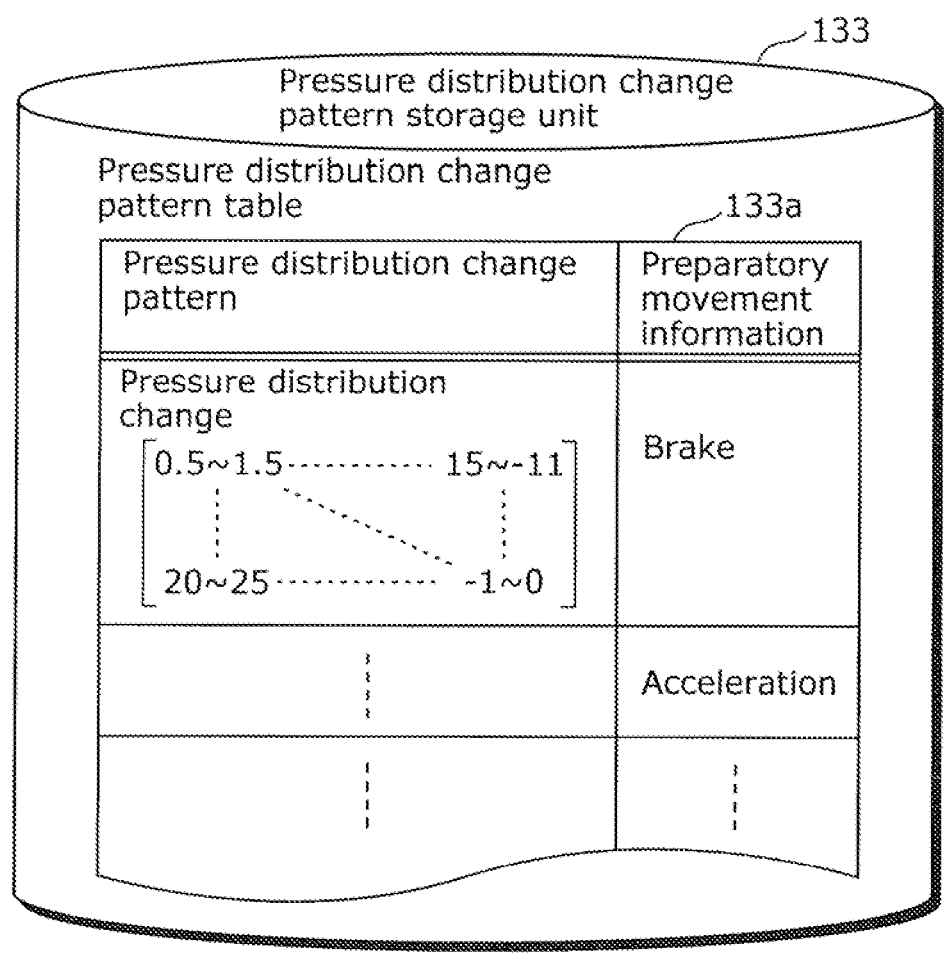
FIG. 15 is a table showing an exemplary pressure distribution change pattern table stored in a pressure distribution change pattern storage unit in Modification 1 of Embodiment 1 of the present invention.

FIG. 15 is a table showing an exemplary pressure distribution change pattern table stored in the pressure distribution change pattern storage unit in Modification 1 of Embodiment 1.

In the pressure distribution change pattern table 133*a* stored by the pressure distribution change pattern storage unit 133, the pressure distribution change pattern showing the characteristics of the pressure distribution change as a preparatory movement is made, and the preparatory movement information for identifying the driving operation performed after the preparatory movement are stored with the pressure distribution change pattern being associated with the preparatory movement information.

The pressure distribution change pattern table 133*a* shown in FIG. 15 indicates the preparatory movement for brake operation, for example, in the case where the pressure difference in the calculated pressure distribution change at each measurement point is contained in the range of the pressure distribution change at each measurement point stored in the table.

Next, the vehicle control method to be executed by the vehicle control device 10 configured as shown above is described.

Because the flowchart showing an exemplary operation of the vehicle control device in the present modification, and the flowchart showing an exemplary detailed process flow of the vehicle control step are similar to the flowcharts shown in FIGS. 6 and 11, drawing and description are omitted. Hereinafter, the details of the process in each step included in the flowchart of the present modification are described using FIGS. 16 to 19. First, the details of the posture measurement step (S110) are described using FIG. 16.

Figure 16:
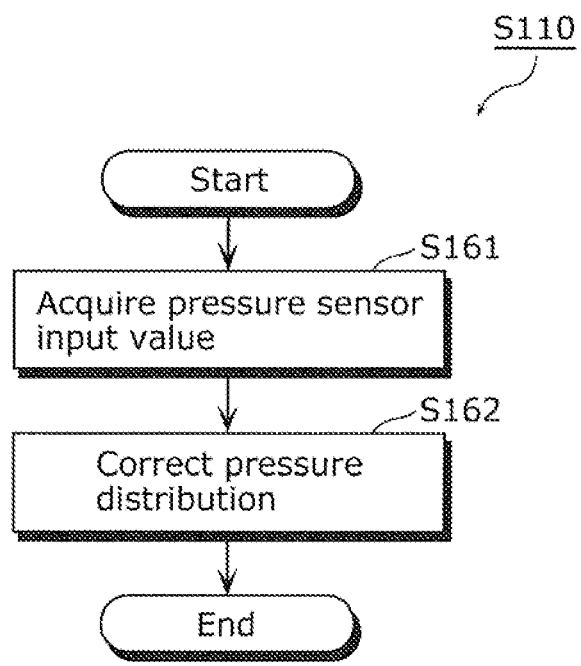
FIG. 16 is a flowchart showing an exemplary detailed process flow of a posture measurement step in Modification 1 of Embodiment 1 of the present invention.

FIG. 16 is a flowchart showing an exemplary detailed process flow of the posture measurement step in Modification 1 of Embodiment 1.

First, the correction unit 116 acquires the input value (pressure data) from each seat pressure sensor 115 (S161). Next, the correction unit 116 corrects the pressure distribution obtained from the acquired pressure data using the vehicle vibration vector measured by the vibration sensor 113 (S162). Specifically, the correction unit 114 corrects the pressure distribution by shifting each measurement position in the direction and by the magnitude of the vector that cancels the measured vehicle vibration vector.

Now, an exemplary correcting method of the measurement points is described using FIG. 14.

In the case where a vibration vector 128 is measured by the vibration sensor 113, the correction unit 116 calculates a vibration cancelling vector 129 that cancels the vibration vector 128. The correction unit 116 corrects the pressure distribution by moving each measurement point according to the vibration cancelling vector 129.

For example, in FIG. 14, because a pressure measurement point a2 has been moved to a pressure measurement point a1 according to the vibration cancelling vector 129, the correction unit 116 corrects the pressure value measured at the pressure measurement point a2 to the pressure value measured at pressure measurement point a1. Similarly, the correction unit 116 corrects the pressure values of all the measurement points.

As described above, the posture measuring unit 11 measures the pressure distribution, as the driver's posture, which is free from the influence of the vibration of the vehicle.

Figure 17:
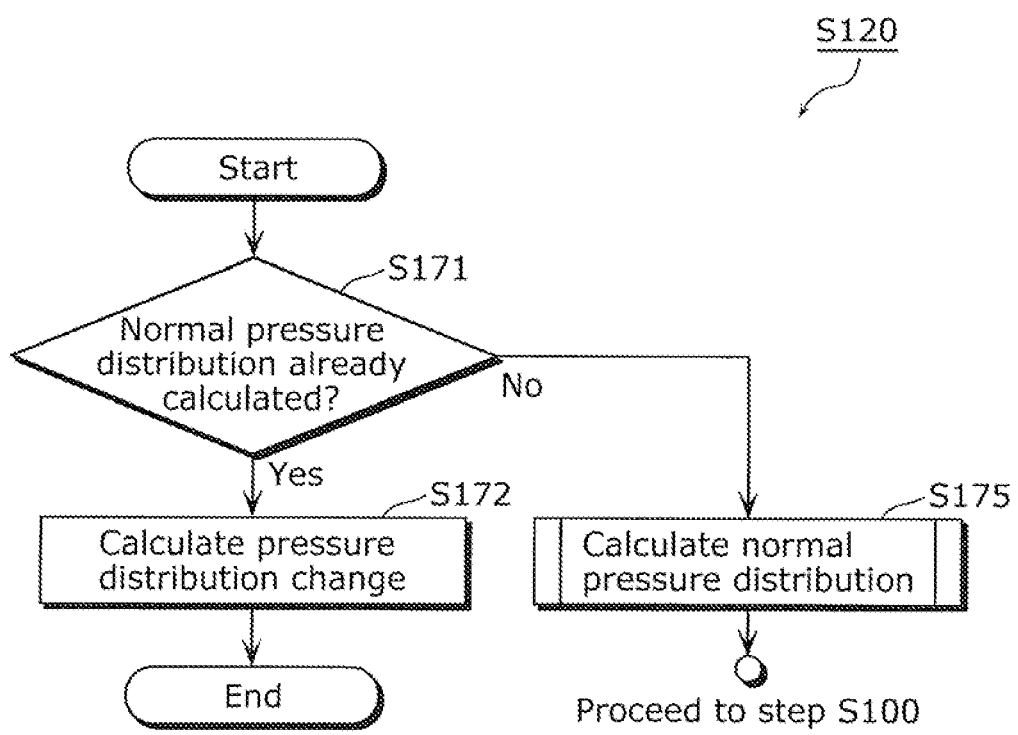
FIG. 17 is a flowchart showing an exemplary detailed process flow of a posture change detection step in Modification 1 of Embodiment 1 of the present invention.

Next, the details of the posture change detection step (S120) are described using FIG. 17.

FIG. 17 is a flowchart showing an exemplary detailed process flow of the posture change detection step in Modification 1 of Embodiment 1.

First, the normal pressure distribution calculation unit 126 determines whether or not the current driver's normal pressure distribution is stored in the normal pressure distribution storage unit 124 (S171). In the case where the current driver's normal pressure distribution is stored in the normal pressure distribution storage unit 124 (Yes in S171), the pressure distribution change detection unit 125 calculates the pressure distribution change, i.e., the pressure distribution difference between the current driver's normal pressure distribution stored in the normal pressure distribution storage unit 124, and the measured pressure distribution at each measurement point (S172).

On the other hand, in the case where the current driver's normal pressure distribution is not stored in the normal pressure distribution storage unit 124 (No in S171), the normal pressure distribution calculation unit 126 calculates the normal pressure distribution that is adapted to the current driver (S175).

As described above, the posture change detection unit 12 executes each process from step S171 to step S175 to detect the pressure distribution change, as a posture change, which is the pressure distribution difference between the measured pressure distribution and the normal pressure distribution.

Figure 18:
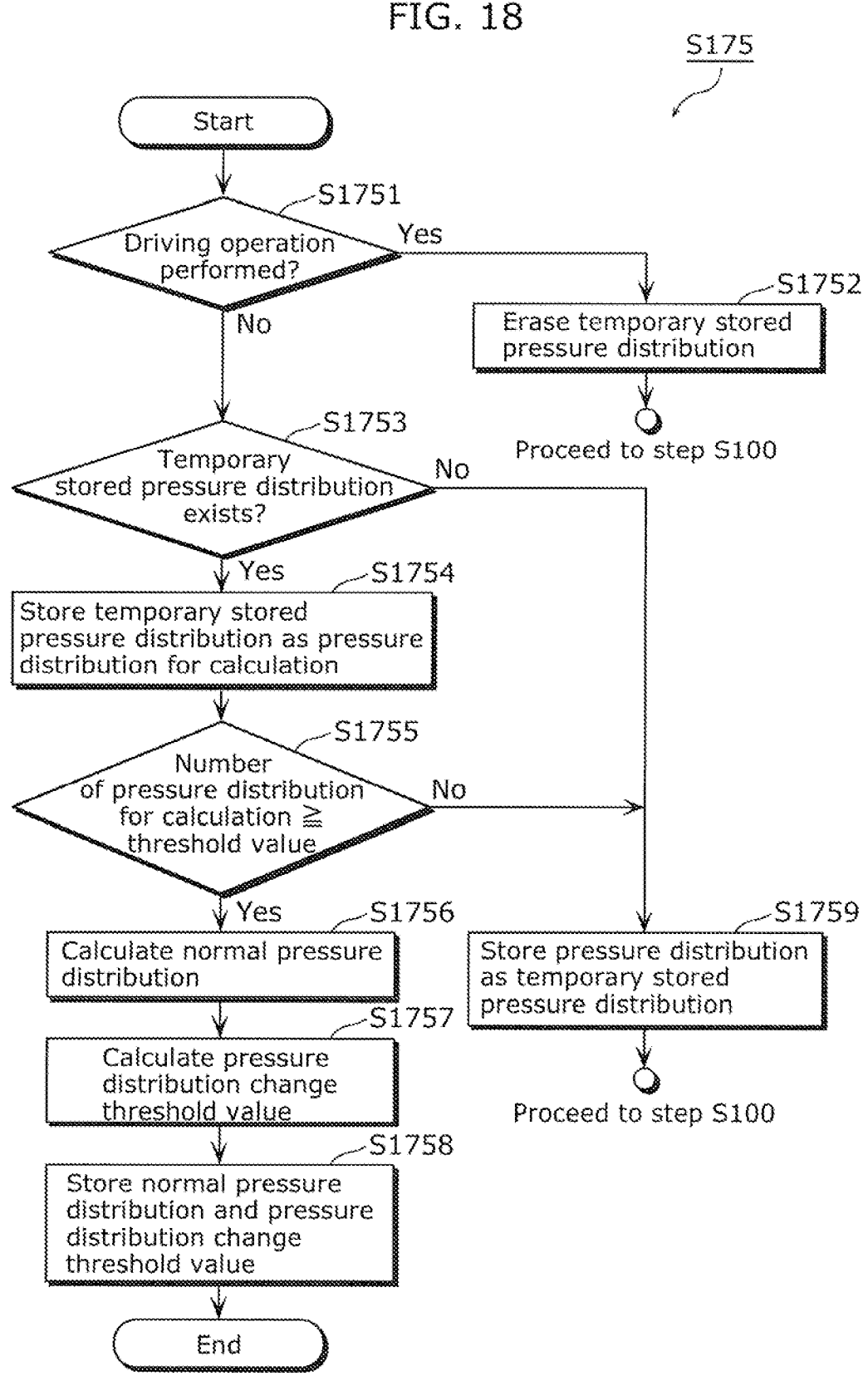
FIG. 18 is a flowchart showing an exemplary detailed process flow of a normal pressure distribution calculation step in Modification 1 of Embodiment 1 of the present invention.

Next, the details of the normal pressure distribution calculation step (S175) shown in FIG. 17 are described using FIG. 18.

FIG. 18 is a flowchart showing an exemplary detailed process flow of the normal pressure distribution calculation step in Modification 1 of Embodiment 1.

First, the normal pressure distribution calculation unit 126 determines whether or not a driving operation (brake operation, steering operation, or accelerator operation) is being performed based on the driving operation information acquired from the driving operation receiving means such as a steering wheel, a brake, or an accelerator (S1751).

In the case where a driving operation is being performed (Yes in S1751), the normal pressure distribution calculation unit 126 erased the temporary stored pressure distribution stored in the normal pressure distribution storage unit 124 (S1752), and the flow returns to step S100. On the other hand, in the case where the driving operation is not performed (No in S1751), the normal pressure distribution calculation unit 126 determines whether or not a temporary stored pressure distribution is stored in the normal pressure distribution storage unit 124 (S1753).

In the case where a temporary stored pressure distribution is not stored (No in S1753), the normal pressure distribution calculation unit 126 stores the pressure distribution measured in step S100, as a temporary stored pressure distribution, into the normal pressure distribution storage unit 124 (S1759), and the flow returns to step S100. On the other hand, in the case where a temporary stored pressure distribution is stored (Yes in S1753), the normal pressure distribution calculation unit 126 stores the temporary stored pressure distribution in the normal pressure distribution storage unit 124, as a pressure distribution for calculation, into the normal pressure distribution storage unit 124 (S1754). That is to say, in the case where any driving operation is not performed in the period from the last pressure measurement to the current pressure measurement, the normal pressure distribution calculation unit 126 stores the pressure distribution measured last time, as a pressure distribution for calculation, into the normal pressure distribution storage unit 124.

Next, the normal pressure distribution calculation unit 126 determines whether or not the number of pressure distribution for calculation stored in the normal pressure distribution storage unit 124 is greater than or equal to a predetermined number (S1755). The predetermined number is the number of pressure distribution for calculation, which is needed to calculate the current driver's normal pressure distribution. Specifically, the predetermined number is a natural number such as "20", for example.

In the case where the number of pressure distribution for calculation is less than the predetermined number (No in S1755), the normal pressure distribution calculation unit 126 stores the pressure distribution measured in step S126 into the normal pressure distribution storage unit 124 as a temporary stored pressure distribution (S1759), and returns to step S100.

On the other hand, in the case where the number of pressure distribution for calculation is greater than or equal to the predetermined number (Yes in S1755), the normal pressure distribution calculation unit 126 calculates the average of the pressures at the measurement points, as normal pressure distribution, of the pressure distribution for calculation (S1756). Furthermore, the normal pressure distribution calculation unit 126 calculates the standard deviation of the pressure at each measurement point, and determines the total of the calculated standard deviations at the measurement points as the pressure distribution change threshold value (S1757).

The normal pressure distribution calculation unit 126 then stores the normal pressure distribution calculated in step S1756, and the pressure distribution change threshold value determined in step S1757 into the normal pressure distribution storage unit 124 (S1758).

Although the case where the number of pressure distribution for calculation needed to calculate the normal pressure distribution is has been described, the number may be other than 20 as long as it is not less than 1. Greater the number of pressure distribution for calculation, higher the reliability of the normal pressure distribution.

The normal pressure distribution calculation unit 123 calculates the average of the pressure distribution for calculation as the normal pressure distribution in the above, however may calculate a representative value other than the average, such as the median, the mode as the normal pressure distribution. The normal pressure distribution calculation unit 126 determines the total of the standard deviations at the measurement points as the pressure distribution change threshold value, however may use other method to determine the pressure distribution change threshold value.

As described above, the normal pressure distribution calculation unit 126 executes each process from step S1751 to step S1758, to set the normal pressure distribution which is adapted to the current driver.

The calculation of these normal pressure distribution is performed for a predetermined cycle, for example, 50 times per second. That is to say, a loop processing of repeating step S175 and step S100 is executed in a predetermined cycle. It is preferable that this cycle approximately matches the cycle from the start of a preparatory movement until a driving operation is performed. Thereby, in another cycle preceding a cycle in which the driving operation is acquired, the preparatory movement is made. That is to say, another cycle preceding a cycle in which no driving operation is acquired corresponds to a normal state.

Figure 19:
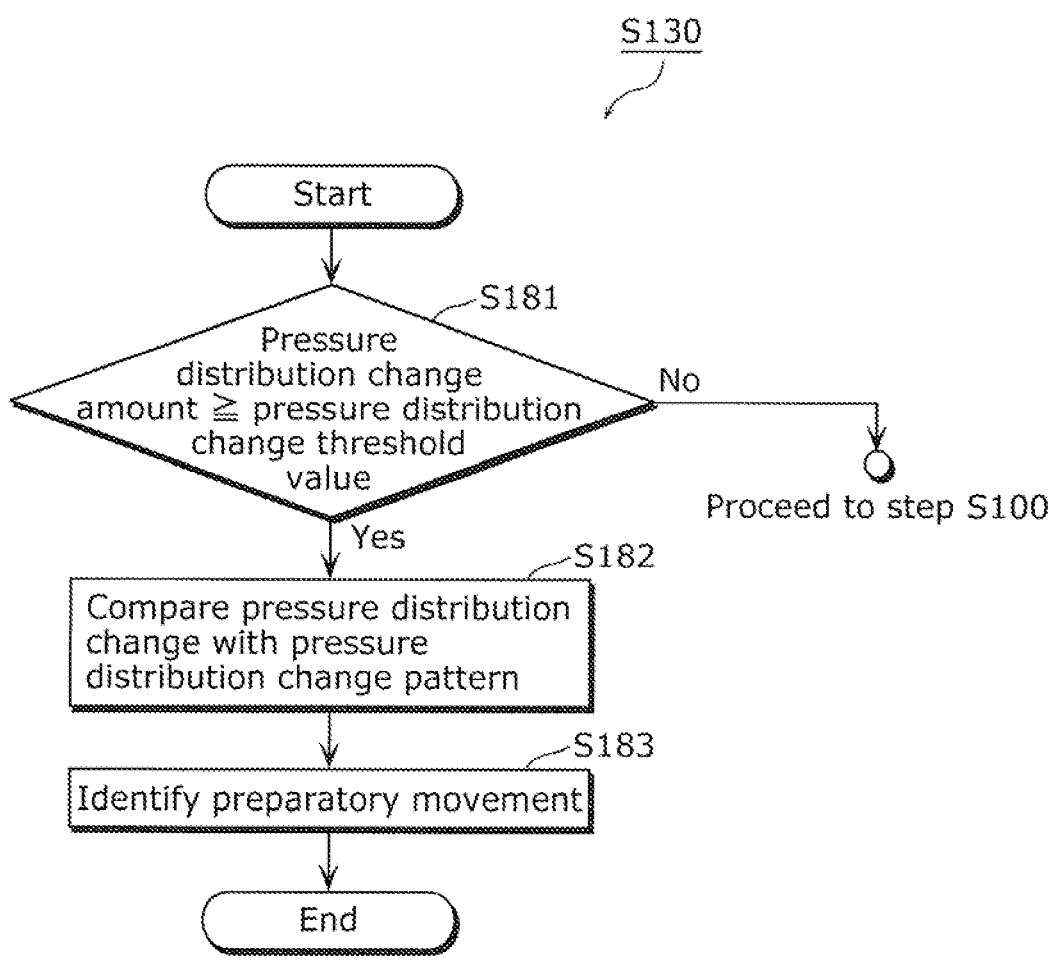
FIG. 19 is a flowchart showing an exemplary detailed process flow of a preparatory movement identification step in Modification 1 of Embodiment 1 of the present invention.

Next, the detail of the preparatory movement identification step (S130) is described using FIG. 19.

FIG. 19 is a flowchart showing an exemplary detailed process flow of the preparatory movement identification step in Modification 1 of Embodiment 1.

First, the pressure distribution change pattern comparison unit 134 determines whether or not the amount of pressure distribution change, i.e., the total of the absolute value of the pressure differences included in the pressure distribution change is greater than or equal to the pressure distribution change threshold value stored in the normal pressure distribution storage unit 124 (S181). In the case where the amount of pressure distribution change is less than the pressure distribution change threshold value (No in S181), the flow returns to step S100.

On the other hand, in the case where the amount of pressure distribution change is greater than or equal to the pressure distribution change threshold value (Yes in S181), the pressure distribution change pattern comparison unit 134 compares the pressure distribution change calculated in step S172 with the pressure distribution change pattern stored in the pressure distribution change pattern storage unit 133 (S182).

Specifically, the pressure distribution change pattern comparison unit 134 checks whether or not the pressure difference contained in the pressure distribution change calculated in step S172 is included, for example, in the comparison range shown by the pressure distribution change pattern for each measurement point.

The pressure distribution change pattern comparison unit 134 then identifies the preparatory movement performed preceding the driving operation based on the checking result, and outputs the identified preparatory movement to the vehicle control unit 14 (S183). Specifically, for example, the pressure distribution change pattern comparison unit 134 uses the comparison results to identify the preparatory movement information corresponding to the pressure distribution change pattern in which the pressure difference at each measurement points is included in the comparison range, thereby predicts the driving operation to be performed after the preparatory movement. That is to say, the pressure distribution change pattern comparison unit 134 determines whether or not the pressure distribution change satisfies the predetermined condition indicated by the pressure distribution change pattern, thus determines whether or not the pressure distribution change is caused by a preparatory movement for the driving operation, while identifying the preparatory movement as one of the accelerator operation, the brake operation, and the steering operation.

As described above, the preparatory movement identification unit 13 executes each process from step S181 to step S183 to identify the preparatory movement for driving operation by using the posture change detected by the posture change detection unit 12, thus predicts the driving operation. Specifically, the preparatory movement identification unit 13 determines whether or not the detected posture change is caused by the preparatory movement for one of the accelerator operation, the brake operation, and the steering operation based on the predetermined condition.

Next, the experimental results related to the preparatory movement as a driver performs a driving operation are described using FIG. 12.

As shown in FIG. 12(b), at the time of the preparatory movement, the pressure of the left front femoral region is higher than the pressure in a normal state due to the movement of stepping down the right foot. At the same time, the pressure of the right femoral region is decreased and the pressure of the entire buttock region is increased compared to the pressure in a normal state.

Consequently, the vehicle control device 10 can identify the preparatory movement for brake operation by detecting the pressure distribution change which is the pressure distribution difference between the pressure distribution in a normal state shown in FIG. 12(a), and the pressure distribution at the time of the preparatory movement shown in FIG. 12(b).

Although, in FIG. 12, the example of pressure distribution change on the seating surface has been shown, the vehicle control device 10 may use the pressure distribution on the back surface in FIG. 14 to identify the preparatory movement for brake operation with the right foot. For example, in order for the driver to lift the right foot, an increase of the pressure to the entire buttock region shown in FIG. 12, as well as an increase of the pressure to the lower back region due to backward move of the upper pelvic region caused by backward shift of the center-of-gravity are involved. The angle between the pelvis and the right femoral region is greatly changed, thus as the preparatory movement for maintaining the balance on the right and left, not only the movement of the left femoral region which appears on the seating surface in FIG. 12, but also the tension of the back muscle of the opposite side of the body from the leg lifted by the driver (i.e., left side back muscle in the case of the brake operation with the right foot) cause an increase of the pressure on the lower left of the back surface of the seat. The vehicle control device 10 can identify these preparatory movements to predict the subsequent driving operation. That is to say, the vehicle control device 10 can identify the preparatory movement according to a change in the state of the upper pelvic region.

In the case where the driver performs a steering operation, the driver shifts the driver's center-of-gravity to the direction opposite to the steering direction as a preparatory movement preceding the steering operation. This center-of-gravity shift is the operation for maintaining the driver's body balance when the driver pulls down the steering wheel in the rotational direction. This preparatory movement can be observed as a pressure distribution change, for example, from equally weighted pressure distribution on the left and right sides of the seating surface to an increased pressure on either one of the left and right femoral regions, or the buttock region. Consequently, by using the pressure distribution change calculated from the pressure distribution indicating the state of the femoral region or the buttock region, the vehicle control device 10 can predict the steering operation from the side with an increased pressure to the other side. That is to say, the vehicle control device 10 controls the vehicle so as to turn the vehicle to the direction opposite to the direction of the posture, change indicating the state of the femoral region or the buttock region of the driver. Note that the direction to the region with increased pressure out of the left and right femoral regions and buttock regions corresponds to the direction of the posture change.

Also, in the preparatory movement for steering operation, as the preparatory movement for pulling down operation of the steering wheel in the rotational direction, not only the seating surface but also the back surface has unbalanced pressure distribution on the left and right sides is observed. In order to maintain the body balance against large shoulder movement for steering operation, the back muscle in the rotational direction is contracted to support the lumbar to back region above the pelvis, thus the pressure on the same side of the rotational direction, on the middle of the back surface of the seat is increased. That is to say, the vehicle control device 10 control the vehicle so as to turn the vehicle in the same direction same as the direction of the posture change indicating the state of the lumbar to back region above the pelvis of the driver. Note that the direction to the region with increased pressure out of the left and right lumbar regions and back regions corresponds to the direction of the posture change.

In contrast to the preparatory movement for the case of foot lifting such as brake operation, the preparatory movement for the steering operation has a different object movement for maintaining the body balance, the pressure change distribution is also different. That is to say, the vehicle control device 10 can distinguish and identify the preparatory movement for the brake operation, and the preparatory movement for the steering operation using the pressure distribution change.

As described above, by measuring the pressure distribution of at least one of the seating surface and the back surface of the seat instead of center-of-gravity position where such pressure distribution represents the driver's posture indicating the state of the femoral region, the buttock region, the upper pelvic region, and the lumbar to back region above the pelvis of the driver, the vehicle control device 10 in the present modification provides similar effects as the vehicle control device 10 in Embodiment 1.

Modification 2 of Embodiment 1

Next, the details of Modification 2 of Embodiment 1 are described with reference to the drawings. The vehicle control device in the present modification differs from the vehicle control device in Modification 1 of Embodiment 1 in that preparatory movement is identified using a change in the pressure distribution obtained from the pressure sensors arranged on the floor in front of the driver's seat where the change is due to the leg on the opposite side of the leg with which the driver applies brake or acceleration operation. That is to say, in the present modification, the vehicle control device identifies the preparatory movement by using a change in the state of the leg different from active leg for performing brake or acceleration operation.

Hereinafter, the vehicle control device in the present modification is described focusing on the different points from the vehicle control device in Modification 1 of Embodiment 1. In the following, the case where brake or accelerator operation is performed with the right leg is described.

Because the overall configuration of the vehicle control device 10 in the present modification is similar to that of the vehicle control device in Embodiment 1 shown in FIG. 1B, description and drawing are omitted.

Figure 20:
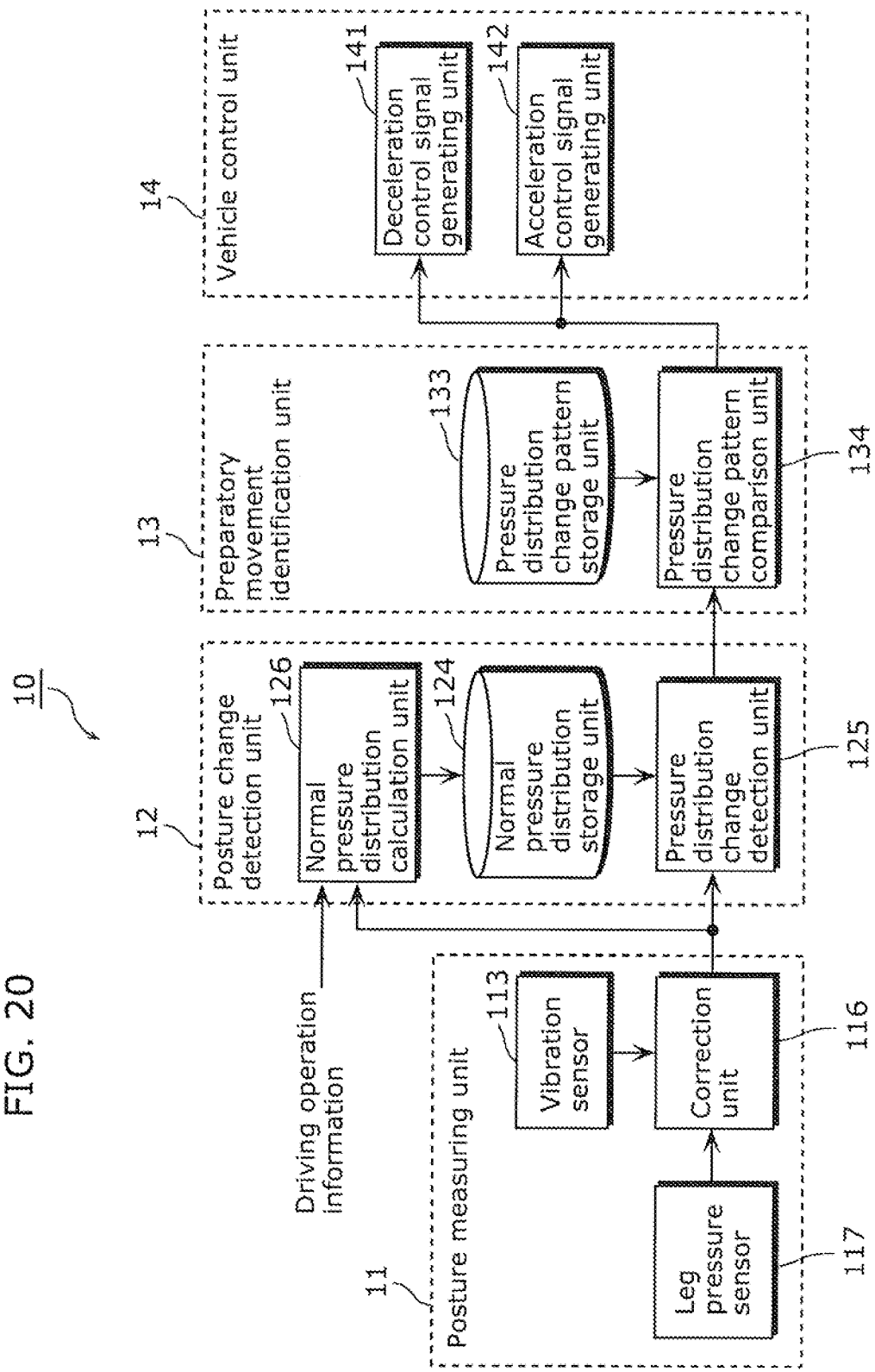
FIG. 20 is a block diagram showing an exemplary detailed configuration of a vehicle control device in Modification 2 of Embodiment 1 of the present invention.

FIG. 20 is a block diagram showing an exemplary detailed configuration of the vehicle control device in Modification 2 of Embodiment 1. As shown in FIG. 20, in the vehicle control device 10 in the present modification, a part of the posture measuring unit 11, and the vehicle control unit 14 is different from as in the vehicle control device in Modification 1 of Embodiment 1, but the other parts are the same. Specifically, the posture measuring unit 11 in the present modification includes a foot pressure sensor 117 instead of the seat pressure sensor 115. Also, the vehicle control unit 14 in the present modification does not include the travelling direction control signal generating unit 143. In FIG. 20, the same components as in FIG. 3 are labeled with the same reference symbols and the description is omitted.

Multiple foot pressure sensors 117 are arranged at the different positions from each other on the floor in front of the driver's seat. Also, each foot pressure sensor 117 measures the distribution of the pressure applied to the floor by the feet of the driver (especially the sole). The foot pressure sensor 117 may be arranged not only on the floor, but also on a footrest or various pedals.

It is expected that pressure change of foot caused by steering operation is smaller than the pressure change caused by brake or accelerator operation. Consequently, the vehicle control device 10 in the present modification controls the vehicle by predicting a brake or accelerator operation rather than a steering operation. That is to say, the vehicle control unit 14 does not include the travelling direction control signal generating unit 143.

Next, the vehicle control method to be executed by the vehicle control device 10 configured as shown above is described.

The operation of the vehicle control device in the present modification differs from that of the vehicle control device in Modification 1 of Embodiment 1 in the posture measuring step in which pressure is acquired from the foot pressure sensor, and the details of the operation in the vehicle control step. Consequently, the details of the vehicle control step (S140) are described using FIG. 21, and the description and drawings of other operations are omitted.

Figure 21:
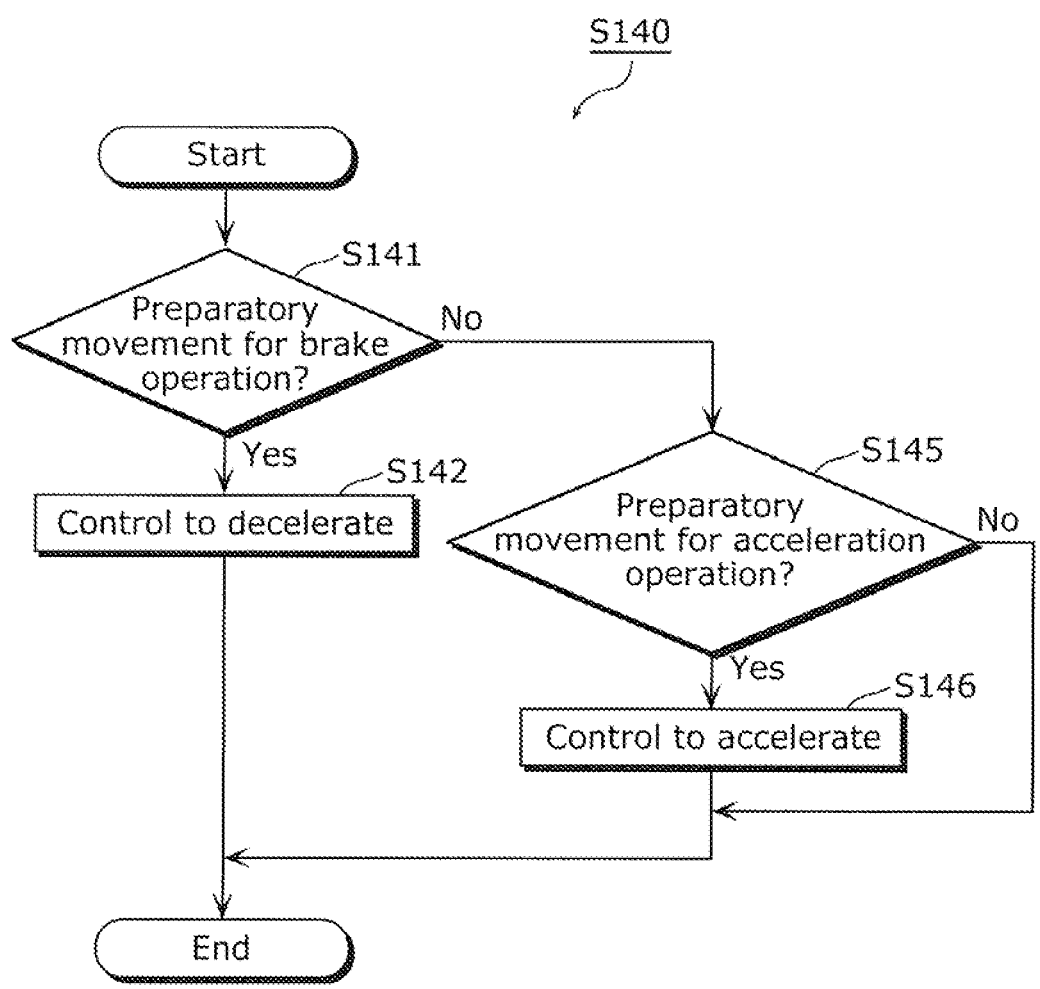
FIG. 21 is a flowchart showing an exemplary detailed process flow of a vehicle control step in Modification 2 of Embodiment 1 of the present invention.

FIG. 21 is a flowchart showing an exemplary detailed process flow of the vehicle control step in Modification 2 of Embodiment 1. As shown in FIG. 21, in the vehicle control step in the present modification, the steps (S143, S144) related to the control of the travelling direction are omitted. The steps (S141, S142, S144, S145) related to the control of the deceleration or acceleration of the vehicle are similar to those shown in FIG. 12, thus description is omitted.

Next, the experimental results related to the preparatory movement as a driver performs a driving operation are described using FIG. 12.

Figure 22:
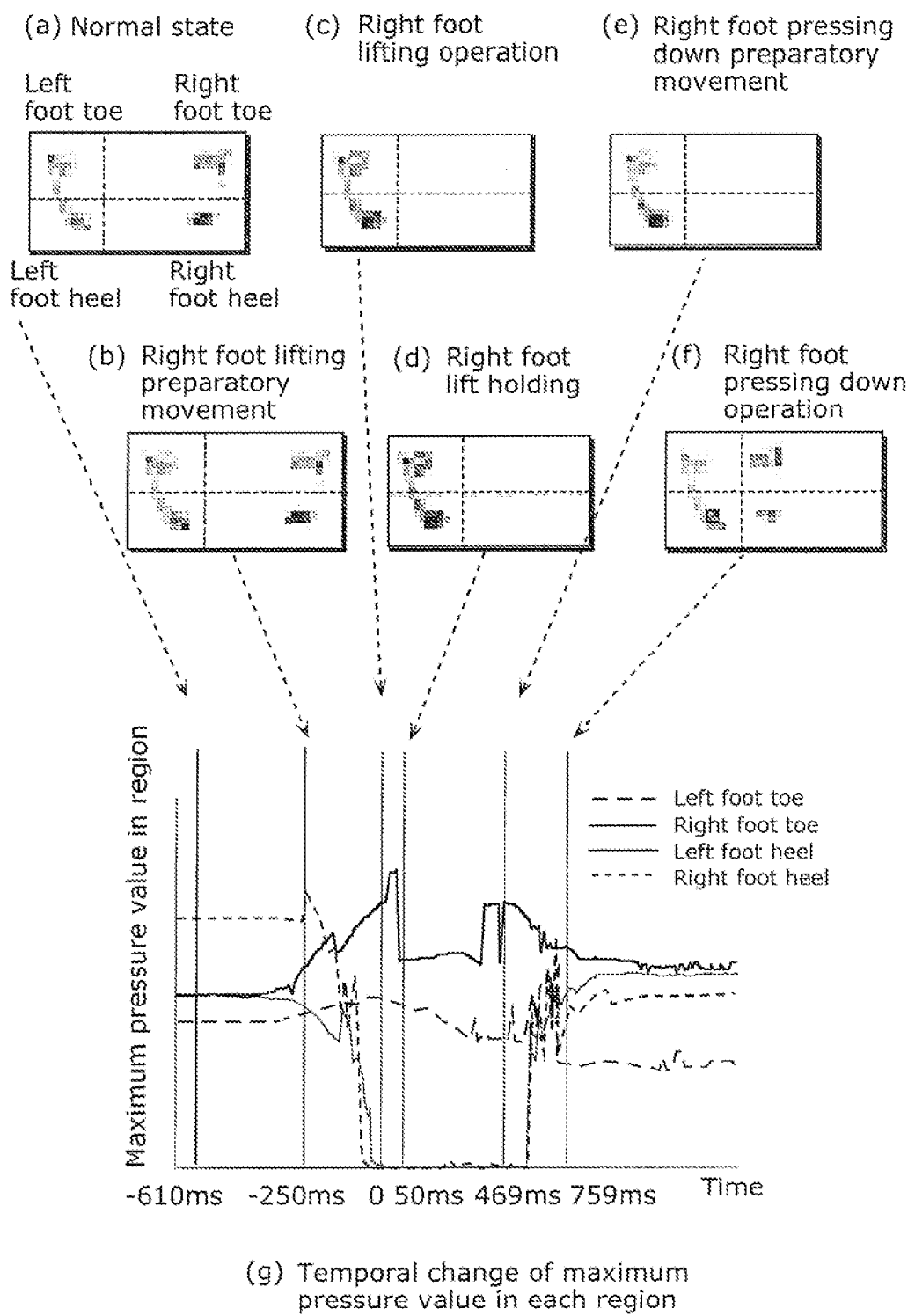
FIG. 22 is a graph showing an exemplary experimental result of preparatory movement when a driver applies brakes.

FIG. 22 is a graph showing an exemplary experimental result of preparatory movement when a driver applies brakes. In FIG. 22, (a) is an image showing the pressure distribution in a normal state; (b) is an image showing the pressure distribution at the time of the preparatory movement before the right foot lifting operation; (c) is an image showing the pressure distribution at the time of the right foot lifting operation; (d) is an image showing the pressure distribution with the right foot lifted; (e) is an image showing the pressure distribution at the time of the preparatory movement before the driver steps down the brake pedal with the right foot; (f) is an image showing the pressure distribution when the driver steps down the brake pedal with the right foot; and (g) is a graph showing the temporal change of the maximum pressure in the regions corresponding to the left foot toe, the right foot toe, the left foot heel, the right foot heel.

In the present experiment, multiple foot pressure sensors 117 are arranged on the upper surface of the brake pedal and the accelerator pedal in addition to the floor in front of the driver's seat.

As clearly shown in the pressure distribution in. FIG. 22(*a*), pressure is evenly applied on the left foot toe and the left foot heel in a normal state. Also, the pressure applied on the right foot heel is greater than that applied on the right foot toe.

Now, the driver lifts the right foot and moves the foot above the brake pedal to depress the brake pedal. At this point, the driver, before lifting the right foot, makes a preparatory movement of shifting the driver's center-of-gravity to the left foot to maintain the body balance. FIG. 22(*b*) shows that such a preparatory movement is made 250 ms before the time when the right foot is lifted.

In FIG. 22(*b*), the pressure on the left heel is increased due to shifting center-of-gravity operation to the left foot. At the same time, the pressure on the left toe is also increased though the increase amount is not as much as that of the pressure on the left heel. Because of this preparatory movement, as shown in FIG. 22(*c*) the right foot is lifted and the body is not supported by the right foot, thus even when the weight of the body is focused on the left foot, the body balance is maintained.

For example, the vehicle control device 10 detects differential pressure distribution between the pressure distribution shown in FIG. 22(*b*), and the normal pressure distribution shown in FIG. 22(*a*), as a pressure distribution change. The vehicle control device 10 can identify the preparatory movement for the brake operation by comparing the pressure change distribution detected in this manner with a pressure change distribution pattern.

As described above, by using the pressure distribution on the floor in front of the seat instead of the pressure distribution on the seat, the vehicle control device 10 in the present modification can identify the preparatory movement before the driver depresses the brake pedal or the accelerator pedal. That is to say, the vehicle control device 10 in the present modification provides similar effects as the vehicle control device 10 in Embodiment 1 with respect to the brake operation and the accelerator operation.

The vehicle control device 10 in the present modification may identify the preparatory movement by using the center-of-gravity position of the pressure within the floor, but the pressure distribution on the floor. In this case, the vehicle control device 10 may identify preparatory movement by using the center-of-gravity position in one area corresponding to both feet, or by using the center-of-gravity position in the area corresponding to each leg. In the case where the center-of-gravity position of one leg is used, the preparatory movement may be identified by using, for example, a shift vector or a shift path in the direction from the left foot center-of-gravity to the left heel, the shift preceding the operation of depressing the brake pedal.

Embodiment 2

Next, Embodiment 2 of the present invention is described in detail with reference to the drawings.

The vehicle control device 20 in Embodiment 2 of the present invention has a feature of generating a posture change pattern for identifying the preparatory movement for a driving operation from the measured change of posture.

Figure 23:
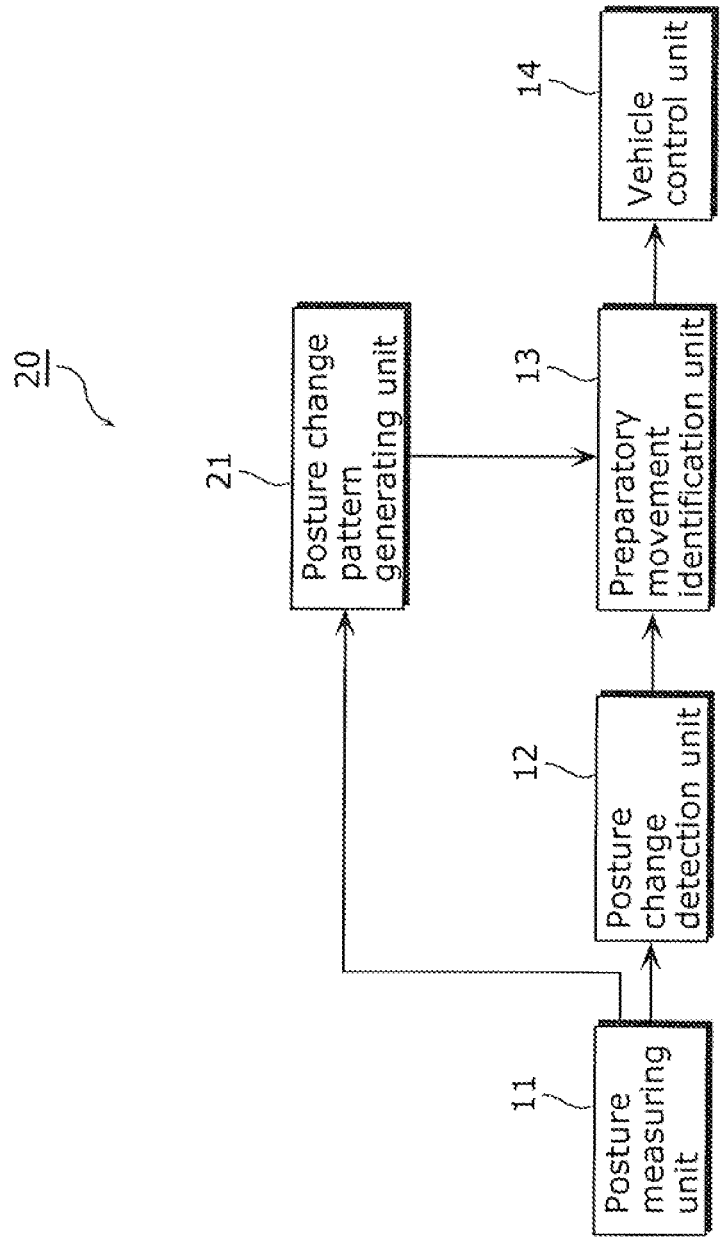
FIG. 23 is a block diagram showing an exemplary overall configuration of a vehicle control device in Embodiment 2 of the present invention.

FIG. 23 is a block diagram showing an exemplary overall configuration of the vehicle control device in Embodiment 2. In FIG. 23, the same components as in FIG. 1B are labeled with the same reference symbols and the description is omitted.

As shown in FIG. 23, in addition to the posture measuring unit 11, the posture change detection unit 12, the preparatory movement identification unit 13, and the vehicle control unit 14, the vehicle control device 20 includes a posture change pattern generation unit 21.

The posture change pattern generation unit 21 generates a posture change pattern by using the posture change detected by the posture change detection unit 12 in a predetermined period before the driving operation. The posture change pattern generation unit 21 then stores the generated posture change pattern and the driving operation into the posture change pattern storage unit with the posture change pattern being associated with the driving operation.

Next, the details of each component shown in FIG. 23 are described.

Figure 24:
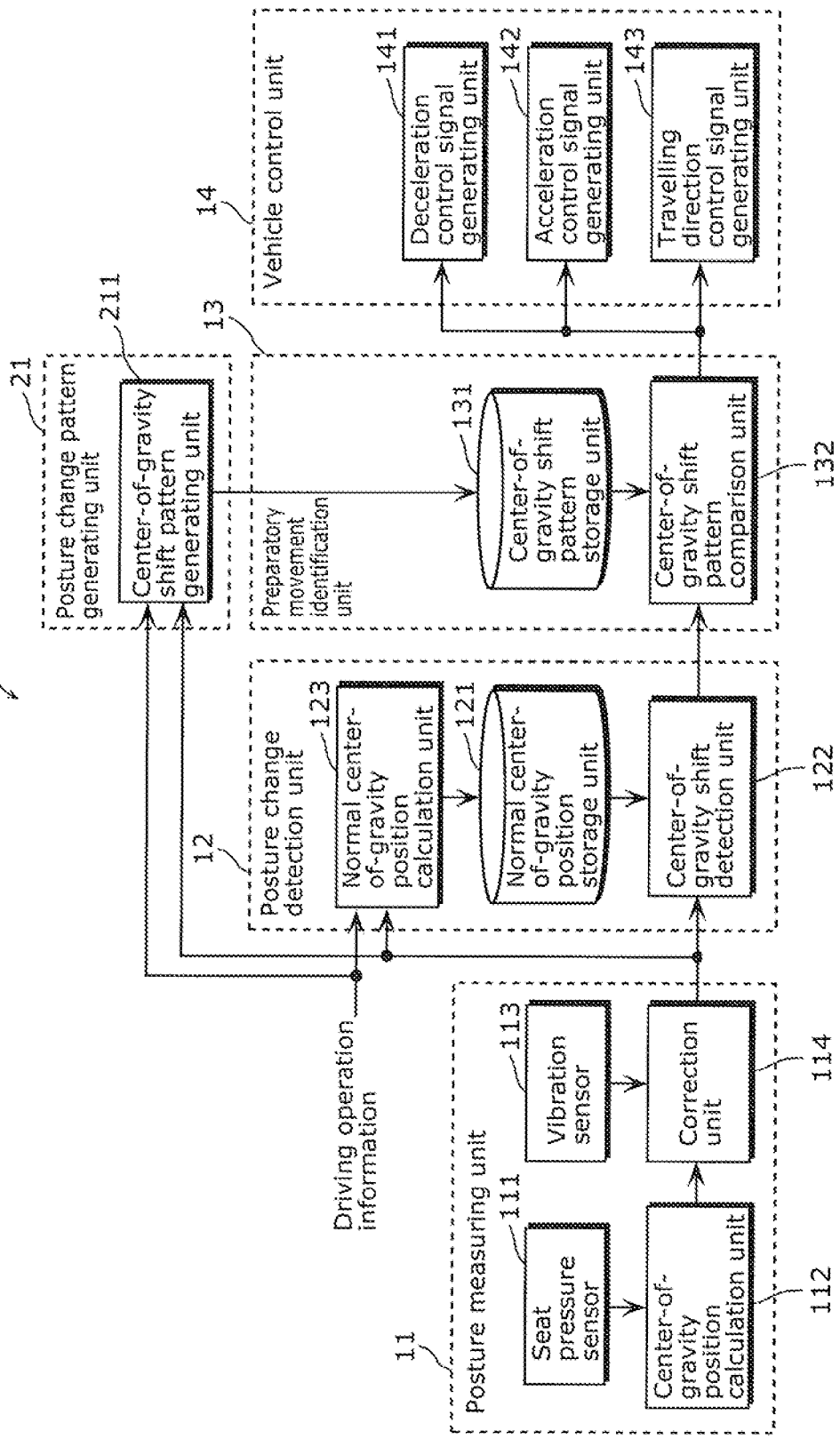
FIG. 24 is a block diagram showing an exemplary detailed configuration of the vehicle control device in Embodiment 2 of the present invention.

FIG. 24 is a block diagram showing an exemplary detailed configuration of the vehicle control device in Embodiment 2. In FIG. 24, the same components as in FIG. 3 are labeled with the same reference symbols and the description is omitted.

A center-of-gravity shift pattern generation unit 211 included in the posture change pattern generation unit 21 generates a center-of-gravity shift pattern using the center-of-gravity shift vector for each driving operation (brake operation, accelerator operation, right steering operation, or left steering operation), which is detected by the center-of-gravity shift detection unit 122 in a predetermined period before the driving operation. The center-of-gravity shift pattern generation unit 211 then stores the generated center-of-gravity shift pattern and the driving operation into the center-of-gravity shift pattern storage unit 131 with the generated center-of-gravity shift pattern being associated with the driving operation.

Specifically, the center-of-gravity shift pattern generation unit 211 generates, for example, the ranges of the angles or magnitudes (average±standard deviation) indicating the directions of multiple center-of-gravity shift vectors detected in a predetermined period before the driving operation.

Whether or not the driving operation has been performed is determined by acquiring driving operation information from the driving operation receiving means. Also, the predetermined period is a such period that includes the period from the start of a preparatory movement until subsequent driving operation starts.

Next, the vehicle control method to be executed by the vehicle control device 20 configured as shown above is described.

Figure 25:
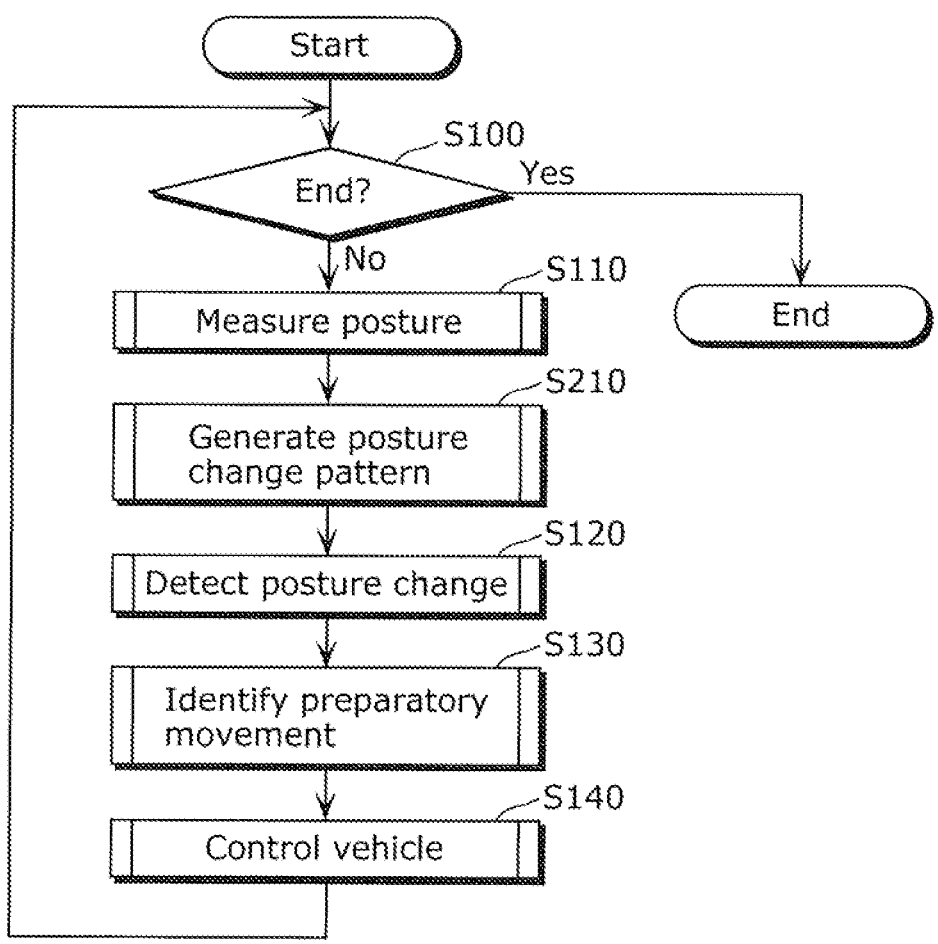
FIG. 25 is a flowchart showing an exemplary operation of the vehicle control device in Embodiment 2 of the present invention.

FIG. 25 is a flowchart showing an exemplary operation of the vehicle control device in Embodiment 2. In FIG. 25, the same components as in FIG. 6 are labeled with the same reference symbols and the description is omitted.

After the driver's posture is measured by the posture measuring unit 11 (S110), the posture change pattern generation unit 21 generates a posture change pattern by using the posture change detected by the posture change detection unit 12 in a predetermined period before the driving operation (S210). The posture change pattern generation unit 21 then stores the generated posture change pattern and the driving operation into the posture change pattern storage unit with the generated posture change pattern being associated with the driving operation. Subsequently, the process after step S120 is executed.

Figure 26:
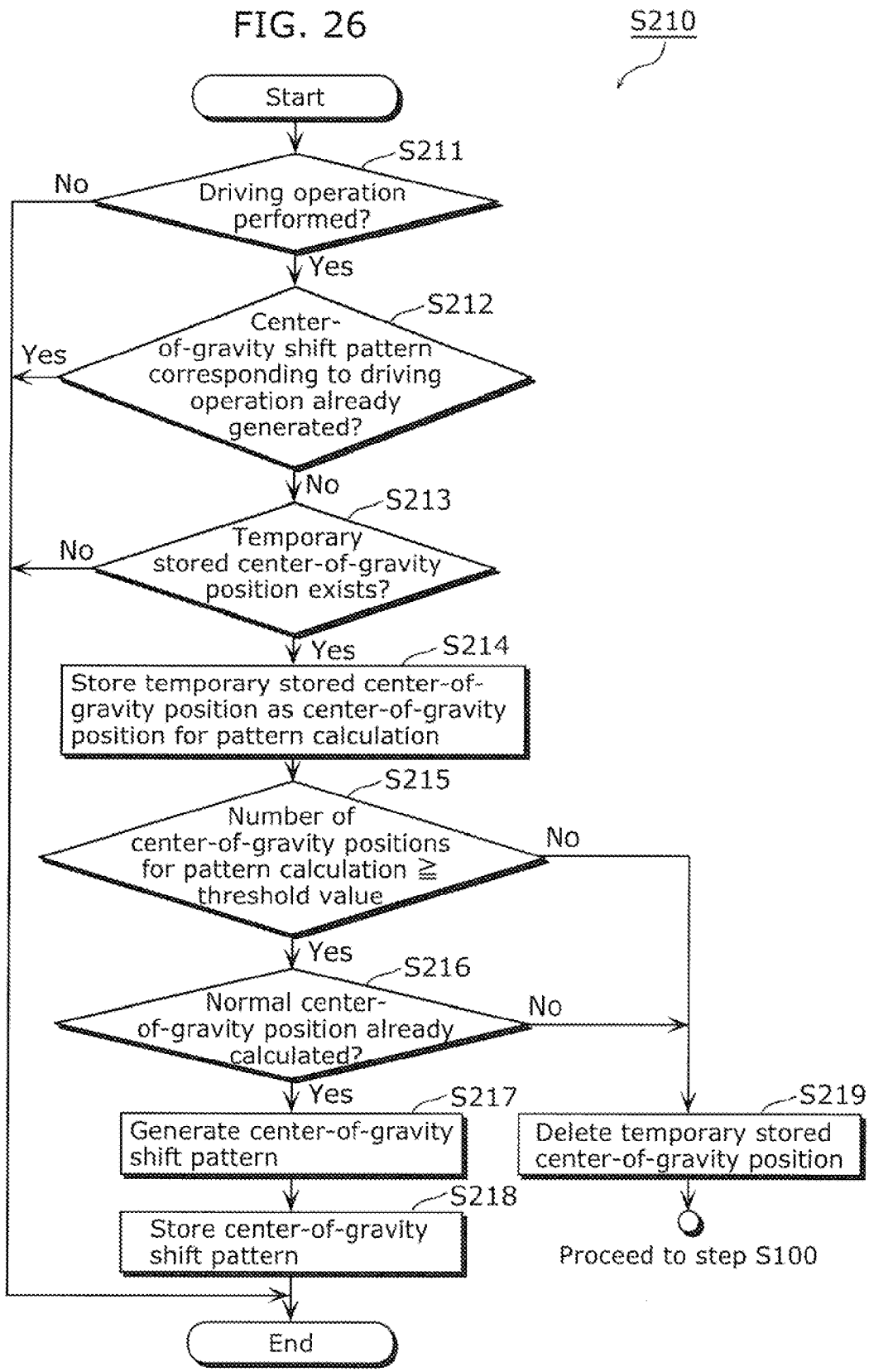
FIG. 26 is a flowchart showing an exemplary detailed process flow of a posture change pattern generation step in Embodiment 2 of the present invention.

Next, a posture change pattern generation step (S210) which is included in the flowchart shown in FIG. 25, but different from any step shown in FIG. 6 is described in detail using FIG. 26.

FIG. 26 is a flowchart showing an exemplary detailed process flow of the posture change pattern generation step in Embodiment 2.

First, the center-of-gravity shift pattern generation unit 211 determines whether or not a driving operation (brake operation, steering operation, or accelerator operation) is being performed based on the driving operation information acquired from the driving operation receiving means such as a steering wheel, a brake, or an accelerator (S211).

In the case where no driving operation is being performed (No in S211), the center-of-gravity shift pattern generation unit 211 terminates the process of step S210. On the other hand, in the case where a driving operation is being performed (Yes in S211), the center-of-gravity shift pattern generation unit 211 determines whether or not the center-of-gravity shift pattern corresponding to the driving operation currently performed is already generated (S212). Specifically, the center-of-gravity shift pattern generation unit 211 determines whether or not the center-of-gravity shift pattern corresponding to the driving operation is stored in the center-of-gravity shift pattern memory part 131.

In the case where the center-of-gravity shift pattern corresponding to the driving operation is already generated (Yes in S212), the center-of-gravity shift pattern generation unit 211 terminates the process of step S210. On the other hand, in the case where the center-of-gravity shift pattern corresponding to the driving operation has not been generated yet (No in S212), it is determined whether or not the temporary stored center-of-gravity position is stored in the normal center-of-gravity position storage unit 121 (S213).

In the case where the temporary stored center-of-gravity position is not stored (No in S213), the center-of-gravity shift pattern generation unit 211 terminates the process of step S210. On the other hand, in the case where the temporary stored center-of-gravity position is stored (Yes in S213), the center-of-gravity shift pattern generation unit 211 stores the temporary stored center-of-gravity position, as a center-of-gravity position for pattern calculation, into the center-of-gravity shift pattern storage unit 131 for each driving operation (S214). That is to say, in the case where a driving operation is performed, the center-of-gravity shift pattern generation unit 211 stores a center-of-gravity position, as a center-of-gravity position for pattern calculation, into the center-of-gravity shift pattern storage unit 131 for each driving operation, the center-of-gravity position being calculated using the pressure measured within the last one cycle (in a predetermined period) of the pressure measurement cycle.

Subsequently, the center-of-gravity shift pattern generation unit 211 determines whether or not the number of center-of-gravity positions for pattern calculation corresponding to the driving operation stored in the center-of-gravity shift pattern storage unit 131 is greater than or equal to a predetermined number (S215). The predetermined number is the number of center-of-gravity positions for pattern calculation, which is needed to calculate the current driver's center-of-gravity shift pattern. Specifically, the predetermined number is a natural number such as "20", for example.

In the case where the number of center-of-gravity positions for pattern calculation is less than a predetermined number (No in S215), the center-of-gravity shift pattern generation unit 211 deletes the temporary stored center-of-gravity position stored in the normal center-of-gravity position storage unit 121 (S219), and returns to step S100. On the other hand, in the case where the number of center-of-gravity positions for pattern calculation is greater than or equal to a predetermined number (Yes in S215), the center-of-gravity shift pattern generation unit 211 determines whether or not the normal center-of-gravity position is stored in the normal center-of-gravity position storage unit 121 (S216).

In the case where the normal center-of-gravity position is not stored (No in S216), the center-of-gravity shift pattern generation unit 211 deletes the temporary stored center-of-gravity position stored in normal the center-of-gravity position storage unit 121 (S219), and returns to step S100. On the other hand, in the case where the normal center-of-gravity position is stored (Yes in S216), the center-of-gravity shift pattern generation unit 211 generates a center-of-gravity shift pattern based on the center-of-gravity position for pattern calculation and the normal center-of-gravity position (S217).

Specifically, the center-of-gravity shift pattern generation unit 211 generates a center-of-gravity shift pattern as follows, for example. First, for each center-of-gravity for pattern calculation position, the center-of-gravity shift pattern generation unit 211 calculates a center-of-gravity shift vector pointing from the normal center-of-gravity position to the center-of-gravity for pattern calculation position. Further, the center-of-gravity shift pattern generation unit 211 calculates the average and standard deviation of the angles, each of which shows the direction of the center-of-gravity shift vector calculated for each center-of-gravity position for pattern calculation. The center-of-gravity shift pattern generation unit 211 then generates, as a center-of-gravity shift pattern, the range from the measured average minus the standard deviation to the measured average plus the standard deviation.

The range of magnitude of the center-of-gravity shift vector may be generated as a center-of-gravity shift pattern. In this case, the center-of-gravity shift pattern generation unit 211 calculates the average and standard deviation of the magnitude of the center-of-gravity shift vector, and generates, as a center-of-gravity shift pattern, the range from the measured average of magnitude minus the standard deviation to the measured average of magnitude plus the standard deviation. Also, the center-of-gravity shift pattern generation unit 211 may generate both of the angle range and magnitude range of the vector, as a center-of-gravity shift pattern.

The center-of-gravity shift pattern generation unit 211 may generate a center-of-gravity shift pattern by using a representative value other than the average, such as the median, the mode. Also, the center-of-gravity shift pattern generation unit 211 may generate a center-of-gravity shift pattern by using a value showing the variation in the center-of-gravity shift vector, such as the value of N times the standard deviation, the root-mean-square, instead of the standard deviation.

Next, the center-of-gravity shift pattern generation unit 211 stores the generated center-of-gravity shift pattern, and the driving operation (preparatory movement information) into the center-of-gravity shift pattern storage unit 131 with the generated center-of-gravity shift pattern being associated with the driving operation (S218).

As described above, the center-of-gravity shift pattern generation unit 211 executes each process from step S211 to step S219 to generate a center-of-gravity shift pattern which is adapted to the current driver.

The vehicle control device 20 in the present embodiment generates the driver's center-of-gravity shift pattern each time a pressure is measured while determining whether or not the measured center-of-gravity is the one as a preparatory movement is made. However, the vehicle control device 20 may record driving operation information in a certain period from the start of engine (for example, 5 minutes), and the center-of-gravity position calculated for every certain period (for example, 50 ms) to generate a center-of-gravity shift pattern using the recorded driving operation information and the center-of-gravity position. Specifically, for each driving operation performed in the recording time, the vehicle control device 20 may extract the center-of-gravity position a certain time (for example, 300 ms) before the driving operation to generate a center-of-gravity shift pattern using the extracted center-of-gravity position.

Although the vehicle control device 20 in the present embodiment generates a center-of-gravity shift pattern using only the center-of-gravity position calculated from the measured pressure, and the driving operation information, the center-of-gravity shift pattern does not need to be generated in this manner. For example, the vehicle control device 20 may hold a standard center-of-gravity shift pattern previously to correct currently stored center-of-gravity shift pattern using the center-of-gravity position calculated from the measured pressure, and the driving operation information. In this case, the vehicle control device 20, even when a center-of-gravity shift pattern cannot be generated from the measured center-of-gravity and the driving operation information, can identify the preparatory movement using the stored center-of-gravity shift pattern.

As described above, the vehicle control device 20 in the present embodiment can generate a center-of-gravity shift pattern which is adapted to the driver by using the measured center-of-gravity position. Consequently, in addition to the effects obtained by the vehicle control device 10 in Embodiment 1, the vehicle control device 20 in the present embodiment can further improve the accuracy in the prediction of the driving operation.

Modification of Embodiment 2

Next, a modification of Embodiment 2 of the present invention is described in detail with reference to the drawings. The vehicle control device in the present modification differs from the vehicle control device in Embodiment 2 in that a preparatory movement is identified by using a change in the pressure distribution obtained from the pressure sensors arranged in the driver's seat. Also, the vehicle control device in the present modification differs from the vehicle control device in Modification 1 of Embodiment 1 in that a posture change pattern for identifying the preparatory movement for the driving operation is generated from a change in the measured posture. Hereinafter, the vehicle control device in the present modification is described focusing on the different points from the vehicle control devices in Embodiment 2 and in Modification 1 of Embodiment 1.

Because the overall configuration of the vehicle control device 20 in the present modification is similar to that of the vehicle control device in Embodiment 2 shown in FIG. 23, description and drawing are omitted.

Figure 27:
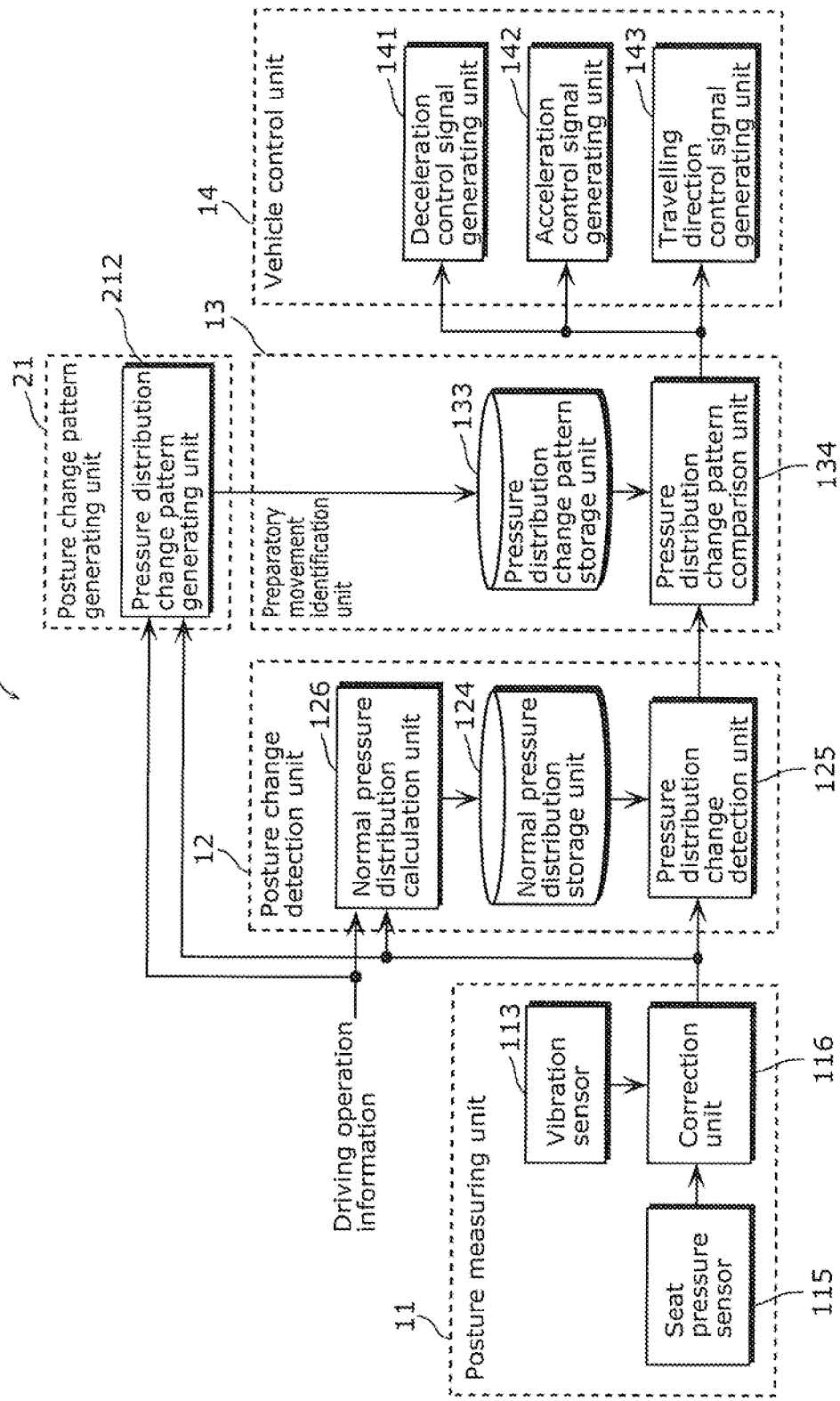
FIG. 27 is a block diagram showing an exemplary detailed configuration of a vehicle control device in a modification of Embodiment 2 of the present invention.

FIG. 27 is a block diagram showing an exemplary detailed configuration of the vehicle control device in a modification of Embodiment 2. As shown in FIG. 27, the vehicle control device 20 in the present modification differs from the vehicle control device 10 in Modification 1 of Embodiment 1 shown in FIG. 13 in that the vehicle control device 20 includes the posture change pattern generation unit 21.

The pressure distribution change pattern generator 212 included in the posture change pattern generation unit 21 generates a pressure distribution change pattern using the pressure distribution change for each driving operation (brake operation, accelerator operation, right steering operation, or left steering operation) which has been detected by the pressure distribution change detection unit 125 in a predetermined period before the driving operation. The pressure distribution change pattern generator 212 then stores the generated pressure distribution change pattern, and the driving operation into the pressure distribution change pattern storage unit 133 with the generated pressure distribution change pattern being associated with the driving operation.

Specifically, the pressure distribution change pattern generator 212 generates, for example, the range of the value (average±standard deviation) at each measurement point for multiple pressure distribution changes, as a pressure distribution change pattern.

Whether or not a driving operation has been performed is determined by acquiring the driving operation information from the driving operation receiving means. Also, the predetermined period is a such period that includes the period from the start of a preparatory movement until subsequent driving operation starts.

Next, the vehicle control method to be executed by the vehicle control device 20 configured as shown above is described. Because the flowchart showing an exemplary operation of the vehicle control device in the present modification is similar to the flowchart shown in FIG. 25, drawing and description are omitted. Also, because the details of the process in step S110 to step S130 included in the flowchart shown in FIG. 25 are similar to as in FIGS. 16 to 19 in Modification 1 of Embodiment 1, drawing and description are omitted.

Figure 28:
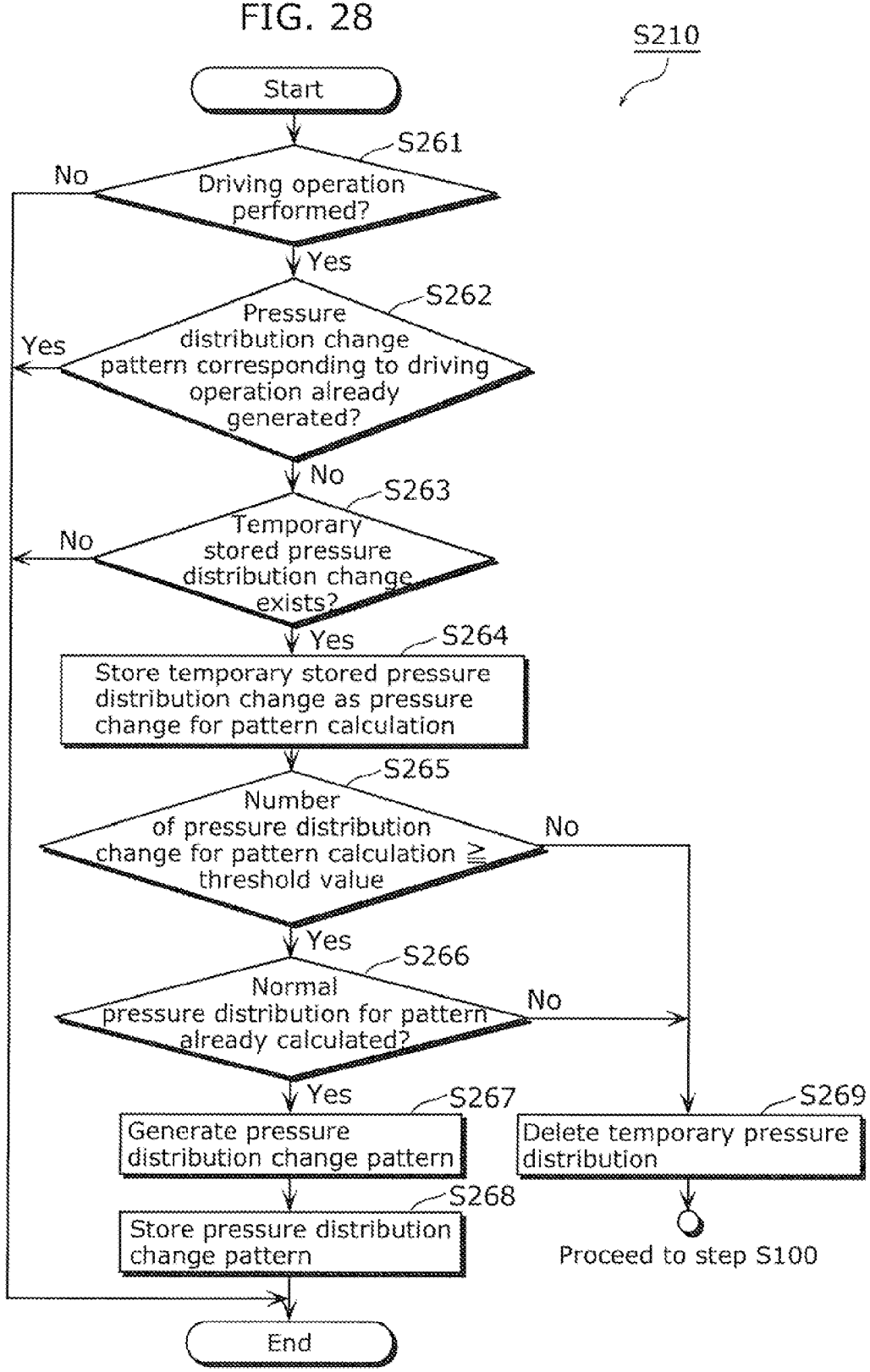
FIG. 28 is a flowchart showing an exemplary detailed process flow of a posture change pattern generation step in a modification of Embodiment 2 of the present invention.

FIG. 28 is a flowchart showing an exemplary detailed process flow of the posture change pattern generation step in a modification of Embodiment 2.

First, the pressure distribution change pattern generator 212 determines whether or not a driving operation (brake operation, steering operation, or accelerator operation) is being performed, for example, based on the driving operation information acquired from operation receiving means, such as a steering wheel, a brake, or an accelerator (S261).

In the case where a driving operation is not being performed here (No in S261), the pressure distribution change pattern generator 212 terminates the process of step S260. On the other hand, in the case where a driving operation is being performed (Yes in S261), the pressure distribution change pattern generator 212 determines whether or not the pressure distribution change pattern corresponding to the driving operation currently performed has been already generated (S262). Specifically, the pressure distribution change pattern generator 212 determines whether or not the pressure distribution change pattern corresponding to the driving operation is stored in the pressure distribution change pattern storage unit 133.

In the case where the pressure distribution change pattern corresponding to the driving operation has been already generated (Yes in S262), the pressure distribution change pattern generator 212 terminates the process of Step S260. On the other hand, in the case where the pressure distribution change pattern corresponding to the driving operation has not been generated yet (No in S262), the pressure distribution change pattern generator 212 determines whether or not temporary stored pressure distribution is stored in the normal pressure distribution storage unit 124 (S263).

In the case where the temporary stored pressure distribution is not stored (No in S263), the pressure distribution change pattern generator 212 terminates the process of step S260. On the other hand, in the case where the temporary stored pressure distribution is stored (Yes in S263), for each driving operation, the pressure distribution change pattern generator 212 stores the temporary stored pressure distribution, as a pressure distribution for pattern calculation, into the pressure distribution change pattern storage unit 133 (S264). That is to say, in the case where a driving operation has been performed, the pressure distribution change pattern generator 212 stores a pressure distribution, as a pressure distribution for pattern calculation, into the pressure distribution shift pattern storage unit 133 for each driving operation, the pressure distribution being calculated using the pressure measured within the last one cycle (in a predetermined period) of the pressure measurement cycle.

Subsequently, the pressure distribution change pattern generator 212 determines whether or not the number of pressure distribution for pattern calculation corresponding to the driving operation stored in the pressure distribution change pattern storage unit 133 is greater than or equal to a predetermined number (S265). The predetermined number is the number of pressure distribution for calculation, which is needed to calculate the current driver's pressure distribution change pattern. Specifically, the predetermined number is a natural number such as "20", for example.

In the case where the number of pressure distribution for pattern calculation is less than the predetermined number (No in S265), the pressure distribution change pattern generator 212 deletes the temporary stored pressure distribution stored in the normal pressure distribution storage unit 124 (S269), and returns to step S100. On the other hand, in the case where the number of pressure distribution for pattern calculation is greater than or equal to the predetermined number (Yes in S265), the pressure distribution change pattern generator 212 determines whether or not normal pressure distribution is stored in the normal pressure distribution storage unit 124 (S266).

In the case where normal pressure distribution is not stored (No in S266), the pressure distribution change pattern generator 212 deletes the temporary stored pressure distribution stored in normal pressure distribution storage unit 124 (S269), and returns to step S100. On the other hand, in the case where normal pressure distribution is stored (Yes in S266), the pressure distribution change pattern generator 212 generates a pressure distribution change pattern based on the pressure distribution for pattern calculation, and normal pressure distribution (S267).

Specifically, the pressure distribution change pattern generator 212 generates a pressure distribution change pattern, for example, as follows. First, for each pressure distribution for pattern calculation, the pressure distribution change pattern generator 212 calculates a pressure distribution change which is a pressure difference distribution between the normal pressure distribution and the pressure distribution for pattern calculation. Then for each pressure distribution for pattern calculation, the pressure distribution change pattern generator 212 calculates the average and standard deviation of the pressure difference of the pressure distribution change at each measurement point, which is calculated for each pressure distribution for pattern calculation. Further, the pressure distribution change pattern generator 212 generates, as a pressure distribution change pattern, comparison range for each measurement point, from the average of the calculated pressure difference minus the standard deviation to the average plus the standard deviation.

The range of the magnitude of pressure distribution change vector may be generated as a pressure distribution change pattern. In this case, the pressure distribution change pattern generator 212 calculates the average and standard deviation of the magnitude of the pressure distribution change vector, and generates, as a pressure distribution change pattern, the range from the calculated average of the magnitude minus the standard deviation to the calculated average of the magnitude plus the standard deviation. Also, the pressure distribution change pattern generator 212 may generate both of the angle range and magnitude range of the vector as a pressure distribution change pattern.

The pressure distribution change-pattern generator 212 may generate a pressure distribution change pattern by using a representative value other than the average, such as the median, the mode. Also, pressure distribution variation pattern generator 212 may generate a pressure distribution variation pattern by using a value showing the variation in the pressure distribution variation vectors, such as the value of N times the standard deviation, the root-mean-square, instead of the standard deviation.

Next, the pressure distribution change pattern generator 212 stores the generated pressure distribution change pattern and the driving operation (preparatory movement information) into the pressure distribution change pattern storage unit 133 with the generated pressure distribution change pattern being associated with the driving operation (S268).

As described above, the pressure distribution change pattern generator 212 executes each process from step S261 to step S269 to generate the pressure distribution change pattern which is adapted to the current driver.

The vehicle control device 20 in the present modification can generate a pressure distribution change pattern which is adapted to the driver using the measured pressure distribution. Consequently, in addition to the effects obtained by the vehicle control device 10 in Modification 1 of Embodiment 1, the vehicle control device 20 can further improve the accuracy in the prediction of the driving operation.

The vehicle control device 20 in Embodiment 2 or its modification generates a posture change pattern (center-of-gravity-shift pattern or pressure distribution change pattern) using the pressure measured by multiple seat pressure sensors arranged on the driver's seat, however, the posture change pattern does not needs to be generated in this manner. For example, similarly to the vehicle control device in Modification 2 of Embodiment 1, the vehicle control device may generate a posture change pattern using the pressure measured by the foot pressure sensors to identify the preparatory movement.

Embodiment 3

Next, Embodiment 3 of the present invention is described in detail with reference to the drawings.

The vehicle control device 30 in Embodiment 3 of the present invention has a feature of detecting driver's startle response in addition to identification of a preparatory movement, and controlling the vehicle based on the detection result of the startle response, and the identification result of the preparatory movement.

Figure 29:
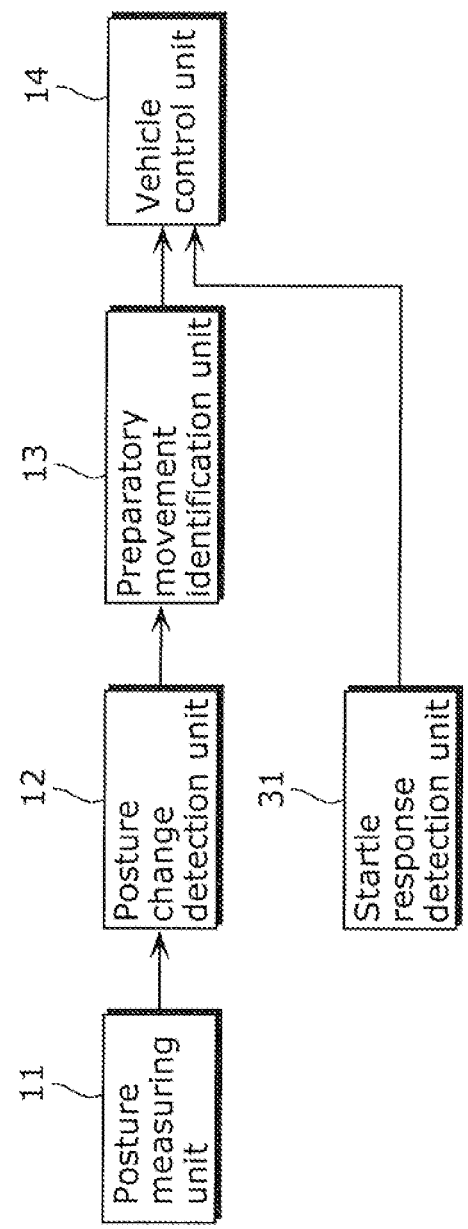
FIG. 29 is a block diagram showing an exemplary overall configuration of a vehicle control device in Embodiment 3 of the present invention.

FIG. 29 is a block diagram showing an exemplary overall configuration of the vehicle control device in Embodiment 3.

In FIG. 29, the same components as in FIG. 18 are labeled with the same reference symbols and the description is omitted.

As shown in FIG. 29, in addition to the posture measuring unit 11, the posture change detection unit 12, the preparatory movement identification unit 13, and the vehicle control unit 14, the vehicle control device 30 includes a startle response detection unit 31.

The startle response detection unit 31 detects a driver's startle response, and decelerates the vehicles in the case where a startle response is detected. Also, in the case where a startle response is detected, the startle response detection unit 31 notifies to the vehicle control unit 14 that the startle response has been detected.

The startle response herein means a reaction indicating that the driver is startled due to some reason such as encounter of emergency situations during driving.

Next, the details of each component shown in FIG. 29 are described.

Figure 30:
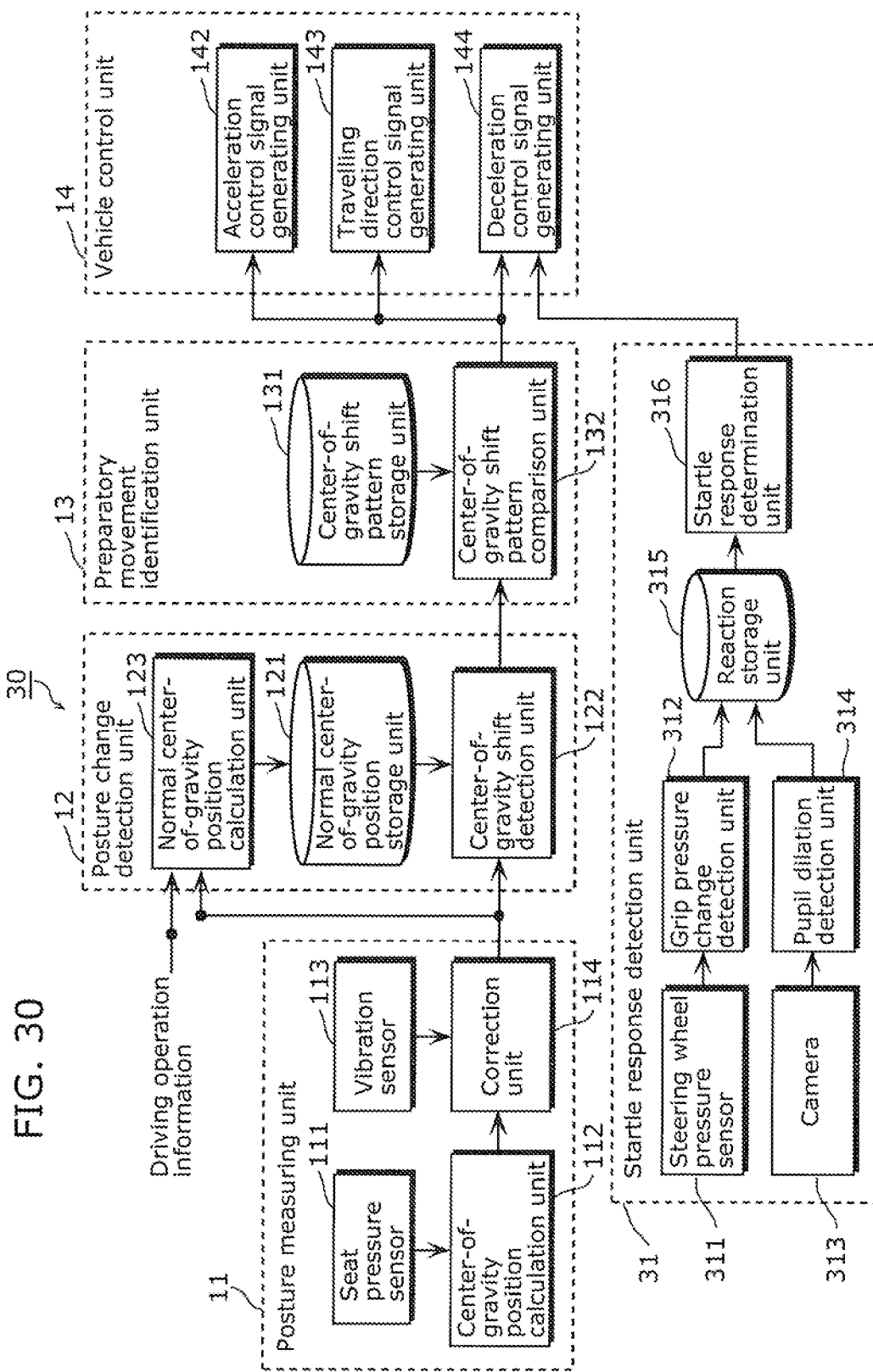
FIG. 30 is a block diagram showing an exemplary detailed configuration of the vehicle control device in Embodiment 3 of the present invention.

FIG. 30 is a block diagram showing an exemplary detailed configuration of the vehicle control device in Embodiment 3. In FIG. 30, the same components as in FIG. 3 are labeled with the same reference symbols and the description is omitted.

In the case where the vehicle is decelerated because of detection of a startle response, and a driving operation for decelerating the vehicle is predicted by preparatory movement identification unit 13, the deceleration control signal generating unit 144 expedites deceleration of the vehicle. Also, in the case where the vehicle is decelerated because of detection of a startle response, and no driving operation for decelerating the vehicle is predicted by preparatory movement identification unit 13, the deceleration control signal generating unit 144 stops deceleration of the vehicle.

The startle response detection unit 31 includes a steering wheel pressure sensor 311, a grip pressure change detection unit 312, a camera 313, a pupil dilation detection unit 314, a reaction storage unit 315, and a startle response determination unit 316.

The steering wheel pressure sensor 311 measures the driver's grip pressure on the steering wheel.

The grip pressure change detection unit 312 detects a grip pressure increase response indicating that the driver is startled based on the driver's grip pressure on the steering wheel, measured by the steering wheel pressure sensor 311. Specifically, the grip pressure change detection unit 312 detects a grip pressure increase response based on whether or not the temporal change in the measured pressure exceeds a threshold value.

The camera 313 captures an area including the driver's pupil.

The pupil dilation detection unit 314 detects a pupil dilation response indicating that the driver is startled by detecting driver's pupil dilation from the image captured by the camera 313. Specifically, the grip pressure change detection unit 312 detects a pupil dilation response based on whether or not the temporal change of the area the driver's pupil obtained from the captured image exceeds a threshold value.

The response storage unit 315 is the storage unit for storing information indicating that the grip pressure increase response has been detected by the grip pressure change detection unit 312, and information indicating that the pupil dilation response has been detected by the pupil dilation detection unit 314.

In the case where information indicating that the grip pressure increase response has been detected by the grip pressure change detection unit 312, and information indicating that the pupil dilation response has been detected by the pupil dilation detection unit 314 are stored in the response storage unit 315, the startle response determination unit 316 decelerates the vehicle while notifying the startle response to the deceleration control signal generating unit 144.

Next, the vehicle control method to be executed by the vehicle control device 30 configured as shown above is described. In the vehicle control device in the present embodiment, the operation for controlling the vehicle using preparatory movements, and the operation for controlling the vehicle using a startle response are performed in parallel in a cooperative manner.

First, the operation for controlling the vehicle by using preparatory movements is described. In the operations for controlling the vehicle using preparatory movements in the present embodiment and Embodiment 1, the detailed process of the vehicle control step (S140) are different, but other processes are the same. Thus hereinafter, the details of the vehicle control step (S140) are described using FIG. 31.

Figure 31:
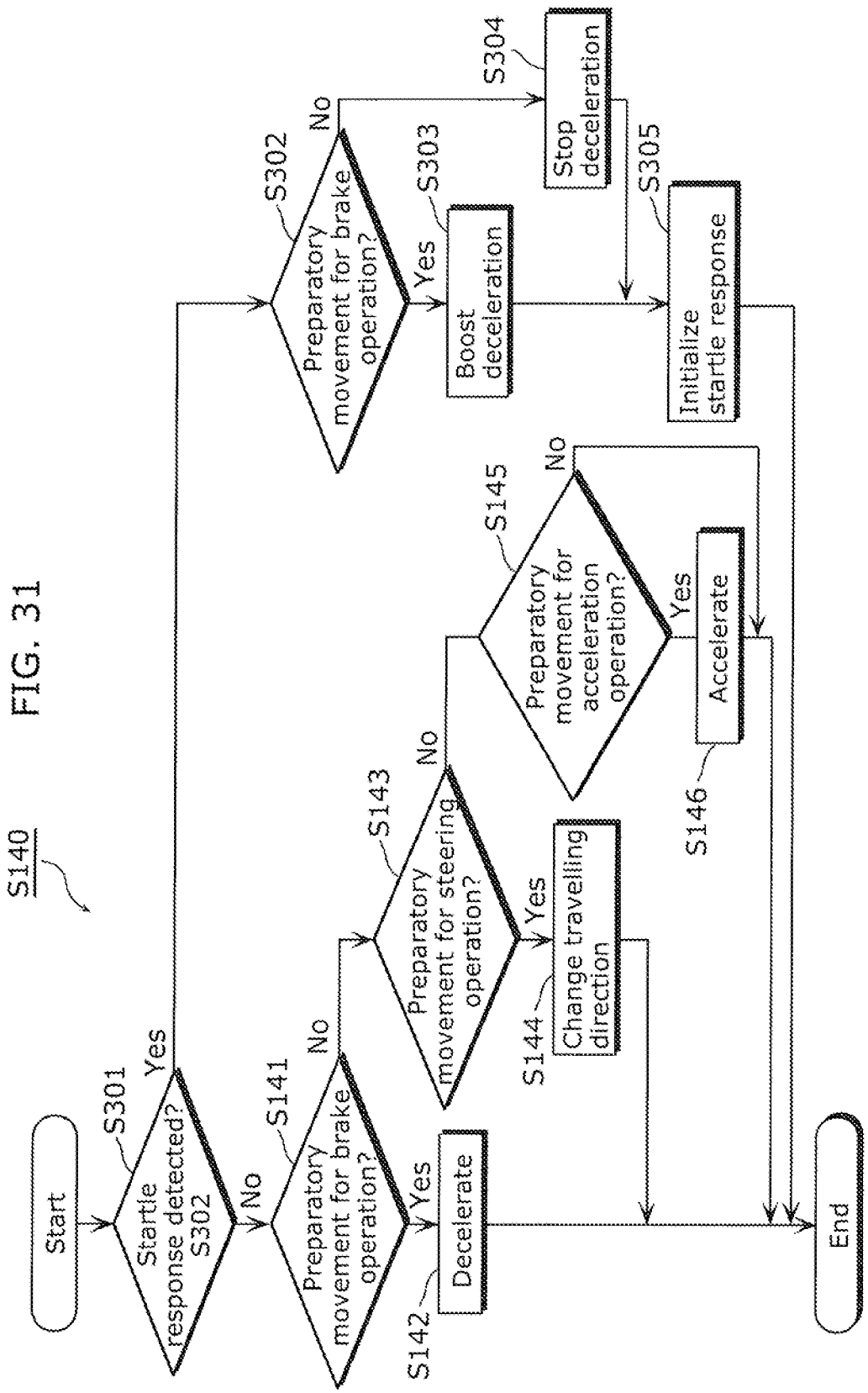
FIG. 31 is a flowchart showing an exemplary detailed process flow of a vehicle control step in Embodiment 3 of the present invention.

FIG. 31 is a flowchart showing an exemplary detailed process flow of the vehicle control step in Embodiment 3. In FIG. 31, the same steps as in FIG. 11 are labeled with the same reference symbols and the description is omitted.

First, the deceleration control signal generating unit 144 determines whether or not notification of a startle response is received from the startle response detection unit 31 (S301). Specifically, the deceleration control signal generating unit 144 determines, for example, whether or not a surprise flag indicates a startle response of the driver where the surprise flag shows that notification of the startle response is received from the startle response detection unit 31.

In the case where the startle response detection unit 31 has not received notification of the startle response (No in S301), the vehicle control unit 14 executes the same processes (S141 to S146) as in Embodiment 1. On the other hand, in the case where the startle response detection unit 31 has received notification of the startle response (Yes in S301), the deceleration control signal generating unit 144 determines whether or not the preparatory movement identified in step S130 is for a brake operation (S302).

In the case where the preparatory movement identified in step S130 is for a brake operation (Yes in S302), the deceleration control signal generating unit 144 generates a deceleration control signal for expediting deceleration of the vehicle (S303). On the other hand, in the case where the preparatory movement identified in step S130 is not for a brake operation (No in S302), deceleration-control signal generating unit 144 generates a deceleration control signal for stopping deceleration of the vehicle (S304).

The deceleration control signal generating unit 144 then initializes the startle response (S305). Specifically, the deceleration control signal generating unit 144, for example, changes the surprise flag so as to indicate no startle response.

As described above, the deceleration control signal generating unit 144 executes each process from step S301 to Step S305 to control the vehicle using preparatory movements based on the vehicle control using a startle response.

Next, the operation for controlling the vehicle using a startle response is described. The operation for controlling the vehicle using a startle response includes the following three operations: the operation of the grip pressure change detection unit 312, the operation of the pupil dilation detection unit 314, and the operation of the startle response determination unit 316. Hereinafter, these three operations are described using FIGS. 32 to 34.

Figure 32:
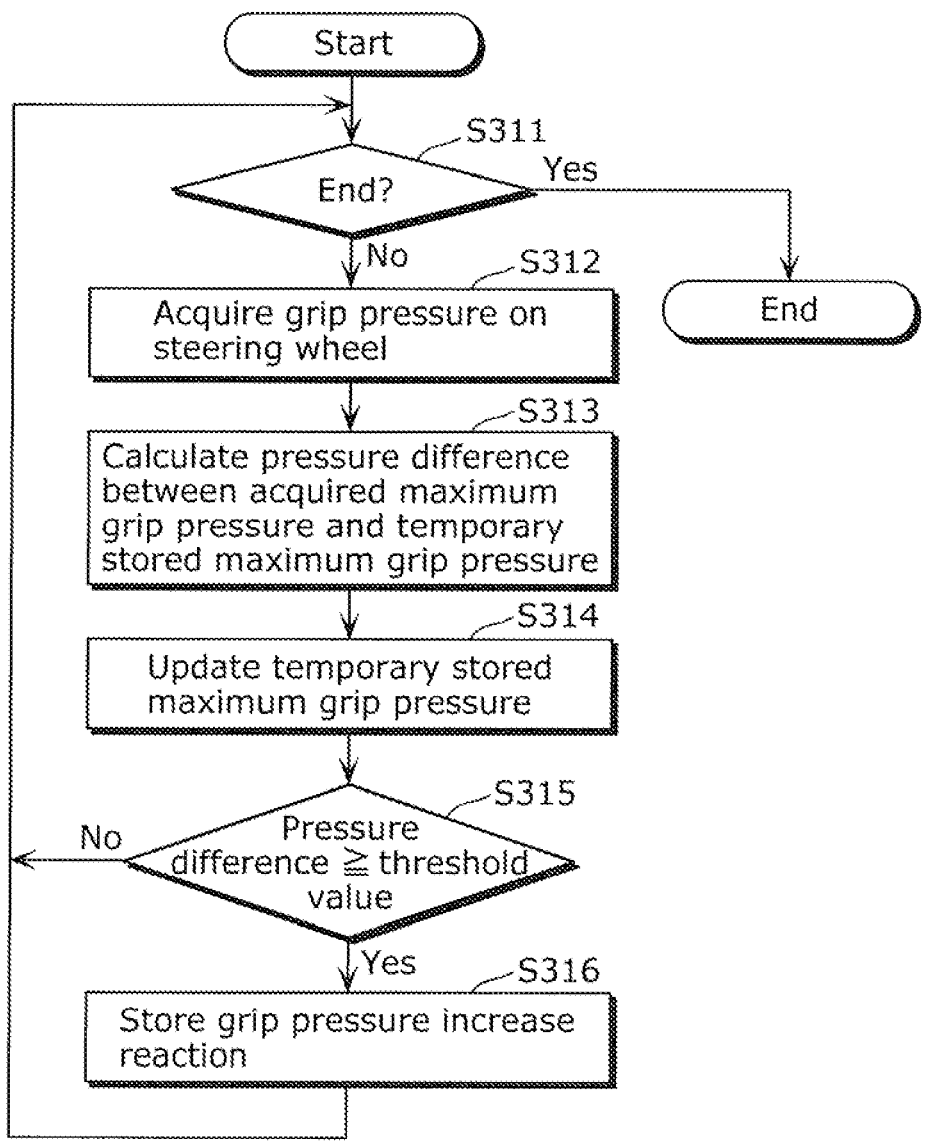
FIG. 32 is a flowchart showing an exemplary operation of a grip pressure change detection unit in Embodiment 3 of the present invention.

FIG. 32 is a flowchart showing an exemplary operation of the grip pressure change detection unit in Embodiment 3.

First, the grip pressure change detection unit 312 starts its operation when the driver sits on the seat to place the vehicle in operation. The grip pressure change detection unit 312 then determines whether or not there is any termination signal for e.g., stopping the engine (S311). In the case where there is a termination signal (Yes in S311), the grip pressure change detection unit 312 terminates the operation.

On the other hand, in the case where there is no termination signal (No in S311), the grip pressure change detection unit 312 acquires a grip pressure on the steering wheel from the steering wheel pressure sensor 311 (S312). The grip pressure change detection unit 312 then calculates a pressure difference between the maximum grip pressure in the acquired grip pressures, and the temporary stored maximum grip pressure stored in the response storage unit 315 (S313). Further, the grip pressure change detection unit 312 updates the temporary stored maximum grip pressure stored in the response storage unit 315 to the maximum grip pressure among the grip pressures acquired in step S312 (S314).

Subsequently, the grip pressure change detection unit 312 determines whether or not the calculated pressure difference is greater than or equal to the threshold value (S315). The threshold value is the value showing the lower limit of the pressure difference between the grip pressure before the driver is startled, and the grip pressure when the driver is startled.

In the case where the pressure difference is less than a threshold value (No in S315), the grip pressure change detection unit 312 returns to the process in step S311. On the other hand, in the case where the pressure difference is greater than or equal to a threshold value (Yes in S315), the grip pressure change detection unit 312 stores information indicating that there has been a grip pressure increase response into the response storage unit 315 (S316), and returns to the process in step S311.

As described above, the grip pressure change detection unit 312 executes each process from step S311 to step S316 to detect a grip pressure increase response which indicates that the driver is startled.

In the present embodiment, the grip pressure change detection unit 312 detects a grip pressure increase response by comparing the pressure difference with a threshold value, but may detect a grip pressure increase response by comparing a pressure ratio with a threshold value. Also, the grip pressure change detection unit 312 may compare the maximum value of the acquired grip pressure with a threshold value.

Figure 33:
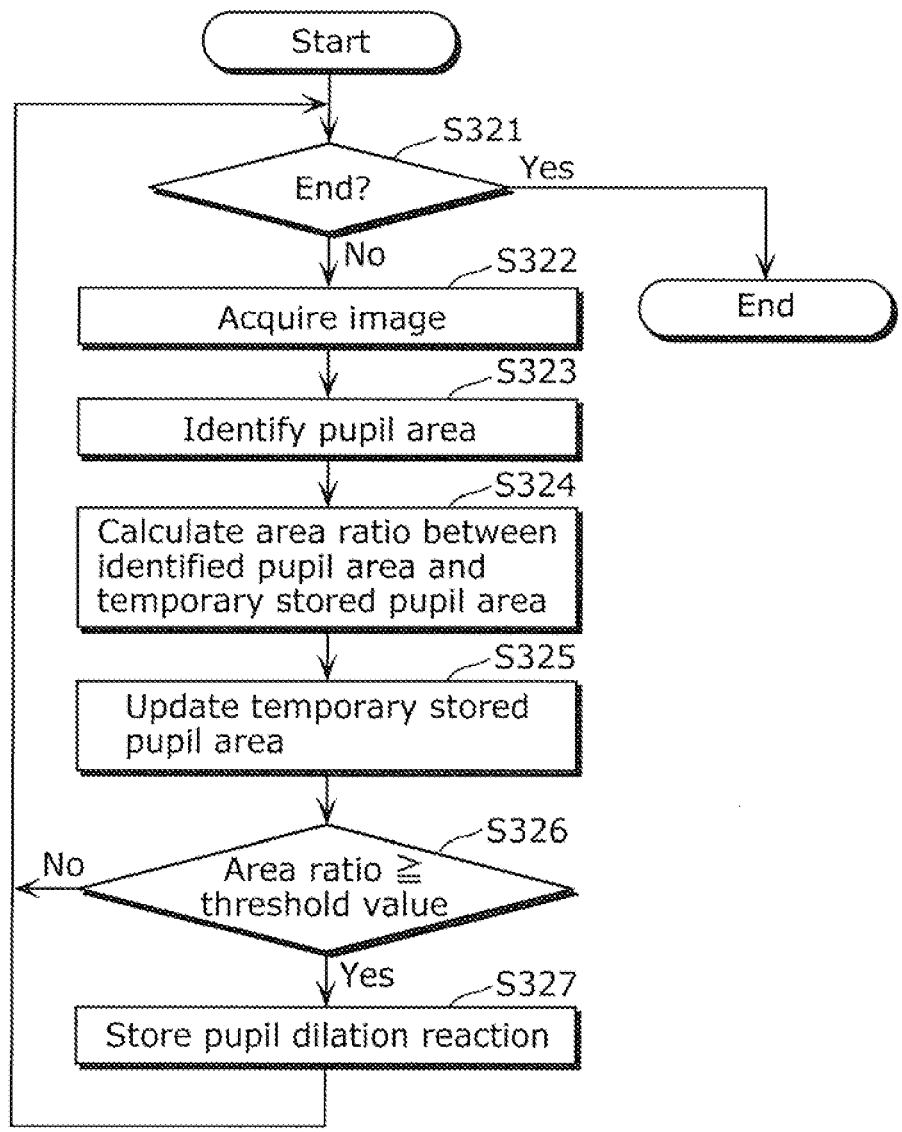
FIG. 33 is a flowchart showing an exemplary operation of a pupil dilation detection unit in Embodiment 3 of the present invention.

FIG. 33 is a flowchart showing an exemplary operation of the pupil dilation detection unit in Embodiment 3.

First, the pupil dilation detection unit 314 starts its operation when the driver sits on the seat to place the vehicle in operation. The pupil dilation detection unit 314 then determines whether or not there is any termination signal for e.g., stopping the engine (S321). In the case where there is a termination signal (Yes in S321), the pupil dilation detection unit 314 terminates the operation.

On the other hand, in the case where there is no termination signal (No in S321), the pupil dilation detection unit 314 acquires an image including the image of the driver's eyes from the camera 313 (S322). Subsequently, the pupil dilation detection unit 314 identifies the pupil area in the acquired image (S323). Specifically, the pupil dilation detection unit 314 identifies the pupil area, for example, by searching for an area similar to one of pre-stored template images of pupil. Also, the pupil dilation detection unit 314 may identify the pupil area, for example, by identifying the outline of the pupil with edge search.

The pupil dilation detection unit 314 then calculates the area ratio between the identified pupil area, and the temporary stored pupil area stored in the response storage unit 315 (S324). The pupil dilation detection unit 314 updates the temporary stored pupil area stored in the response storage unit 315 to the pupil area identified in step S323 (S325).

Subsequently, the pupil dilation detection unit 314 determines whether or not the calculated area ratio is greater than or equal to a threshold value (S325). The threshold value is the value showing the lower limit of the area ratio between the pupil area before the driver is startled, and the pupil area when the driver is startled.

In the case where the area ratio is less than a threshold value (No in S326), the pupil dilation detection unit 314 returns to the process of step S321. On the other hand, in the case where the area ratio is greater than or equal to a threshold value (Yes in S326), the pupil dilation detection unit 314 stores the information indicating that there has been a pupil dilation response into the response storage unit 315 (S315), and returns to processing of step S321.

As described above, the pupil dilation detection unit 314 executes each process from step S321 to step S327 to detect a pupil dilation response indicating that the driver is startled by using the pupil area.

In the present modification, the pupil dilation detection unit 314 detects a pupil dilation response by comparing the area ratio with a threshold value, however, may detect a pupil dilation response by comparing the area difference with a threshold value.

Also, the pupil dilation detection unit 314 may compare the area of the identified pupil area with a threshold value.

Figure 34:
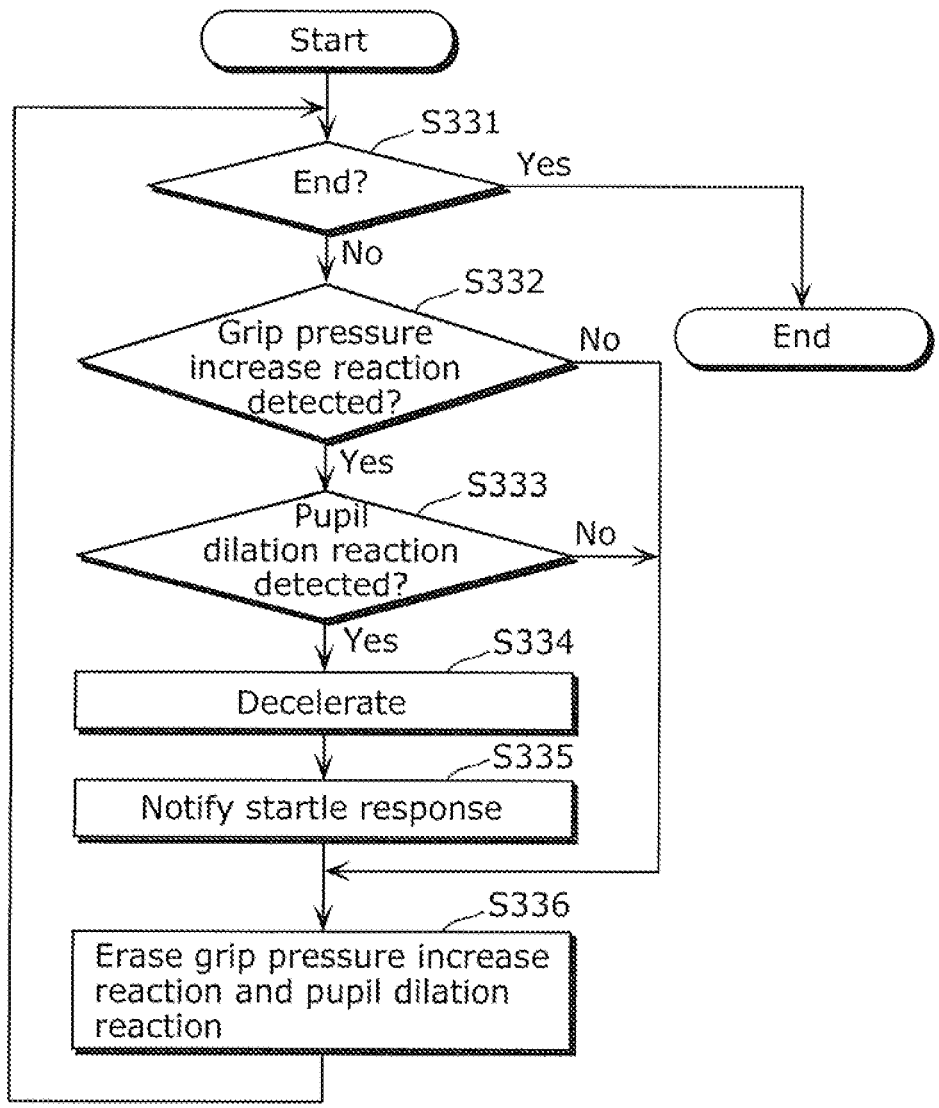
FIG. 34 is a flowchart showing an exemplary operation of a surprise reaction determination unit in Embodiment 3 of the present invention.

FIG. 34 is a flowchart showing an exemplary operation of the surprise reaction determination unit in Embodiment 3.

First, the startle response determination unit 316 starts its operation when the driver sits on the seat to place the vehicle in operation. The startle response determination unit 316 then determines whether or not there is any termination signal for e.g., stopping the engine (S331). In the case where there is a termination signal (Yes in S321), the startle response determination unit 316 terminates the operation.

On the other hand, in the case where there is no termination signal (No in S331), the startle response determination unit 316 refers to the response storage unit 315, and determines whether or not information indicating a grip pressure increase response is stored (S332). In the case where information indicating a grip pressure increase response is not stored (No in S332), the startle response determination unit 316 deletes the information indicating a pupil dilation response (S336), and returns to the process of step S331.

On the other hand, in the case where the information indicating a grip pressure increase reaction is stored (Yes in S332), the startle response determination unit 316 refers to the response storage unit 315, and determines whether or not information indicating a pupil dilation response is stored (S333). In the case where information indicating a pupil dilation response is not stored (No in S333), the startle response determination unit 316 deletes the information indicating a grip pressure increase response (S336), and returns to the process of step S331.

On the other hand, in the case where information indicating a pupil dilation response is stored (Yes in S333), the startle response determination unit 316 generates a deceleration control signal for decelerating the vehicle, and decelerates the vehicle (S334). Also, the startle response determining unit 316 notifies the information indicating that a startle response has occurred to the deceleration control signal generating unit 144 (S335). Subsequently, the startle response determination unit 316 deletes the information indicating a grip pressure increase response, and the information indicating a pupil dilation response (S336), and returns to the process of step S331.

As described above, the startle response determination unit 316 executes each process from step S331 to step S336 to decelerate the vehicle according to a startle response, while linking the operation of controlling the vehicle using a startle response to the operation of controlling the vehicle using preparatory movements in a cooperative manner.

In the present embodiment, the timing and the cycles of the operation of the grip pressure change detection unit 312, the pupil dilation detection unit 314, and the startle response determination unit 316 are independent, but may be synchronized. For example, after processing the operation of the grip pressure change detection unit 312 and the pupil dilation detection unit 314 in parallel, the operation of the startle response determination unit 316 may be started. In this case, after the operation of the startle response determination unit 316 is completed, the operation of the grip pressure change detection unit 312 and the operation of the pupil dilation detection unit 314 may be started again.

As described above, the vehicle control device 30 in the present embodiment detects a startle response when the driver encounters an emergency situation, then decelerates the vehicle based on the detected startle response. Thereby, the vehicle control device 30 can start decelerating the vehicle further earlier than the driving operation and its preparatory movement made after the driver recognizes the emergency situation.

Furthermore, the vehicle control device 30 can link the deceleration control based on a startle response, to the deceleration control based on a preparatory movement in a cooperative manner, thereby an error in the deceleration control which has started based on a startle response can be corrected. That is to say, the vehicle control device 30 can avoid undesired quick braking, which is different from the driver's decision. Thereby, the vehicle control device 30 can avoid undesired quick braking, and reduce possible confusion in the following vehicles, while suppressing risk of an accident such as a collision. That is to say, the vehicle control device 30 can control the vehicle much safer than with detection of only startle response.

Similarly to the vehicle control device in Embodiment 1, 2, or their modifications, the vehicle control device 30 in the present embodiment may control the travelling direction and acceleration of the vehicle using preparatory movements. Accordingly, in an emergency situation involving detection of a startle response, the vehicle control device 30 can control the vehicle preceding a driving operation for avoiding an accident by the driver, thereby achieving smooth operation of the vehicle. Consequently, the vehicle control device 30 enables the driver and the vehicle to safely avoid an emergency situation, while safety of the following vehicles and other surrounding traffic conditions can be improved.

Also, the vehicle control device 30 in the present embodiment detects a startle response by using the grip pressure and pupil area of the driver, however the detection can be made using either one of them. Also, the vehicle control device 30 can detect startle response by using, for example, the center-of-gravity position, blood pressure, perspiration, pulse, pulse wave of the driver, or their combination.

Embodiment 4

Next, Embodiment 4 of the present invention is described in detail with reference to the drawings.

The vehicle control device 40 in Embodiment 4 of the present invention has a feature of turning on a brake light in the case where the preparatory movement for a driving operation such as brake operation for decelerating the vehicle is identified.

Figure 35:
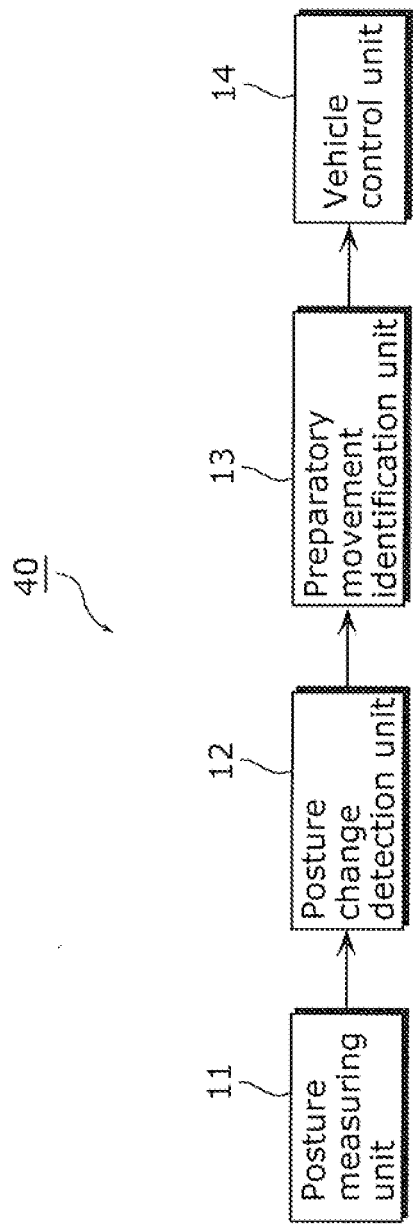
FIG. 35 is a block diagram showing an exemplary overall configuration of a vehicle control device in Embodiment 4 of the present invention.
Figure 36:
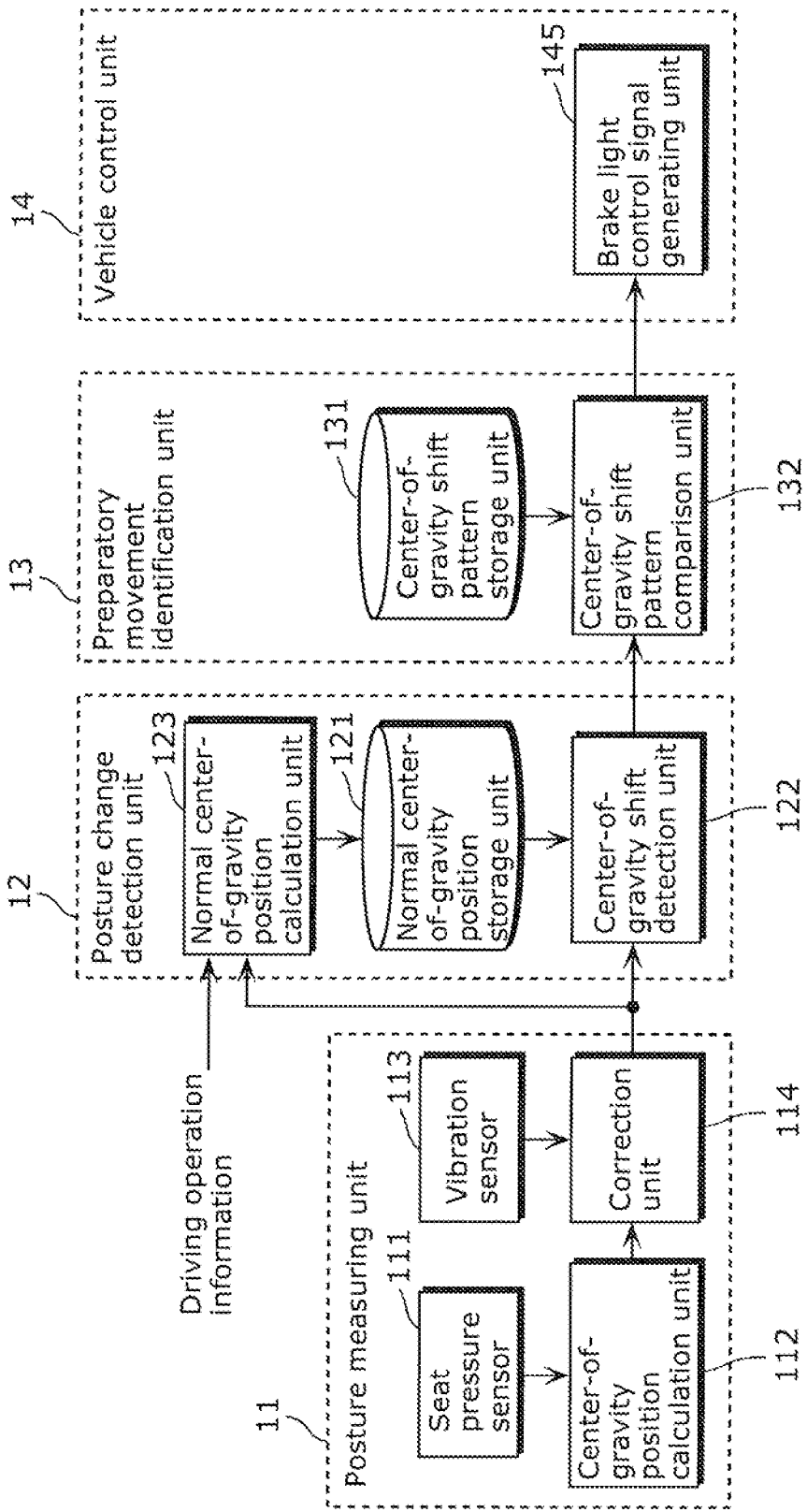
FIG. 36 is a block diagram showing an exemplary detailed configuration of the vehicle control device in Embodiment 4 of the present invention.

FIG. 35 is a block diagram showing an exemplary overall configuration of the vehicle control device in Embodiment 4. Also, FIG. 36 is a block diagram showing an exemplary detailed configuration of the vehicle control device in Embodiment 4. In FIGS. 35 and 36, the same components as in FIGS. 1B and 3 are labeled with the same reference symbols and the description is omitted.

In the case where a driving operation for decelerating the vehicle is predicted by the preparatory movement identification unit, the brake light control signal generating unit 145 included in the vehicle control unit 14 generates a brake light control signal for turning on the brake light provided in the vehicle, then turns on the brake light. The brake light is a lamp that is turned on when the vehicle is braked in the case where the brake pedal is depressed.

Next, the vehicle control method to be executed by the vehicle control device 40 configured as shown above is described. In the present embodiment and Embodiment 1, the detailed process of the vehicle control step (S140) are different, but other processes are the same. Thus hereinafter, the details of the vehicle control step (S140) are described using FIG. 37.

Figure 37:
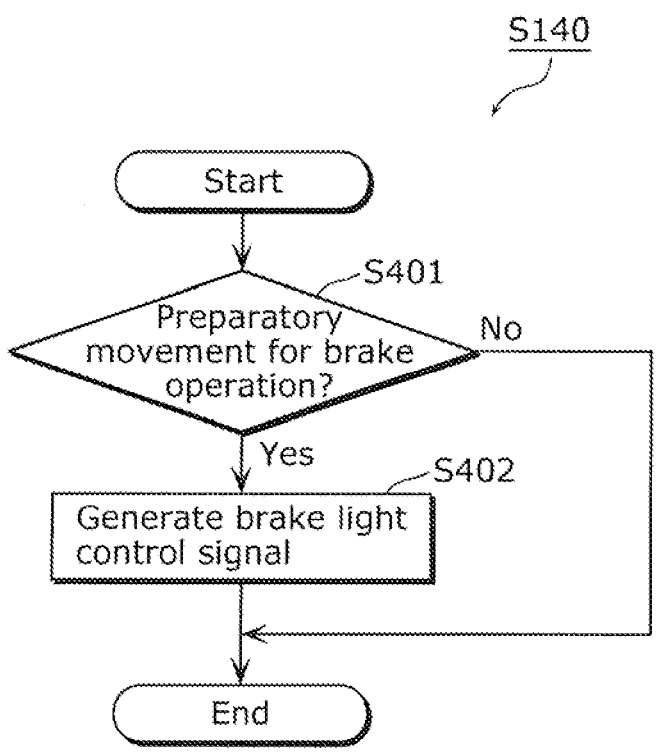
FIG. 37 is a flowchart showing an exemplary detailed process flow of a vehicle control step in Embodiment 4 of the present invention.

FIG. 37 is a flowchart showing an exemplary detailed process flow of the vehicle control step in Embodiment 4.

First, the brake light control signal generating unit 145 determines whether or not the preparatory movement identified in step S130 is for a brake operation (S401). In the case where the preparatory movement identified in step S130 is for a brake operation (Yes in S401), the brake light control signal generating unit 145 generates a brake light control signal for turning on the brake light of the vehicle, then turns on the brake light (S402). The vehicle control unit 14 terminates the process of step S140.

On the other hand, in the case where the preparatory movement identified in step S130 is not for a brake operation (No in S401), the vehicle control unit 14 terminates the process of step S140.

As described above, vehicle control unit 14 generates a control signal for controlling the brake light provided in the vehicle based on the preparatory movement identified by the preparatory movement identification unit 13, then turns of the brake light. Accordingly, the vehicle control device 40 in the present embodiment can reduce the time from the moment the driver tries to apply the brake pedal until the brake light is turned on. Consequently, the vehicle control device 40 can earlier signal the following vehicles of deceleration of the vehicle earlier, thus risk of an accident such as a collision with those vehicles can be reduced, thereby safety of the following vehicles and other surrounding traffic conditions can be improved. Specifically, with the vehicle control device 40, the brake light can be turned on 0.1 to 0.5 seconds earlier than without the vehicle control device 40, thus reducing the risk of collision with the following vehicles which cannot respond to a sudden braking.

So far, the vehicle control device and the vehicle control method according to the present invention have been described based on the embodiments and their modifications, however, the present invention is not limited to these embodiments and the modifications. As long as not departing from the spirit of the present invention, various changes made to the present embodiment and its modifications by those skilled in the art, and embodiment which is constructed by combining components in different embodiments and modifications are also included in the scope of the present embodiment.

For example, for the vehicle control device according to the present invention, each component of the vehicle control device in Embodiment 1 and its modifications 1 and 2 may be combined. That is to say, the vehicle control device may identify a preparatory movement by using a center-of-gravity position and a pressure distribution on the seat and the floor. In this case, the vehicle control device may control the vehicle, for example, in the case where all the driving operations predicted by using the center-of-gravity position and the pressure distribution are the same.

Also, the vehicle control device in Embodiment 3 or 4 predicts the driving operation by using the center-of-gravity position of the pressure in the seating surface of the seat, however, similarly to the Modification 1 or 2 of Embodiment 1, may predict the driving operation by using the pressure distribution of the seat or feet.

Also, in the above-mentioned embodiment, the center-of-gravity shift detection unit 122 detects, as a posture change, the center-of-gravity shift vector pointing from the normal center-of-gravity position to the measured center-of-gravity position, however, the invention is not limited to this case. For example, the center-of-gravity shift detection unit 122 detects, as a posture change, the vector pointing from the center-of-gravity position measured in the last time sampling to the currently measured center-of-gravity position. Also, the center-of-gravity shift detection unit 122 may detect, as a posture change, the movement path of the center-of-gravity position at three or more temporal continuous sampling points. In these cases, the center-of-gravity shift detection unit 122 holds the center-of-gravity position measured in the past, and detects a posture change by using the held center-of-gravity position and the measured center-of-gravity position. Also, in these to cases, the center-of-gravity shift pattern storage unit 131 stores the center-of-gravity shift patterns indicating the characteristics of the movement path as the preparatory movement is performed.

Also, the vehicle control device in the above-described embodiments or their modification includes the normal center-of-gravity position calculation unit 123 or the normal pressure distribution calculation unit 126, however does not necessarily need to include one of these units. For example, the vehicle control device may include the normal center-of-gravity position storage unit 121 or the normal pressure distribution storage unit 124 which pre-store normal center-of-gravity position or normal pressure distribution of an average driver. Alternatively, for example, the vehicle control device may include the normal center-of-gravity position storage unit 121 or the normal pressure distribution storage unit 124 which pre-store multiple normal center-of-gravity positions or normal pressure distribution corresponding to types of driver or characteristics of driving operation. In this case, the vehicle control device may automatically select one of multiple normal center-of-gravity positions or normal pressure distributions, or the driver may select one of multiple normal center-of-gravity positions or normal pressure distributions according to the type of the driver or the characteristics of the driving operation.

Also, the vehicle control device in the above-described embodiments or their modifications identifies the preparatory movement based on the pressure measured by the pressure sensor, the identification does not necessarily need to be based on the pressure.

For example, the vehicle control device according to the present invention may measure the muscle activity for maintaining or changing the driver's posture from myoelectric potential, hardness of muscle, then identify the preparatory movement.

Also, the vehicle control device in the above-described embodiments or their modifications includes a vibration sensor for measuring vibration of the vehicle, and a correction unit for correcting the center-of-gravity position or the pressure distribution, however, does not need to include a vibration sensor or a correction unit in the case where vibration in the cabin is negligible.

Also, the vehicle control device in the above-described embodiments or their modifications detect a center-of-gravity shift vector or a pressure distribution change as a posture change, however other type of posture change may be detected. For example, as shown in FIG. 12 or 22, the posture-change detection unit 12 may detect, as a posture change, a change in relative relationship between the maximum pressure value and the maximum pressure value for each body part such as the left buttock region, the left femoral region, the left toe, the left heel, or for each divided area of e.g., the seat. In this case, the preparatory movement identification unit 13 identifies the preparatory movement by using a change in relative relationship between the maximum pressure value and the maximum pressure value for each body part or each area. Specifically, for example, in the case the maximum pressure value of the left femoral region and the left heel are changed suddenly compared with other areas, the preparatory movement identification unit 13 identifies that the preparatory movement is for the brake operation.

Figure 38:
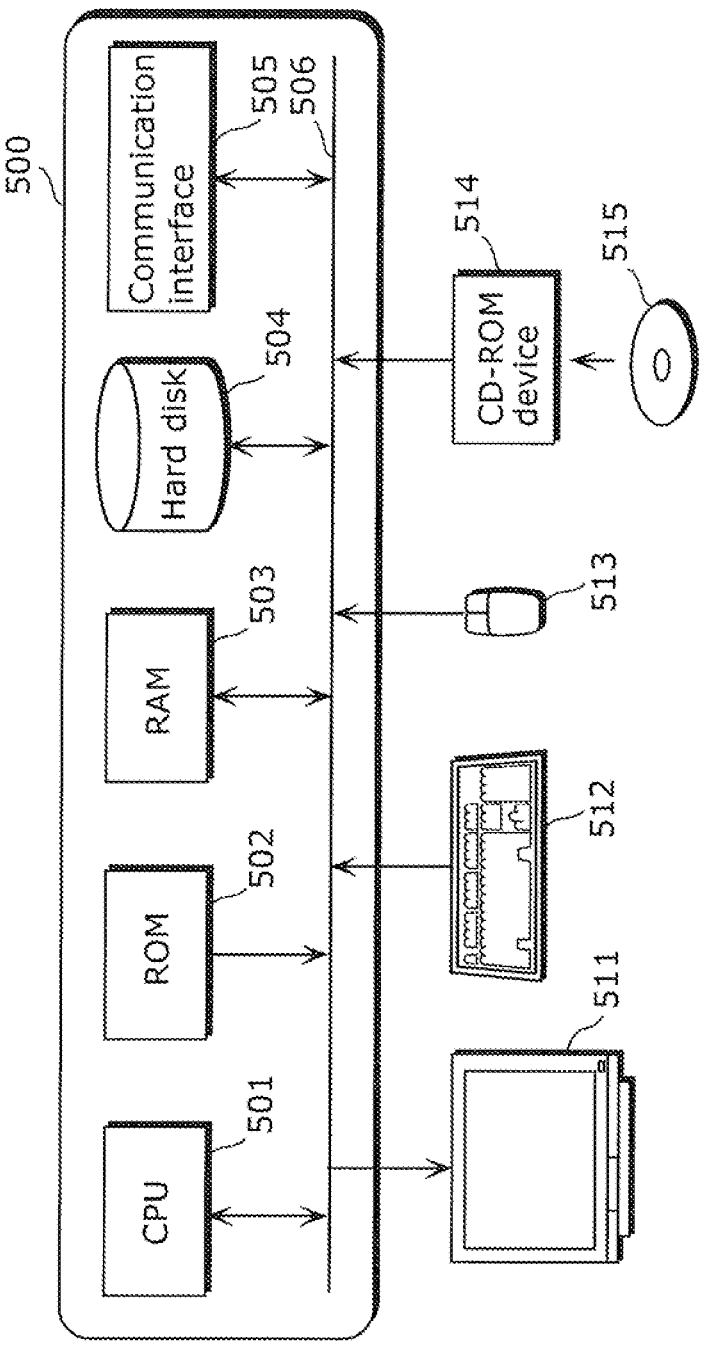
FIG. 38 is a diagram showing an exemplary hardware configuration of a computer.

The present invention can be achieved not only as such a vehicle control device, but also as a vehicle control method including steps, each of which is defined by the operation of a featured component provided in the vehicle control device, or as a program which causes a computer as shown in FIG. 38 to execute each of those steps.

FIG. 38 is a diagram showing an exemplary hardware configuration of a computer. The program for controlling the vehicle is stored in CD-ROM 515 which is a computer readable medium, and the program is read via CD-ROM device 514. Alternatively, the program for selecting an image is transmitted via a cable, a wireless network, or a broadcast.

A computer 500 includes a CPU (Central Processing Unit) 501, a ROM (Read Only Memory) 502, a RAM (Random Access Memory) 503, a hard disk 504, and a communication interface 505.

The CPU 501 executes a program which is read via the CD-ROM device 514, or a program which is received via the communication interface 505. Specifically, the CPU 501 deploys the program read via CD-ROM apparatus 514, or the program received via the communication interface 505 on the RAM 503. The CPU 501 then executes each coded instruction in the program deployed on the RAM 503.

The ROM 502 is a read-only memory which stores the program and data needed for the operation of the computer 500. The RAM 503 is used as a work area when the CPU 501 executes a program. Specifically, the RAM 503 temporarily stores, for example, the data such as a parameter used when the program is executed. The hard disk 504 stores programs, data, and the like.

The communication interface 505 performs communication with other computers via a network. The Bus 506 couples the CPU 501, the ROM 502, the RAM 503, the hard disk 504, the communication interface 505, a display 511, a keyboard 512, a mouse 513, and a CD-ROM device 514 with each other.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention predicts a driving operation by using a preparatory movement performed preceding the driving operation of the driver, and is useful as a vehicle control device which quickly controls a vehicle such as a passenger car, a bus, or a truck based on the predicted driving operation.

What is claimed is:

1. A vehicle control device for controlling a vehicle comprising:
    a posture measuring unit configured to measure a posture indicating a state of at least one of a buttock region, an upper pelvic region, and a leg of a driver, the leg on an opposite side of other leg with which the driver performs a brake operation or an accelerator operation;
    a posture change detection unit configured to detect a posture change which is a change of a posture measured by said posture measuring unit;
    a preparatory movement identification unit configured to identify whether or not the posture change detected by said posture change detection unit is caused by a preparatory movement for the brake operation or the accelerator operation, based on whether or not the posture change satisfies a predetermined condition, the preparatory movement being a movement made spontaneously by the driver before performing the brake operation or the accelerator operation; and
    a vehicle control unit configured to control the vehicle in a case where said preparatory movement identification unit identifies that the posture change has been caused by the preparatory movement for the brake operation or the accelerator operation,
    wherein in a case where a magnitude of the posture change is greater than or equal to a threshold value, said preparatory movement identification unit is configured to identify that the posture change has been caused by the preparatory movement for the brake operation or the accelerator operation.

2. The vehicle control device according to claim 1,
    wherein in a case where said preparatory movement identification unit identifies that the posture change has been caused by the preparatory movement for the brake operation, said vehicle control unit decelerates the vehicle, and
    wherein in a case where said preparatory movement identification unit identifies that the posture change has been caused by the preparatory movement for the accelerator operation, said vehicle control unit accelerates the vehicle.

3. The vehicle control device according to claim 1,
    wherein in a case where said preparatory movement identification unit identifies that the posture change has been caused by the preparatory movement for the brake operation, said vehicle control unit turns on a brake light.

4. The vehicle control device according to claim 1,
    wherein said preparatory movement identification unit comprises:
        a posture change pattern storage unit configured to store a posture change pattern indicating characteristics of a posture change when the preparatory movement is made, and preparatory movement information for identifying a driving operation to be performed after the preparatory movement with the posture change pattern being associated with the preparatory movement information; and
        a posture change pattern comparison unit configured to compare the posture change pattern stored in said posture change pattern storage unit with the posture change detected by said posture change detection unit, and thereby to identify whether or not the posture change has been caused by a preparatory movement.

5. The vehicle control device according to claim 4, further comprising
    a posture change pattern generation unit which is configured to generate a posture change pattern using the posture change detected by said posture change detection unit during a predetermined period before a driving operation, and to store the generated posture change pattern, and the driving operation with the generated posture change pattern being associated with the driving operation.

6. The vehicle control device according to claim 1,
    wherein said posture measuring unit is configured to measure the center-of-gravity position of the driver as the posture.

7. The vehicle control device according to claim 6
    wherein said posture measuring unit comprises:
        three or more pressure sensors which are arranged on a seating surface of a seat on which the driver sits, and are configured to measure pressure on the seating surface; and
        a center-of-gravity-position calculation unit configured to calculate the center-of-gravity position of the pressure in the seating surface, as the center-of-gravity position of the driver, using the pressure measured by each of the pressure sensors.

8. The vehicle control device according to claim 6,
    wherein said posture change detection unit is configured to detect a center-of-gravity shift vector which points from a normal center-of-gravity position to the center-of-gravity position measured by said posture measuring unit, the normal center-of-gravity position being the center-of-gravity position of the driver when no driving operation and no preparatory movement are made.

9. The vehicle control device according to claim 8, further comprising
    a normal center-of-gravity position calculation unit which is configured to calculate the normal center-of-gravity position using the center-of-gravity position which has been calculated by using pressure where no driving operation is performed for a predetermined period after the pressure is measured by each of the pressure sensors,
    wherein said posture change detection unit detects a center-of-gravity shift vector using the normal center-of-gravity position calculated by said normal center-of-gravity position calculation unit.

10. The vehicle control device according to claim 1,
    wherein said posture measuring unit includes multiple pressure sensors provided in at least one of a seat on which the driver sits and the floor in front of the seat, and is configured to measure a pressure distribution as the posture, the pressure distribution being measured by said multiple pressure sensors.

11. The vehicle control device according to claim 10,
    wherein said posture change detection unit detects a pressure distribution change as the posture change, the pressure distribution change being a difference between the pressure distribution measured by said posture measuring unit, and normal pressure distribution which is pressure distribution observed when no driving operation and no preparatory movement are performed.

12. The vehicle control device according to claim 11, further comprising
a normal pressure distribution calculation unit configured to calculate a normal pressure distribution by using pressure distribution where no driving operation is performed for a predetermined period after the pressure distribution is measured by said multiple pressure sensors,
wherein said posture change detection unit detects the pressure distribution change by using the normal pressure distribution calculated by said normal pressure distribution calculation unit.

13. The vehicle control device according to claim 1, further comprising
a startle response detection unit configured to detect a startle response of the driver, and to decelerate the vehicle in a case where the startle response is detected,
wherein in a case where the vehicle is decelerated due to a detection of the startle response, and said preparatory movement identification unit identifies that the posture change has been caused by the preparatory movement for the brake operation, said vehicle control unit expedites deceleration of the vehicle, and
wherein in a case where the vehicle is decelerated due to a detection of the startle response, and said preparatory movement identification unit does not identify that the posture change has been caused by the preparatory movement for the brake operation, said vehicle control unit stops deceleration of the vehicle.

14. The vehicle control device according to claim 13,
wherein said startle response detection unit detects the startle response based on grip pressure of the driver on a steering wheel.

15. The vehicle control device according to claim 13,
wherein said startle response detection unit detects the startle response by detecting pupil dilation of the driver.

16. A vehicle control device for controlling a vehicle comprising:
a posture measuring unit configured to measure a posture indicating a state of at least one of a femoral region, a buttock region, and a lumbar to back region above a pelvis of a driver;
a posture change detection unit configured to detect a posture change which is a change of a posture measured by said posture measuring unit;
a preparatory movement identification unit configured to identify whether or not the posture change is caused by a preparatory movement for a steering operation, based on whether or not the posture change detected by said posture change detection unit satisfies a predetermined condition, the preparatory movement being a movement made spontaneously by the driver before performing the steering operation; and
a vehicle control unit configured to control the vehicle in a case where said preparatory movement identification unit identifies that the posture change has been caused by the preparatory movement for the steering operation.

17. The vehicle control device according to claim 16,
wherein said posture measuring unit is configured to measure a posture indicating a state of the femoral region and the buttock region, and
wherein said preparatory movement identification unit is configured to control the vehicle so as to turn the vehicle to a direction opposite to a direction of the posture change.

18. The vehicle control device according to claim 16,
wherein said posture measuring unit is configured to measure a posture indicating a state of the lumbar to back region above the pelvis, and
wherein said preparatory movement identification unit is configured to control the vehicle so as to turn the vehicle to the direction same as the direction of the posture change.

19. The vehicle control device according to claim 16,
wherein said preparatory movement identification unit comprises:
a posture change pattern storage unit configured to store a posture change pattern indicating characteristics of a posture change when the preparatory movement is made, and preparatory movement information for identifying a driving operation to be performed after the preparatory movement with the posture change pattern being associated with the preparatory movement information; and
a posture change pattern comparison unit configured to compare the posture change pattern stored in said posture change pattern storage unit with the posture change detected by said posture change detection unit, and thereby to identify whether or not the posture change has been caused by a preparatory movement.

20. The vehicle control device according to claim 16,
wherein said posture measuring unit measures a center of gravity position of the driver as the posture.

21. The vehicle control device according to claim 16,
wherein said posture measuring unit includes multiple pressure sensors provided in at least one of a seat on which the driver sits, and the floor in front of the seat, and is configured to measure a pressure distribution as the posture, the pressure distribution being measured by the multiple pressure sensors.

22. A vehicle control method comprising:
measuring a posture indicating a state of at least one of a buttock region, an upper pelvic region, and a leg of a driver, the leg on an opposite side of other leg with which the driver performs a brake operation or an accelerator operation;
detecting a posture change which is a change of a posture measured by said posture measuring unit;
identifying, using a control device, whether or not the posture change is caused by a preparatory movement for the brake operation or the accelerator operation, based on whether or not the posture change detected by said posture change detection unit satisfies a predetermined condition, the preparatory movement being a movement made spontaneously by the driver before performing the brake operation or the accelerator operation; and
controlling the vehicle in a case where said preparatory movement identification unit identifies that the posture change has been caused by the preparatory movement for the brake operation or the accelerator operation,
wherein in a case where a magnitude of the posture change is greater than or equal to a threshold value, said identifying identifies that the posture change has been caused by the preparatory movement for the brake operation or the accelerator operation.

23. A non-transitory computer readable recording medium having stored thereon a program for causing a computer to execute a vehicle control method comprising:
measuring a posture indicating a state of at least one of a buttock region, an upper pelvic region, and a leg of a driver, the leg on an opposite side of other leg with which the driver performs a brake operation or an accelerator operation;

detecting a posture change which is a change of a posture measured by said posture measuring unit;

identifying whether or not the posture change is caused by a preparatory movement for the brake operation or the accelerator operation, based on whether or not the posture change detected by said posture change detection unit satisfies a predetermined condition, the preparatory movement being a movement made spontaneously by the driver before performing the brake operation or the accelerator operation; and controlling the vehicle in a case where said preparatory movement identification unit identifies that the posture change has been caused by the preparatory movement for the brake operation or the accelerator operation, wherein in a case where a magnitude of the posture change is greater than or equal to a threshold value, said identifying identifies that the posture change has been caused by the preparatory movement for the brake operation or the accelerator operation.

24. A vehicle control method comprising:

measuring a posture indicating a state of at least one of a femoral region, a buttock region, and a lumbar to back region above a pelvic region of a driver;

detecting a posture change which is a change of a posture measured by said posture measuring unit;

identifying, using a control device, whether or not the posture change is caused by a preparatory movement for a steering operation, based on whether or not the posture change detected by said posture change detection unit satisfies a predetermined condition, the preparatory movement being a movement made spontaneously by the driver before performing the steering operation; and controlling the vehicle in a case where said preparatory movement identification unit identifies that the posture change has been caused by the preparatory movement for the steering operation.

25. A non-transitory computer readable recording medium having stored thereon a program for causing a computer to execute a vehicle control method comprising:

measuring a posture indicating a state of at least one of a femoral region, a buttock region, and a lumbar to back region above a pelvic region of a driver;

detecting a posture change which is a change of a posture measured by said posture measuring unit;

identifying whether or not the posture change is caused by a preparatory movement for a steering operation, based on whether or not the posture change detected by said posture change detection unit satisfies a predetermined condition, the preparatory movement being a movement made spontaneously by the driver before performing the steering operation; and controlling the vehicle in a case where said preparatory movement identification unit identifies that the posture change has been caused by the preparatory movement for the steering operation.

* * * * *